(12) United States Patent
Englander et al.

(10) Patent No.: US 12,024,092 B1
(45) Date of Patent: *Jul. 2, 2024

(54) COLLISION AVOIDANCE AND/OR PEDESTRIAN DETECTION SYSTEM

(71) Applicant: ROSCO, INC., Jamaica, NY (US)

(72) Inventors: Benjamin Englander, Woodmere, NY (US); Julian Serer, Plainview, NY (US)

(73) Assignee: Rosco, Inc., Jamaica, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,930

(22) Filed: Nov. 21, 2022

Related U.S. Application Data

(63) Continuation of application No. 16/995,550, filed on Aug. 17, 2020, now Pat. No. 11,505,122, which is a
(Continued)

(51) Int. Cl.
*B60Q 9/00* (2006.01)
*B60K 35/00* (2006.01)
(Continued)

(52) U.S. Cl.
CPC ............. *B60Q 9/008* (2013.01); *B60K 35/00* (2013.01); *B60Q 5/005* (2013.01); *B60R 1/00* (2013.01); *B60R 1/008* (2013.01); *G01S 13/86* (2013.01); *G01S 13/931* (2013.01); *G01S 19/13* (2013.01); *B60K 35/28* (2024.01); *B60K 35/60* (2024.01); *B60K 2360/178* (2024.01); *B60K 2360/179* (2024.01); *B60K 2360/34* (2024.01); *B60K 2360/48* (2024.01); *B60K 2360/797* (2024.01); *B60R 2300/105* (2013.01); *B60R 2300/108* (2013.01); *B60R 2300/301* (2013.01); *B60R 2300/302* (2013.01); *B60R 2300/404* (2013.01); *B60R 2300/802* (2013.01);
(Continued)

(58) Field of Classification Search
None
See application file for complete search history.

(56) References Cited

U.S. PATENT DOCUMENTS

| 5,111,210 A | * | 5/1992 | Morse ................... G01S 13/937 342/417 |
| 5,432,509 A | * | 7/1995 | Kajiwara ............... B60Q 9/008 340/556 |

(Continued)

*Primary Examiner* — Fekadeselassie Girma
(74) *Attorney, Agent, or Firm* — Manatt, Phelps & Phillip

(57) ABSTRACT

A collision avoidance and/or pedestrian detection system for a large passenger vehicle such as commuter bus, which includes one or more exterior and/or interior sensing devices positioned strategically around the exterior and interior of the vehicle for recording data, method for avoiding collisions and/or detecting pedestrians, and features/articles of manufacture for improving same, is described herein in various embodiments. The sensing devices may be responsive to one or more situational sensors, and may be connected to one or more interior and/or exterior warning systems configured to alert a driver inside the vehicle and/or a pedestrian outside the vehicle that a collision may be possible and/or imminent based on a path of the vehicle and/or a position of the pedestrian as detected by one or more sensing devices and/or situational sensors.

20 Claims, 77 Drawing Sheets

Related U.S. Application Data continuation of application No. 16/364,043, filed on Mar. 25, 2019, now Pat. No. 10,744,938, which is a continuation of application No. 15/664,053, filed on Jul. 31, 2017, now Pat. No. 10,239,450, which is a continuation of application No. 15/078,183, filed on Mar. 23, 2016, now Pat. No. 9,718,405.

(60) Provisional application No. 62/136,750, filed on Mar. 23, 2015.

(51) Int. Cl.
| | | |
|---|---|---|
| *B60K 35/28* | (2024.01) | |
| *B60K 35/60* | (2024.01) | |
| *B60Q 5/00* | (2006.01) | |
| *B60R 1/00* | (2022.01) | |
| *G01S 13/86* | (2006.01) | |
| *G01S 13/931* | (2020.01) | |
| *G01S 19/13* | (2010.01) | |

(52) U.S. Cl.
CPC ............ *B60R 2300/8033* (2013.01); *B60R 2300/8093* (2013.01); *B60Y 2410/10* (2013.01)

(56) References Cited

U.S. PATENT DOCUMENTS

| | | | |
|---|---|---|---|
| 5,446,509 A | 8/1995 | Okinishi | |
| 5,515,026 A * | 5/1996 | Ewert | B60Q 1/525 |
| | | | 340/384.1 |
| 5,690,421 A * | 11/1997 | Shea | G02B 5/20 |
| | | | 362/293 |
| 5,825,177 A * | 10/1998 | Finnestad | G01P 3/803 |
| | | | 324/179 |
| 5,942,993 A * | 8/1999 | Mio | G08G 1/04 |
| | | | 340/933 |
| 6,011,518 A | 1/2000 | Yamagishi | |
| 6,035,053 A * | 3/2000 | Yoshioka | B60K 31/0008 |
| | | | 382/104 |
| 6,223,125 B1 * | 4/2001 | Hall | G08G 1/164 |
| | | | 701/117 |
| 6,326,903 B1 * | 12/2001 | Gross | G08G 1/087 |
| | | | 340/988 |
| 6,337,637 B1 * | 1/2002 | Kubota | B60T 7/18 |
| | | | 340/901 |
| 6,611,200 B2 | 8/2003 | Pressnall | |
| 7,084,859 B1 | 8/2006 | Pryor | |
| 7,375,622 B2 * | 5/2008 | Takata | G08G 1/162 |
| | | | 340/436 |
| 7,667,581 B2 * | 2/2010 | Fujimoto | G06V 20/588 |
| | | | 340/436 |
| 7,832,882 B2 | 11/2010 | Weller | |
| 8,164,432 B2 * | 4/2012 | Broggi | G06V 20/58 |
| | | | 340/436 |
| 8,248,363 B2 | 8/2012 | Anastas | |
| 8,352,173 B2 * | 1/2013 | Greene | G08G 1/166 |
| | | | 340/436 |
| 8,471,691 B2 | 6/2013 | Zhang | |
| 8,482,534 B2 | 7/2013 | Pryor | |
| 8,482,535 B2 | 7/2013 | Pryor | |
| 8,509,523 B2 * | 8/2013 | Schamp | G06V 20/58 |
| | | | 382/104 |
| 8,520,070 B1 * | 8/2013 | Englander | H04N 5/77 |
| | | | 348/148 |
| 8,538,636 B2 * | 9/2013 | Breed | B60R 21/01534 |
| | | | 362/465 |
| 8,547,249 B2 * | 10/2013 | David | G08G 1/166 |
| | | | 340/936 |
| 8,583,329 B2 * | 11/2013 | Breed | B60R 21/0134 |
| | | | 180/197 |
| 8,589,061 B2 * | 11/2013 | Bengtsson | G08G 1/165 |
| | | | 340/436 |
| 8,610,674 B2 | 12/2013 | Pryor | |
| 8,666,651 B2 * | 3/2014 | Kumabe | G08G 1/164 |
| | | | 701/301 |
| 8,952,799 B2 * | 2/2015 | Irrgang | G08G 1/168 |
| | | | 340/436 |
| 9,047,781 B2 * | 6/2015 | Geter | G08G 1/166 |
| 9,048,960 B2 * | 6/2015 | Li | H04W 4/46 |
| 9,201,842 B2 | 12/2015 | Plante | |
| 9,227,568 B1 | 1/2016 | Hubbell | |
| 9,239,380 B2 * | 1/2016 | Hegemann | G06V 20/588 |
| 9,321,470 B1 * | 4/2016 | Riden | B61L 27/20 |
| 9,330,321 B2 * | 5/2016 | Schamp | B60R 21/0134 |
| 9,387,897 B2 * | 7/2016 | Orzeck | G08B 7/06 |
| 9,674,490 B2 * | 6/2017 | Koravadi | B60R 11/04 |
| 9,718,405 B1 * | 8/2017 | Englander | B60K 35/00 |
| 9,908,470 B1 * | 3/2018 | Englander | B60R 1/00 |
| 10,239,450 B1 * | 3/2019 | Englander | B60Q 9/008 |
| 10,549,690 B1 * | 2/2020 | Englander | B60R 1/00 |
| 10,744,938 B1 * | 8/2020 | Englander | B60R 1/008 |
| 11,084,422 B1 * | 8/2021 | Englander | B60Q 5/005 |
| 11,505,122 B1 | 11/2022 | Englander | |
| 2002/0003571 A1 | 1/2002 | Schofield et al. | |
| 2002/0113876 A1 * | 8/2002 | Kim | B60R 25/1004 |
| | | | 348/E7.086 |
| 2004/0150515 A1 | 8/2004 | Kallhammer et al. | |
| 2004/0206611 A1 | 10/2004 | Kobayashi | |
| 2005/0162262 A1 * | 7/2005 | Dowdy | G08G 1/166 |
| | | | 340/576 |
| 2005/0174429 A1 | 8/2005 | Yanai | |
| 2005/0190260 A1 | 9/2005 | Xie | |
| 2005/0201590 A1 * | 9/2005 | Kudo | G08G 1/167 |
| | | | 382/104 |
| 2005/0232469 A1 * | 10/2005 | Schofield | B60W 30/143 |
| | | | 382/104 |
| 2005/0278088 A1 * | 12/2005 | Thorner | B60Q 9/005 |
| | | | 701/28 |
| 2006/0186702 A1 | 8/2006 | Kisanuki et al. | |
| 2006/0271286 A1 | 11/2006 | Rosenberg | |
| 2006/0290519 A1 * | 12/2006 | Boate | G07C 9/28 |
| | | | 340/573.4 |
| 2007/0024433 A1 * | 2/2007 | Garner | G09B 25/00 |
| | | | 340/901 |
| 2007/0229238 A1 | 10/2007 | Boyles et al. | |
| 2007/0257783 A1 * | 11/2007 | Matsumoto | B60Q 1/506 |
| | | | 340/426.25 |
| 2008/0030311 A1 | 2/2008 | Dayan et al. | |
| 2008/0036576 A1 * | 2/2008 | Stein | G06V 20/584 |
| | | | 340/425.5 |
| 2008/0042878 A1 * | 2/2008 | Heng | G08G 1/161 |
| | | | 340/936 |
| 2008/0049106 A1 | 2/2008 | Kallhammer et al. | |
| 2008/0079553 A1 | 4/2008 | Boice | |
| 2008/0119993 A1 | 5/2008 | Breed | |
| 2008/0294315 A1 * | 11/2008 | Breed | G06V 20/584 |
| | | | 701/49 |
| 2008/0316011 A1 * | 12/2008 | Kirsch | G02B 27/01 |
| | | | 340/439 |
| 2009/0096937 A1 * | 4/2009 | Bauer | B60R 1/12 |
| | | | 348/739 |
| 2009/0115890 A1 * | 5/2009 | Bertollo Conte | H04L 12/10 |
| | | | 348/373 |
| 2009/0167512 A1 * | 7/2009 | Iwamoto | B60R 25/1004 |
| | | | 340/429 |
| 2010/0001897 A1 | 1/2010 | Lyman | |
| 2010/0194596 A1 | 8/2010 | Wang et al. | |
| 2010/0231716 A1 * | 9/2010 | Klaerner | B60R 1/00 |
| | | | 348/148 |
| 2010/0296705 A1 | 11/2010 | Miksa et al. | |
| 2011/0018832 A1 | 1/2011 | Pryor | |
| 2011/0032203 A1 | 2/2011 | Pryor | |
| 2011/0173565 A1 | 7/2011 | Ofek et al. | |
| 2011/0184617 A1 * | 7/2011 | Hegemann | G01S 13/867 |
| | | | 701/70 |
| 2011/0254956 A1 * | 10/2011 | Ishikawa | B60W 50/14 |
| | | | 348/148 |
| 2012/0026616 A1 * | 2/2012 | Rawlings | B60R 1/04 |
| | | | 359/872 |

(56) References Cited

U.S. PATENT DOCUMENTS

| | | |
|---|---|---|
| 2012/0062743 A1 | 3/2012 | Lynam et al. |
| 2012/0154591 A1 | 6/2012 | Baur et al. |
| 2012/0235805 A1 | 9/2012 | Nogami et al. |
| 2012/0290169 A1* | 11/2012 | Zeng ................... G01S 7/4972 701/30.2 |
| 2012/0314074 A1 | 12/2012 | Aimura et al. |
| 2013/0103259 A1* | 4/2013 | Eng ................... B60G 17/0165 701/37 |
| 2013/0113923 A1* | 5/2013 | Chien ................... B60R 1/00 348/148 |
| 2013/0141578 A1* | 6/2013 | Chundrlik, Jr. ........... B60R 1/04 348/148 |
| 2013/0253754 A1 | 9/2013 | Ferguson et al. |
| 2013/0279308 A1* | 10/2013 | Helm ..................... H04H 60/27 381/86 |
| 2013/0321628 A1* | 12/2013 | Eng ..................... G08G 1/165 348/148 |
| 2013/0328673 A1* | 12/2013 | Ishikawa ............... G02B 27/01 340/439 |
| 2014/0002651 A1 | 1/2014 | Plante |
| 2014/0016216 A1 | 1/2014 | Mori et al. |
| 2014/0056441 A1* | 2/2014 | Chhaunker .............. B60Q 5/00 381/107 |
| 2014/0222280 A1 | 8/2014 | Salomonsson et al. |
| 2014/0223787 A1* | 8/2014 | Richmond ............... G09F 13/04 40/575 |
| 2014/0232861 A1* | 8/2014 | Naidoo ............... H04L 12/2836 348/143 |
| 2014/0292502 A1* | 10/2014 | Sakima ............. B60W 30/0956 340/435 |
| 2015/0307026 A1* | 10/2015 | Minikey, Jr. .............. H01Q 1/42 348/148 |
| 2016/0075332 A1* | 3/2016 | Edo-Ros ........... B60W 30/0953 701/70 |
| 2016/0120403 A1* | 5/2016 | Mochizuki .............. G08G 1/162 351/209 |
| 2016/0180176 A1* | 6/2016 | Yamamoto ................ B60R 1/00 382/103 |
| 2016/0191863 A1* | 6/2016 | Minikey, Jr. ........... H04N 23/57 348/148 |
| 2016/0200275 A1* | 7/2016 | Le Merrer .............. B60R 21/36 180/274 |
| 2016/0356880 A1* | 12/2016 | Negussu ................ G01S 7/022 |
| 2017/0349178 A1* | 12/2017 | Suzuki ................. B60W 30/16 |

\* cited by examiner

FINAL ASSEMBLY

FINAL ASSEMBLY

COLLISION AVOIDANCE AND/OR PEDESTRIAN DETECTION SYSTEM

RELATED APPLICATIONS

This application is a continuation of U.S. application Ser. No. 16/995,550, filed on Aug. 17, 2020, issued as U.S. Pat. No. 11,505,122, which is a continuation of U.S. application Ser. No. 16/364,043, filed on Mar. 25, 2019, issued as U.S. Pat. No. 10,744,938, which is a continuation of U.S. application Ser. No. 15/664,053, filed on Jul. 31, 2017, issued as U.S. Pat. No. 10,239,450, which is a continuation of U.S. application Ser. No. 15/078,183, filed on Mar. 23, 2016, issued as U.S. Pat. No. 9,718,405, which claims the benefit of, and priority to, U.S. Provisional Application No. 62/136,750, filed on Mar. 23, 2015. This application is related to U.S. Pat. No. 9,286,521, entitled "Camera System for Large Vehicles," issued on Mar. 15, 2016. The above applications are incorporated herein by reference in their entirety.

BACKGROUND

Operating a vehicle such as a larger passenger vehicle entails particular difficulties and risks to the safety of the vehicle, the passengers boarding and disembarking from the vehicle, and nearby pedestrians during transit. Conventionally, mirrors are attached to various parts of the exterior of the vehicle to enhance the driver's view.

Mirrors, however, present their own challenges. First, a mirror and the arm or arms on which it is mounted protrude away from the vehicle. Mirrors can therefore be impact targets when the vehicle is in motion or is stationary. Also, the mirrors and the assemblies on which they are mounted may introduce drag and may thus decrease fuel economy.

Additionally, mirrors do not provide a unified view from inside the cabin for the driver. For example, if a conventional cross-view mirror is attached to the front right side of the vehicle and a second cross-view mirror is attached on the front left side of the vehicle, then in order to ensure that the vehicle has clearance on both sides and that no pedestrians are in harm's way, the driver must look in opposite directions, to the right and then to the left, and then ahead before proceeding, perhaps even repeating this process. Furthermore, the driver must look outside the cabin to view the mirrors positioned on the exterior of the vehicle, which requires looking through the side windows or a windshield, which may be dirty or wet or covered with snow or the like.

Further, different drivers will require mirrors set at different settings, or heights, depending on the driver's height and head position with respect to the driver's cabin. Therefore, each driver will need to adjust or re-adjust the external mirrors according to his or her body type or driving posture.

In addition, the mirrors will be typically quite dark in the early morning hours or in the evening hours. The driver's eyes will have to adjust to the different lighting conditions as the outside lighting changes throughout the day. The driver may have to contend simultaneously with different lighting conditions since the field of view of one of the external mirrors may be well lit at any particular time, while the field of view of another mirror may be poorly lit or not lit at all.

Camera systems have been used on the exteriors of school buses. As an example, the present assignee describes an exterior camera system and driver controls which afford a view substantially 360° around the school bus in its U.S. Pat. No. 9,286,521, incorporated herein by reference.

However, we have determined that improved systems for hazard detection, which address one or more of the foregoing issues and/or other related issues, are needed.

SUMMARY

The present invention provides, in some embodiments, hazard detection systems that can detect hazards such as pedestrians around a vehicle such as a large passenger vehicle. Whereas existing systems, such as mirrors, may provide adequate views for cars or small trucks such as pickup trucks, as described further below larger passenger vehicles such as buses have particular challenges with respect to views of the vehicle that are needed, for example, for safety when the vehicle is turning, and which may not be available through mirrors or other existing systems. Systems of the present invention provide various combinations of interior and exterior cameras/sensor systems and exterior graphic displays, warning/strobe lights and/or audible alerts associated therewith, strategically positioned around the interior and/or exterior of the vehicle and configured to detect hazards such as pedestrians that may be in the vehicle's path, and to alert the driver of the vehicle as well as the endangered pedestrians of a possible and/or imminent collision. Hazards may include, but are not limited to, a pedestrian, a possible collision with the pedestrian, an anticipated collision with the pedestrian, an object, object detection, vehicle detection, cyclist detection, pedestrian detection, potential collision avoidance, and potential collision detection.

In some embodiments, the invention provides a collision avoidance and/or pedestrian detection system for a large passenger vehicle, comprising a first sensor comprising at least one of a speed sensor, a global positioning system (GPS) sensor, an accelerometer, and a gyro sensor and sensing first data regarding at least one of a location and a driving characteristic of the vehicle; and a first detection system comprising a first housing configured to be mounted to the exterior surface of the vehicle; a first exterior sensing device comprising a first image sensor and enclosed in the first housing and configured to detect a first hazard in a first field of view responsive to first predetermined criteria; and a first interior driver warning system connected to the first exterior sensing device and including a first driver warning display mounted inside the vehicle generating at least one of a driver visual warning and a driver audible alarm configured to alert the driver when the first hazard is detected by the first exterior sensing device.

In some embodiments, the first detection system further comprises a first exterior pedestrian warning system connected to the first exterior sensing device and generating at least one of a pedestrian visual warning and a pedestrian audible alarm configured to alert the pedestrian when the first hazard is detected by the first exterior sensing device responsive to the first data sensed by said first sensor.

In some embodiments, the collision avoidance and/or pedestrian detection system further comprises a second sensor comprising at least one of a speed sensor, a global positioning system (GPS) sensor, an accelerometer, and a gyro sensor and sensing second data regarding at least one of a location and a driving characteristic of the vehicle; and a second detection system comprising a second housing configured to be mounted to the exterior surface of the vehicle; a second exterior sensing device comprising a second image sensor and enclosed in the second housing and configured to detect a second hazard in a second field of view responsive to second predetermined criteria; a second interior driver warning system connected to the second exterior sensing device and including a second driver warning display mounted inside the vehicle generating at least one of a driver visual warning and a driver audible alarm configured to alert the driver when the second hazard is detected by the second exterior sensing device; and a second exterior pedestrian warning system connected to the second exterior sensing device and generating at least one of a pedestrian visual warning and a pedestrian audible alarm configured to alert the pedestrian when the second hazard is detected by the second exterior sensing device responsive to the second data sensed by said second sensor.

In some embodiments, the collision avoidance and/or pedestrian detection system further comprises a third sensor comprising at least one of a speed sensor, a global positioning system (GPS) sensor, an accelerometer, and a gyro sensor and sensing third data regarding at least one of a location and a driving characteristic of the vehicle; and a third detection system comprising a first adjustable mount configured to be mounted to an interior surface of the vehicle; a first interior sensing device comprising a third image sensor and configured to detect a third hazard in a third field of view responsive to third predetermined criteria; a third interior driver warning system connected to the first interior sensing device and including a third driver warning display mounted inside the vehicle generating at least one of a driver visual warning and a driver audible alarm configured to alert the driver when the third hazard is detected by the first interior sensing device; and a third exterior pedestrian warning system connected to the first interior sensing device and generating at least one of a pedestrian visual warning and a pedestrian audible alarm configured to alert the pedestrian when the third hazard is detected by the first interior sensing device responsive to the third data sensed by said third sensor.

In some embodiments, the first exterior sensing device comprises a left rear exterior sensing device, the second exterior sensing device comprises a right rear exterior sensing device, and the first interior sensor device comprises a front center interior sensing device.

In some embodiments, said first detection system further comprises a first processor controlling said first interior driver warning system and said first exterior pedestrian warning system responsive to detection of the first hazard by said first exterior sensing device and the first data. In some embodiments, said second detection system further comprises a second processor controlling said second interior driver warning system and said second exterior pedestrian warning system responsive to detection of the second hazard by said second exterior sensing device and the second data. In some embodiments, said third detection system further comprises a third processor controlling said third interior driver warning system and said third exterior pedestrian warning system responsive to detection of the third hazard by said first interior sensing device and the third data.

In some embodiments, said first, second, and third detection systems operate independently of each other. In some embodiments, said first, second, and third detection systems comprise overlapping fields of view. In some embodiments, a severity of the driver visual warning, the driver audible alarm, the pedestrian visual warning, and the pedestrian audible alarm issued by each of said first, second, and third detection systems is configured to be responsive to a severity of the hazard detected by the associated sensing device.

In some embodiments, the collision avoidance and/or pedestrian detection system further comprises a fourth sensor comprising at least one of a speed sensor, a global positioning system (GPS) sensor, an accelerometer, and a gyro sensor and sensing fourth data regarding at least one of a location and a driving characteristic of the vehicle; and a fourth detection system comprising a second adjustable mount configured to be mounted to an interior surface of the vehicle; and a second interior sensing device comprising a fourth image sensor and configured to detect a fourth hazard in a fourth field of view responsive to fourth predetermined criteria, said first interior driver warning system connected to the second interior sensing device and configured to alert the driver when the fourth hazard is detected by the second interior sensing device; and said first exterior pedestrian warning system connected to the second interior sensing device and configured to alert the pedestrian when the fourth hazard is detected by the second interior sensing device responsive to the fourth data sensed by said fourth sensor.

In some embodiments, the second interior sensing device comprises a front left interior sensing device mounted to the left hand corner of the vehicle.

In some embodiments, said fourth detection system further comprises a fourth processor controlling said first interior driver warning system and said first exterior pedestrian warning system responsive to detection of the fourth hazard by said second interior sensing device and the fourth data.

In some embodiments, the collision avoidance and/or pedestrian detection system further comprises a third interior sensing device comprising an interior image sensor and a third adjustable mount configured to be mounted to an interior surface of the vehicle to detect events within the vehicle. In some embodiments, the third interior sensing device comprises a video capture system.

In some embodiments, the first hazard comprises at least one of a pedestrian, a possible collision with the pedestrian, an anticipated collision with the pedestrian, an object, object detection, vehicle detection, cyclist detection, pedestrian detection, potential collision avoidance, and potential collision detection.

In some embodiments, the invention provides a collision avoidance and/or pedestrian detection system for a large passenger vehicle, comprising at least two exterior sensing devices comprising cameras, detectors and/or sensors (hereinafter "cameras," "sensors," "detectors" and/or any combination thereof) each exterior sensing device comprising an image sensor and enclosed in an exterior camera and/or sensor assembly configured to be mounted to the exterior surface of the vehicle; at least one interior sensing device comprising a camera and/or sensor comprising an image sensor and configured to be mounted inside the vehicle to detect at least one of a potential hazard and a potential collision in the forward direction of the vehicle; and a driver display interface comprising at least two warning displays mounted inside the vehicle within the driver's field of vision, each warning display comprising at least one of a visual warning and an audible alarm configured to alert the driver when a hazard is detected by at least one exterior sensing device or interior sensor device connected thereto. At least one additional sensor, comprising at least one of a speed sensor, a GPS sensor, an accelerometer, and a gyro sensor, may also be provided, which in some embodiments may determine when one or more of the cameras, detectors and/or sensors is activated according to predetermined criteria.

In some embodiments, the collision avoidance and/or pedestrian detection system further comprises an exterior alarm system comprising at least two speakers and/or light systems mounted to the exterior surface of the vehicle, each speaker/light system configured to alert nearby pedestrians when a hazard is detected by at least one exterior sensing device or interior sensing device.

In some embodiments, the at least two exterior sensing devices comprises a left rear exterior camera enclosed in a left rear exterior camera assembly and a right rear exterior camera enclosed in a right rear exterior camera assembly.

In some embodiments, the exterior camera assembly comprises a housing body made of extruded aluminum or aluminum alloy, and top and bottom covers made of aluminum plate, said housing body comprising a window covered by a removable lens, through which the camera is directed. In some embodiments, the housing body comprises a flat-sealing gasket including a groove with synthetic rubber O-ring for sealing the top and bottom covers thereto. In some embodiments, the lens comprises glass and includes a hydrophobic coating on its exterior side. In some embodiments, the lens includes a heating element on its interior side on a portion not covering the window, and a thermostat attached thereto. In some embodiments, the exterior camera assembly is mounted to the exterior surface of the vehicle via a fixed mount comprising a mechanical teeth engagement mechanism, and the camera assembly is adjustable on the fixed mount via the mechanical teeth engagement mechanism. In other embodiments, the exterior camera assembly may be mounted to the exterior surface of the vehicle via an exterior hinge mount, comprising a fixed plate attached to the vehicle, a hinge, and a moveable plate attached to the camera assembly.

In some embodiments, the at least two exterior sensing devices further comprises a left side video camera mounted on or near the left rear exterior camera assembly and a right side video camera mounted on or near the left rear exterior camera assembly.

In some embodiments, the side cameras are activated only when a turn on that side is detected. For example, in some embodiments, the left rear exterior camera is disengaged unless the vehicle is committed to a left turn and/or the right rear exterior camera is disengaged unless the vehicle is committed to a right turn. The vehicle may be considered committed to a turn when one or more sensors (e.g., a gyro sensor) determine that the turning angle is above a predetermined angle for the turn (e.g., 30°; in some embodiments, this angle may be different for left and right turns).

In some embodiments, at least one of the exterior sensing devices and/or interior sensing devices is disengaged unless one or more sensors (e.g., a speed sensor and/or an accelerometer) determine that the vehicle is traveling above a predetermined speed or acceleration (e.g., 12-15 mph).

In some embodiments, a field of view of at least one exterior sensing device or interior sensing device is configured or adjusted to be narrower when the vehicle is moving forward and the field of view is configured or adjusted to be wider when the vehicle is turning.

In some embodiments, the invention provides a collision avoidance and/or pedestrian detection system for a large passenger vehicle, comprising at least two exterior sensing devices each comprising an image sensor and removably fitted inside an exterior camera assembly configured to be mounted to the exterior surface of the vehicle via a fixed mount; at least one interior sensing device comprising an image sensor and configured to be mounted inside the vehicle to detect at least one of a potential hazard and a potential collision in the forward direction of the vehicle; at least one additional sensor, comprising at least one of a speed sensor, a global positioning system (GPS) sensor, an accelerometer, and a gyro sensor; and a driver display interface comprising at least two warning displays mounted inside the vehicle within the driver's field of vision, each warning display comprising at least one of a visual warning and an audible alarm configured to alert the driver when a hazard is detected by at least one exterior sensing device or interior sensing device connected thereto. In some embodiments, the system further comprises an exterior alarm system comprising at least two speakers mounted to the exterior surface of the vehicle, each speaker configured to alert nearby pedestrians when a hazard is detected by at least one exterior sensing device or interior sensing device connected thereto.

In some embodiments, the system comprises at least two interior sensing devices including a front center interior sensing device and a front left interior sensing device. In some embodiments, the front center interior sensing device is mounted at or near the center of the windshield on an interior track mount and the front left interior sensing device is mounted at or near the upper left hand corner of the windshield on an interior hinge mount. In some embodiments, at least one of the front center interior sensing device and the front left interior sensing device comprise a sensor system configured to provide at least one of a forward collision warning, a lane departure warning, a headway alert, and a pedestrian collision warning. In some embodiments, the front left interior sensing device comprises a sensor system configured to provide only a pedestrian collision warning. In some embodiments, the at least one interior sensing device comprises a dual vision camera to detect events within the vehicle.

In some embodiments, the driver display interface comprises a left warning display, a center warning display, and a right warning display, each comprising an LED backlit pedestrian graphic indicator and a piezoelectric alarm. In some embodiments, the center warning display includes an eye watch indicator in communication with a front center interior sensing device comprising a sensor system configured to provide at least one of a forward collision warning, a lane departure warning, a headway alert, and a pedestrian collision warning.

In some embodiments, the exterior alarm system comprises a left rear speaker, a front center speaker, and a right rear speaker, each having an amplifier connected thereto. In some embodiments, the exterior alarm system comprises a multiple channel system configured to provide predetermined audible alerts through one or more of the speakers responsive to eight predetermined triggers comprising yellow/warning alerts and red/urgent alerts from four different cameras including a left rear exterior camera, a right rear exterior camera, a front left interior camera, and a front center interior camera. In some embodiments, the exterior alarm system is configured to automatically adjust the speaker volume depending on the location of the vehicle determined by one or more sensors (e.g., a GPS sensor).

In some embodiments, the sensing devices are each independent of one another. In some embodiments, at least one sensing device comprises a field of view that overlaps in part with the field of view of at least one other sensing device. In some embodiments, the driver display interface comprises at least one of a two-stage visual warning comprising a yellow graphic warning and a red graphic warning and a two stage audible alarm, comprising a yellow alarm and a red alarm louder than the yellow alarm. In some embodiments, the exterior alarm system provides a two-stage audible alert, comprising a yellow warning message and a red urgent message louder than the yellow message.

In some embodiments, the invention provides an exterior housing for a detection system, said housing comprising a housing body comprising extruded aluminum or aluminum alloy and including a window opening on one side thereof; a top cover comprising aluminum plate; a bottom cover comprising aluminum plate; a lens inside the housing body, removably positioned behind the window with a portion of said lens covering the window; and a sensing device comprising an image sensor enclosed in the housing body and removably positioned behind the lens to provide a first field of view through the lens. In some embodiments, the housing body comprises a flat-sealing gasket including a groove with synthetic rubber O-ring for sealing the top and bottom covers thereto. the lens comprises glass and includes a hydrophobic coating on its exterior side. In some embodiments, the housing further comprises a heating element engaging an interior side of the lens on a portion not covering the window, and a thermostat attached thereto. In some embodiments, the housing further comprises a fixed mount comprising a mechanical teeth engagement system, wherein the housing is adjustable on the fixed mount via the mechanical teeth engagement system. In some embodiments, the housing further comprises a video camera mounted to the bottom cover to provide a second field of view that overlaps in part with the first field of view and may provide verification for one or more other sensing devices. In some embodiments, said housing body comprises a thermally conductive material so that said housing acts as a heat sink by remaining in full or substantially full direct or indirect contact with at least one side of said sensing device, while the housing remains in full or substantially full contact directly or indirectly with a thermally conductive portion of the vehicle.

In some embodiments, the invention provides a method of alerting a bus driver to pedestrians in a plurality of dynamic bus danger zones while the bus is moving, comprising detecting, using a front interior sensor positioned to detect a first pedestrian to the front of the bus and directed toward the front area of the bus, whether the first pedestrian is located in a dynamic front danger zone with respect to movement of the bus while the bus driver is operating the bus; detecting, using a left exterior sensor positioned to detect a second pedestrian to the left of the bus and directed toward the left frontal area of the bus, whether the second pedestrian is located in a dynamic left danger zone with respect to the movement of the bus while the bus driver is operating the bus; detecting, using a right exterior sensor positioned to detect a third pedestrian to the right of the bus and directed toward the right frontal area of the bus, whether the third pedestrian is located in a dynamic right danger zone with respect to movement of the bus while the bus driver is operating the bus; determining, using at least one additional sensor comprising at least one of a speed sensor, a global positioning system (GPS) sensor, an accelerometer, and a gyro sensor, a path of the bus and whether the bus is in danger of a collision with at least one of the first, second and third pedestrians; and triggering at least one interior alarm for the bus driver corresponding to at least one of the plurality of danger zones where at least one of the first, second and third pedestrians is located when it is determined that a collision between the bus and at least one of the first, second and third pedestrians is likely or imminent based on the path of the bus, and enabling the driver to determine a location of the danger zone to avoid the collision with the pedestrians.

In some embodiments, the method further comprises triggering at least one exterior alarm for the pedestrians corresponding to at least one of the plurality of danger zones where at least one of the first, second and third pedestrians is located when it is determined that a collision between the bus and at least one of the first, second and third pedestrians is likely or imminent based on the path of the bus, and enabling the pedestrians to determine the location of the danger zone to avoid the collision with the bus. In some embodiments, the method further comprises recording the outputs of each of the front sensor, the left sensor and the right sensor. In some embodiments, the method further comprises displaying the outputs of each of the front sensor, the left sensor and the right sensor on a driver display. In some embodiments, the method further comprises recording one or more video feeds from one more video capture devices substantially corresponding to detection areas of one or more of the front sensor, the left sensor and the right sensor; and comparing the one or more video feeds with one or more signals produced by one or more sensors from the substantially corresponding detection areas to determine and verify whether the sensors are correctly triggering the alarm for a potential collision or to avoid the collision.

Various embodiments for a detection system, such as a pedestrian detection system or other object detection and/or avoidance system for a vehicle, and various embodiments for a method of use thereof, are provided. The system includes a plurality of sensors configured to detect pedestrians around the vehicle, and a plurality of alarms corresponding to the plurality of sensors, configured to alert a driver if the vehicle is at risk of colliding with a pedestrian. The plurality of sensors includes one or more front sensors configured to detect pedestrians in the front or substantially front area of the vehicle, one or more left side sensors configured to detect pedestrians along the left or substantially left side of the vehicle and one or more right side sensors configured to detect pedestrians along the right or substantially right side of the vehicle. The vehicle may include, for example, a large passenger vehicle such as a commuter bus, a school bus and/or truck, and the sensors may include, for example, sensors within cameras or other devices and/or sensor devices. As used herein, the pedestrian may include, for example, a cyclist.

In some embodiments, the system and/or method provides rapid notification to the driver in time for the driver to stop the vehicle and/or provide a predetermined corrective action, including an automatic emergency braking mode. In some embodiments, one or more sensing devices comprises a sensing camera, a laser sensing device, a radar sensing device and/or other sensing device that optionally includes interpreting data processing.

In some embodiments, the system and/or method resolves intersectional issues. For example, with respect to left turns of the vehicle, the system and/or method detects a pedestrian crossing the street parallel but in the opposite direction the bus is traveling that is potentially hidden from view by, for example, the pillar or lost from view as a result of driver distraction. In addition, the system and/or method detects a pedestrian crossing the street parallel and in the same direction of travel that can be hit by the left side of the body of the bus as it turns. Again, the pedestrian is potentially hidden from direct view of the driver and the system/method is able to detect the pedestrian and notify the driver and/or perform a corrective action.

In some embodiments, with respect to right hand turns of the vehicle, the system and/or method detects a pedestrian crossing the street parallel and in the same direction as the bus is starting its turn. The right side of the bus can "track" into the pedestrian and knock them down, with the pedestrian possibly being run over by the vehicle. The system and/or method detects the pedestrian and alerts the driver and pedestrian and/or initiates a corrective action. In some embodiments, the system and/or method detects the pedestrian and alerts the driver and the pedestrian when the pedestrian is traveling in the opposite direction, similar to the detection of the left hand turn of the vehicle.

In some embodiments, a system and/or method includes two or three cameras/sensing devices placed strategically on the interior of the bus on the windshield. For example, the cameras/sensing devices may comprise one or more detector systems that provide features such as lane departure warning, headway monitoring, collision avoidance, sign reading and/or pedestrian detection. In some embodiments, the cameras/sensing devices placed at either side of the windshield are set up with an angular tilt towards the corners or A Pillars of the vehicle (e.g., a 45 degree view with respect to the driver) to capture a view of pedestrians disembarking in the crosswalk at the opposite side of the intersection as the bus or vehicle starts either a left or right turn. These side or angular cameras/sensing devices may optionally have basic functions of the detector system turned off in a default state and only activate a pedestrian detection feature and be programmed specifically for a predetermined range of coverage specific for turning situations as described below in more detail. In addition, these side angular cameras/sensing devices can be advantageously mounted on the exterior of the vehicle/bus near the rear wheel on each side.

In some embodiments, the cameras/sensing devices are mounted to the exterior of the vehicle using robust housings to enable the cameras/sensing devices to perform "tracking" activities of the vehicle/bus during the turns. In some embodiments, the camera/sensing device housing comprises extruded aluminum for lightness and strength. The housing may include an adjustment mechanism with an incremental angular adjustment of, for example, 1 degree increments (e.g., via teeth engagement between housing and base) in the lateral plane. In some embodiments, the housing incudes an adjustment mechanism for the vertical direction, in addition to, or instead of, the lateral plane adjustment mechanism. The housing may comprise weather proofing, for example, to IP-69 rating, and is robust to withstand impacts of driving, washes and the like. In some embodiments, the housing includes a lens on the front made of, for example, glass. This glass may be treated with a hydrophobic coating so that water sheets off and does not leave marks or other image-distorting remnants or spots. The housing can also act as a heat sink by being in full contact with one side of the camera/sensing device and is used to hide wiring.

In some embodiments, the system and/or method resolves and/or detects danger zones around the vehicle. For example, in some embodiments, the intersectional layout of the cameras and/or sensing devices provides good detail on the possible presence of pedestrians in the crosswalk. The layout can enable the cameras/sensing devices to overlap detection/views for the possible pedestrian locations. For example, in some embodiments, the right side of the vehicle presents the situation where an unaware pedestrian, typically distracted by either modern technology like a phone, tablet or music device, enters the crosswalk as a bus alongside him starts making or is in the middle of making a right turn. The pedestrian, perhaps looking down at his device, keeps walking as the body of the bus "tracks" sideways during the turn and actually moves closer to the curb towards the pedestrian. Without the system and/or method of the present invention, the pedestrian may walk into the side of the bus, be knocked down and possibly have his/her body/legs end up under the bus and be rolled over by the rear wheels.

In some embodiments, the system and/or method resolves and/or detects danger zones including a forward blind spot on the left side of the vehicle where a pedestrian who disembarks from the curb and walks in a direction opposite the travel of the bus. Specifically, the pedestrian continues in the crosswalk and as the bus penetrates the intersection and starts the left turn, the pedestrian remains in a blind spot as he moves and the bus turns. The corner area defined by the pillar and neighboring parts of the bus come into contact with the pedestrian. The pedestrian is sometimes not in the blind zone but is actually visible yet is hit because the driver may be focusing on looking to his left after deciding to make the turn. Accordingly, the system and/or method detects and/or alerts the driver and/or pedestrian for these danger situations as well.

In some embodiments, the system and/or method provides a graphic driver interface with a series of readouts showing the presence of pedestrians along with audible alerts. These readouts are distributed in order around the cockpit to present the alert in conjunction with direction the driver is looking at the time. For example, in some embodiments, the left side readout is mounted to the left A pillar or B pillar near the left mirror where the driver might be looking during a left turn and similarly for a right turn. In some embodiments, a center readout includes a combination of oversized pedestrian graphic and a readout for collision alerts, lane departure warning and/or headway monitoring and the like.

In some embodiments, the system and/or method provides audible alerts placed near the visual alerts or more strategically near the drivers head to present an increased directional awareness of the location of the danger. Outputs from the system can also be made in the form of seat vibration and/or other forms of awareness such as seat headrest speakers, and the like. In some embodiments, a graphic driver interface is provided in two visible stages: the system has awareness and warning stages. For example, the pedestrian is lit in yellow/amber on a corresponding display for awareness of a pedestrian in range of the danger zone. The system turns to red on the display and warns audibly if it calculates that the pedestrian and bus are on a collision course. This calculation is based on a determination that the speed of the bus and trajectory of the pedestrians movement that the "time to collision" (TTC) is falling within the preset threshold or other criteria indicating that a collision is possible or probable.

In some embodiments, the system and/or method advantageously avoids or minimizes false positives. A false positive is a detection warning when no risk is present. The system parameters are set to be balanced between sensitivity and realism/practical considerations. That is to say, the wider the area of coverage and sensitivity, the greater the sensing during normal driving that will lead to false positives. Driving straight with a side facing camera and/or sensing device can lead to false positives when the cone of coverage is too wide. The system and/or method determines and/or estimates TTC and eliminates/reduces false positives by cutting off the side cameras and/or sensing devices above a preset speed, for example, 12-15 mph based on trajectories that, given the increased speed of straight travel, may become too inclusive and cognizant of pedestrians even 15-20 feet away alongside the bus.

In some embodiments, the system and/or method eliminates/reduces false positives by cutting off the side cameras and/or sensing devices when the vehicle is detected to be moving in excess of a preset speed, and turning on the side camera/sensing device outputs when the vehicle is detected to be in the process (e.g., right before, during and/or right after) a turning activity. This detection can happen based on steering wheel turn sensing, gyroscopic sensing or actual wheel sensors connected to the vehicle electronic bus/wiring system and/or communication multiplex system. The determination of how much turn to use to cut off the side cameras/sensing devices is variable and user selectable. For example, in some embodiments, the side cameras/sensing devices are cut off except when the vehicle is committed to a full turn, e.g., when the driver needs to turn the vehicle more than 10 degrees or other amount to pull into a bus stop. In some embodiments, the system and/or method cuts off the side cameras/devices at or near a bus stop. In some embodiments, once the turn goes past 30 degrees and/or the steering wheel is turned a predetermined amount, the system/method outputs are triggered to activate the side cameras/devices for pedestrian detection and/or alerts. In some embodiments, the system/method outputs directed towards zones that are not in the path of the turn are shut off or their sensitivity reduced to avoid triggering alarms where collisions are unlikely. In some embodiments, the system and/or method remains active and the side cameras/sensing devices continue to collect and store data, but the processors ignore the data collection for the determination of a potential collision when the side cameras/sensing devices are cut off. That is, in some embodiments, the data from the side cameras/sensing devices are merely ignored for a predetermined time period determined by when the potential for false positives is unacceptably high as programmed by the user or preset by the system/method.

In some embodiments, the system and/or method outputs are responsive to, or change in response to the speed or acceleration of the turning bus and/or the detection of a changing turn, such as a first or higher order derivative of the turning angle with respect to time. For example, side cameras/sensing devices may turn on or increase their sensitivity in response to a sharp turn and/or an increasing turning speed, and vice versa.

In some embodiments, cameras and/or sensors with predetermined fields of view, such as 25-45 degrees of view, are used, and multiple cameras/sensors may be utilized and their images/sensor data may be stitched together or used in combination to form a composite field of view and/or composite sensor reading for use in detecting pedestrians and/or other objects. In some embodiments, the field of view is substantially 25-65 degrees, defined by an approximate 10% degree variation. In some embodiments, the field of view is about 35-45 degrees, defined by an approximate 2-5% degree variation. For example, in some embodiments, a camera/sensor layout configured to detect risks and/or pedestrians specific to buses making left and right turns includes three front view cameras/sensors and side-mounted cameras/sensors. These three front view cameras/sensors include a center camera/sensor facing forward and two cameras/sensors, each facing in a front/side angular direction capturing both front and respective side views for each side of the vehicle. Each front/side facing front camera/sensor is aimed across the hood of the bus, and provides awareness of pedestrians in a crosswalk as the bus enters an intersection from a frontal and side perspective. Additional side-mounted cameras/sensors are optionally mounted near the rear of the bus, face forward, and have fields of view that run along the side of the bus, including the area immediately next to the bus and forward therefrom. Any or all of the cameras/sensors may be positioned with a vertical angular orientation and directed toward the desired target area. Various camera/sensor orientations, locations and/or angles may be used.

The pedestrian detection system is configured to provide alarms, visual, audible or otherwise, when a pedestrian is in a particular danger zone and when the bus is at risk of colliding with a pedestrian. The system therefore includes a driver interface that may include alarms corresponding to the locations of any at-risk pedestrians.

To avoid false positives, in some embodiments, certain cameras/sensing devices are disengaged or certain alarms or system outputs are deactivated. For example, when the bus is in transit and traveling straight ahead, there is little risk that a pedestrian will impact the side of the bus. Accordingly, in some embodiments, the-side mounted cameras/sensing devices may be desensitized or disengaged, and/or their alarms deactivated, except when a turn is detected. For example, a turn may be detected using steering wheel turn sensing, gyroscopic sensing or wheel sensors.

Any or all of the cameras/sensing devices may be mounted in the interior of the vehicle, the exterior of the vehicle, or some combination. In some embodiments, any or all of the cameras/sensing devices are each separated into two or more distinct assemblies. For example, a first assembly or set of assemblies may include a lens and an imaging processor, and may be placed in a small housing on the vehicle exterior in various locations, while a second assembly including the control circuitry may be located in the vehicle interior, for example, on the wall opposite the sensors, cameras and/or first assemblies, in an enclosure connected, for example, by a long cable and/or wireless connection to the first assembly or set of assemblies, or other suitable location. Internal cameras/sensing devices may be mounted to a window, such as a windshield. External camera/sensing device housings may consist of robust housings made of extruded aluminum for lightness and strength. A camera/sensing device may slide into a given housing, and the assembly may be mounted to the exterior of the vehicle. In some embodiments, a tooth engagement system and locking bolt are utilized to pivot the mounted camera/sensing device in order to adjust the camera/sensing device's aim.

The driver interface may include one or more monitors that display the camera/sensor feeds of any individual or combination of cameras/sensors. The feeds displayed on a given monitor may be permanently fixed, programmable or selectable by the driver in real-time. The driver interface may provide the driver with controls that zoom or pan any or all of the cameras/sensors, and may include a default setting that the driver can activate conveniently, for example, with the push of a button.

The pedestrian detection system may include memory such as a digital video recorder (DVR). The DVR may be activated manually or automatically, for example, in response to detected pedestrians or in response to any vehicle activity.

The pedestrian detection system may include video cameras such as test cameras mounted near the cameras/sensing devices, when the cameras/sensing devices do not include video capture functionality. For example, two video cameras may be mounted in the rear facing forward, and two video cameras may be mounted in the front facing rearward, all of which may be oriented toward the desired target areas. Optionally, a video camera may additionally be mounted inside the cabin behind the driver and capturing the driver and the graphic driver interface. These video cameras can be used to monitor driver reactions to various events, in the absence or presence of various alarm conditions, for various purposes such as testing, driver training, or otherwise. In some embodiments, the video feeds are, for example, displayed to the driver during operation, stored for later review, for example, to determine what happened during an accident, used for real-time fleet manager review, and the like.

The pedestrian detection system may interface with a fleet management system. For example, if a fleet of buses each includes a local pedestrian detection system, each bus's local system may communicate with a fleet management control system during transit, at defined times and/or at defined locations. The individual bus systems may upload situational awareness, camera/sensor feeds or other useful data.

Additional, alternative and/or optional features and advantages are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of preferred embodiments of the assembly, will be better understood when read in conjunction with the appended drawings. For the purposes of illustrating certain aspects of the present invention, preferred embodiments are shown in the drawings. It should be understood, however, that the assembly is not limited to the precise arrangement, structures, features, embodiments, aspects, and methods shown, and the arrangements, structures, features, embodiments, aspects and methods shown may be used singularly or in combination with other arrangements, structures, features, embodiments, aspects and methods.

The drawings are not necessarily drawn to scale and are not in any way intended to limit the scope of the invention, but merely to clarify various exemplary embodiments of the invention. In the drawings.

DETAILED DESCRIPTION

With reference to the above-described drawings, various embodiments of the invention are described below.

Particular challenges arise when large vehicles such as buses enter an intersection to make a left hand or a right hand turn. For example, for left hand turns, a pedestrian crossing the street parallel with the bus but in the opposite direction of the bus's travel is potentially hidden from view by the bus's pillar or lost from view as a result of driver distraction. A pedestrian crossing the street parallel with the bus and in the same direction of travel can be "tracked" over by the left side of the body of the bus as it turns. Again, the pedestrian is hidden from direct view of the driver and can only be potentially seen in the mirror if the driver happens to look. For right hand turns, the primary pedestrian risk occurs as the pedestrian crosses parallel and in the same direction as the bus, as the bus starts its turn. The right side of the bus "tracks" into the pedestrian and knocks him down, with a potential catastrophe occurring if the rear wheels roll over the pedestrian. An impact can also occur with a pedestrian crossing the street parallel but in the opposite direction of the bus's travel, though this type of impact is less likely during a right hand turn than during a left hand turn. In some embodiments, the system can detect pedestrians in these situations, which are potentially hidden from the driver's view, and alert the driver and/or the pedestrians when needed.

Figure 1:
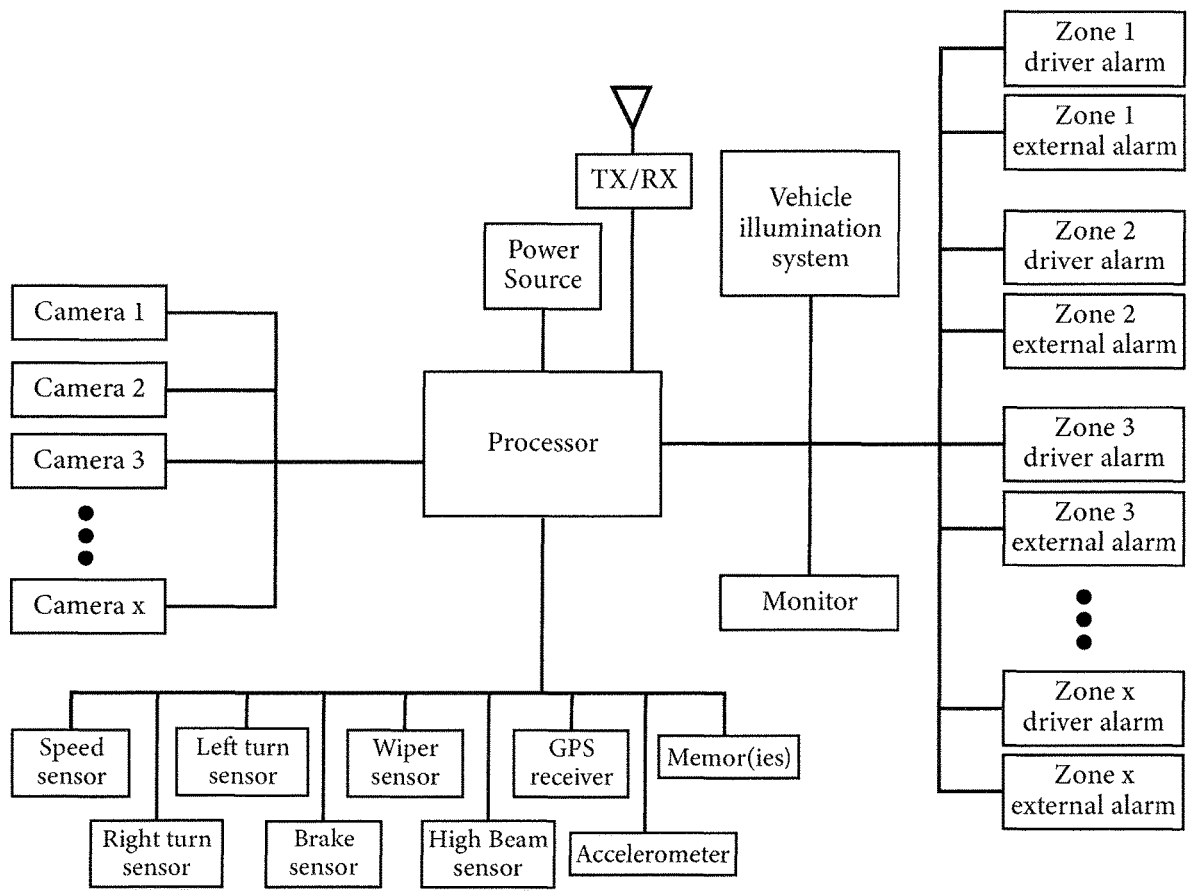
FIG. 1 is a schematic of a pedestrian detection system according to some embodiments.
Figure 2:
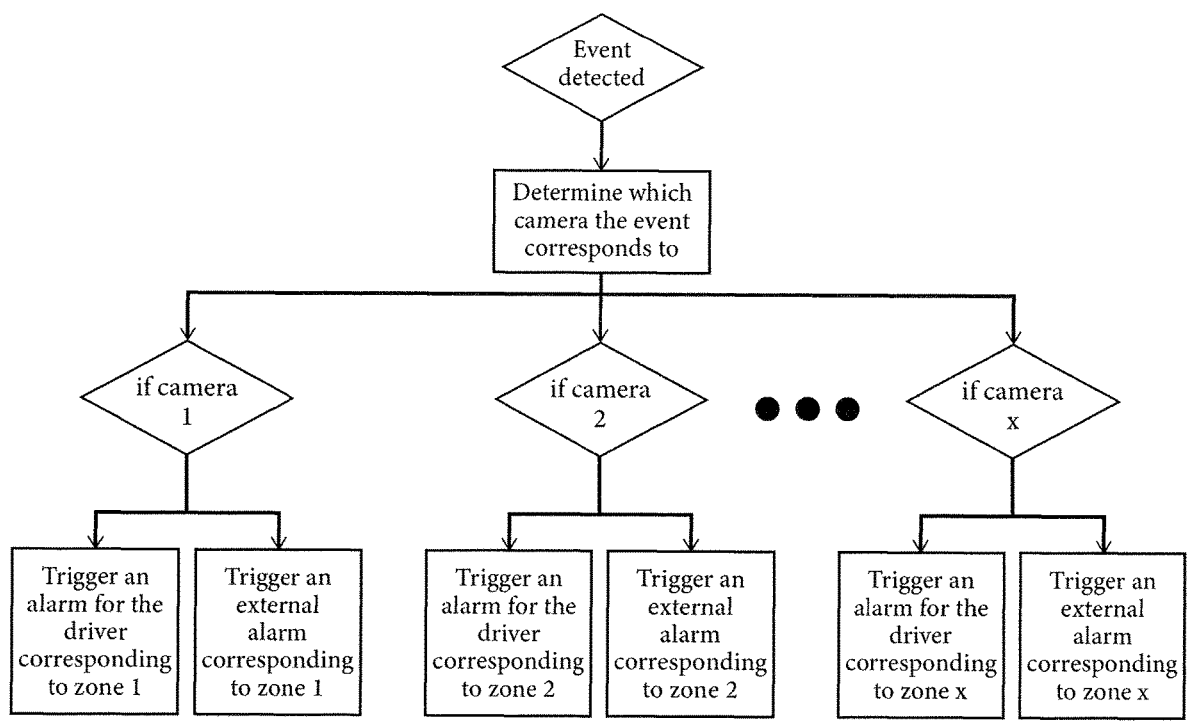
FIG. 2 is a flow chart depicting a pedestrian detection method according to some embodiments.
Figure 3:
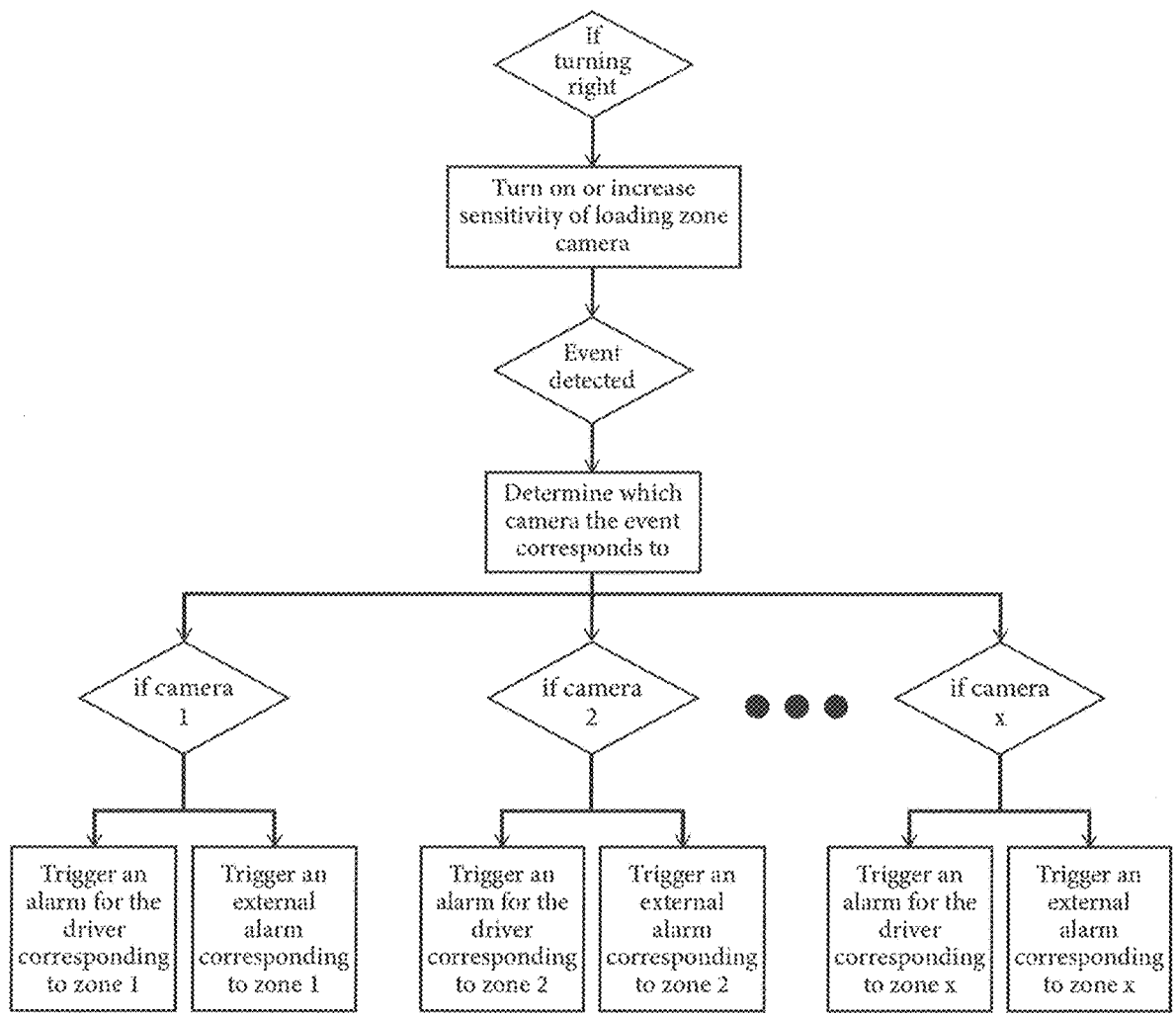
FIG. 3 is a flow chart depicting a pedestrian detection method according to some embodiments.

A hazard detection system for large vehicles, such as a pedestrian detection system for buses, and a method of detecting hazards such as pedestrians are provided that involve a plurality of sensors located at various locations on the vehicle. FIG. 1 is a schematic of a pedestrian detection system according to some embodiments. FIGS. 2 and 3 are flow charts depicting a pedestrian detection method according to some embodiments of the invention. When the system determines that an event has occurred, for example, that a hazard or pedestrian is in a danger zone or on a collision course with the vehicle, the system determines where the hazard or pedestrian is located and triggers one or more alarms, such as a driver alarm and/or an external alarm corresponding to the location of the hazard or pedestrian. The vehicle is sometimes described herein as a bus, such as a commuter bus; however, the present invention will be useful to any truck or vehicle, including a passenger vehicle such as a school bus, van, minivan, SUV, RV, or automobile. The hazard may include, for example, a pedestrian, a possible collision with the pedestrian, an anticipated collision with the pedestrian, an object, object detection, vehicle detection, cyclist detection, pedestrian detection, potential collision avoidance, and/or potential collision detection.

Referring to FIG. 1, a hazard detection system according to the present invention may include a plurality of cameras/sensors located at various locations on a bus and arranged and oriented to detect hazards such as pedestrians external to the vehicle. In some embodiments, the cameras/sensors are independent even though they may have some overlapping fields of view. The plurality of cameras/sensors may be communicatively coupled to one or more processors (depicted, e.g., in FIG. 1 as one block labeled "processor") that receive signals from the plurality of cameras/sensors and determine whether there is a risk of a collision. In some embodiments, there may be a processor for each camera/sensor, rather than one central processor that coordinates all of the cameras/sensors. In other embodiments, there may be a plurality of processors, but more than one camera/sensor may be associated with a single processor; for example, a first group of cameras/sensors may be associated with a first processor, and a second group of cameras/sensors may be associated with a second processor, and so on. The processors may be coupled to a power source and communicatively coupled to a plurality of driver alarms and/or warning devices that correspond to the location of the risk of collision. The driver alarms and/or warning devices may correspond to the plurality of cameras/sensors on a one-to-one basis. In other embodiments, multiple cameras/sensors may map to individual alarms and/or warning devices and vice versa. In some embodiments, the cameras and/or various situational sensors such as a speed sensor, a left turn sensor, a right turn sensor, a brake sensor, a wiper sensor, a high beam sensor, a GPS receiver (e.g., a StarLink Tracker) and/or an accelerometer (G-sensor), and associated memory/memories are communicatively coupled to the processors. The processors may be communicatively coupled to a transmit/receive (TX/RX) antenna, a vehicle illumination system and/or one or more monitors. In some embodiments, the data generated by one or more of the situational sensors are transmitted to one or more processors associated with one or more of the detectors/cameras/sensors or transmitted directly to one or more of the detectors/cameras/sensors to provide information used to determine whether to trigger the detection of the hazard and/or warning alarm and/or to provide information used to determine the sensitivity of the detectors/cameras/sensors when triggering the detection and/or warning alarm to avoid collision.

In some embodiments, the plurality of detectors/cameras/sensors includes multiple detectors/cameras/sensors communicatively coupled to one or more warning devices, optionally within the field of view of the driver when the warning device is visual as opposed to auditory. In some embodiments, a particular warning device is configured to issue a warning based on the detection of a hazard by a single detector/camera/sensor. In other embodiments, the warning device is configured to issue a warning only when two or more detectors/cameras/sensors detect the same hazard and/or detect multiple hazards in the same and/or adjacent danger zones. In some embodiments, the plurality of detectors/cameras/sensors may be communicatively coupled to a plurality of processors that are communicatively coupled to the one or more warning devices, and which determine when to issue a warning. For example, in some embodiments, the processors are configured to issue a warning when one or more detectors/cameras/sensors detects a hazard. Alternately, the processors may be configured to issue a warning only when two or more detectors/cameras/sensors detect the same hazard and/or detect multiple hazards in the same and/or adjacent danger zones.

The processors may receive inputs from one or more trigger signal indicators, for example, the shifting of the bus from a park gear to a first gear, the opening or closing of a vehicle door, the turning on or off of an amber or red flashing school bus light to indicate boarding/disembarking, or the like. The processors may also receive an input from a manual override, which allows a driver to control the cameras/sensors, monitors, external lighting, audible alerts and external warning devices or the like, for example, with a control console, by opening a vehicle door, or otherwise. An adjustable function timer such as a processor clock can be adjusted to provide timing signals to the processors and/or any controlled functions that require timing.

The processors may provide integrated control over the cameras/sensors, monitors, lighting, audible alerts, and other external warning systems of the vehicle. Accordingly, in some embodiments, the processors may control the ON/OFF state and operation of any camera/sensor and monitor systems, the ON/OFF state and operation of any vehicle illumination system including lighting strips and floodlights, the ON/OFF state and operation of any audible alert system including any driver alerts and/or any external vehicle alerts for pedestrians and passengers boarding or disembarking from the bus, and the ON/OFF state and operation of any auxiliary driver aids or other external devices, for example, a flashing amber or red bus light, a crossing gate or stop sign mounted from the exterior of the bus, or the like. For example, when the bus door is opened, a processor may receive a trigger signal from a trigger signal indicator, and the processor may then activate a passenger boarding mode, including turning on the red or amber flashing school bus lifts, turning on a lighting strip, switching a monitor to display a camera/sensor feed, deploying the crossing gate mounted on the driver s side of the exterior of the bus, turning on an audible alert to inform pedestrians that it is safe to approach the bus or to cross the street, and the like. Similarly, the receipt of a signal indicating the bus door closing may cause the processor to output an alternate set of instructions.

The various processor connections, though illustrated as separate individual connections, may consist of a single signal bus or one or more interfaces that communicate via a wired or wireless connection with the systems that control the various system components. Additionally provide feedback signals or messages to the processors to indicate a receipt/non-receipt of a signal, a message or command, a failure or malfunction of the controlled system, a camera/sensor reading or other external condition, or the like. In some embodiments, a processor may control an automatic emergency braking mode, automatically engaging the vehicle brakes, for example, to avoid a potential collision.

The cameras and/or sensors used for hazard and/or pedestrian detection are generally a network of cameras and/or sensors, but may include any object detecting sensor or sensor system, including optical sensors, thermal sensors, proximity sensors, acoustic sensors, magnetic sensors or otherwise, and alone or in combination with one another. For example, an optical system may emit infrared, red or laser light, and the target breaks the light beam or reflects the beam back to the sensor to activate the sensor output. Likewise, a radar system may emit radio waves in a similar manner to determine the range, altitude, direction, or speed of objects.

In some embodiments, a plurality of cameras/sensors are mounted at various locations on a bus and oriented in such a way as to detect external hazards such as pedestrians. The cameras/sensors may be any type of camera and/or sensor that provides an instant signal responsive to objects in its field of view. For example, the cameras/sensors may be digital cameras that provide a real-time digital signal, via an associated processor, to a system display or speaker, optionally including, in some embodiments, to one or more monitors in the driver's cabin. In some embodiments, the cameras/sensors may comprise a standard system/sensor system incorporated herein by reference and which offer features such as Forward Collision Warning, Lane Departure Warning, Headway Alert, Pedestrian Detection, Enhanced. Object Detection, Automatic Headlight Control, Traffic Sign Recognition, Adaptive Cruise Control, Pre-Crash Collision Mitigation, Autonomous Braking, Blind Spot Detection, Lane Change Merge Assist, Rear Cross Traffic Alert, and/or Rear Pre-Crash Sensing which offer features such as Forward Collision Warning, Pedestrian and Cyclist Collision Warning, Headway Monitoring Warning, Lane Departure Warning, Intelligent High-Beam Control, Speed Limit Indicator, and/or Traffic Sign Recognition, or other systems/sensor systems that can provide detection of objects.

Figure 19:
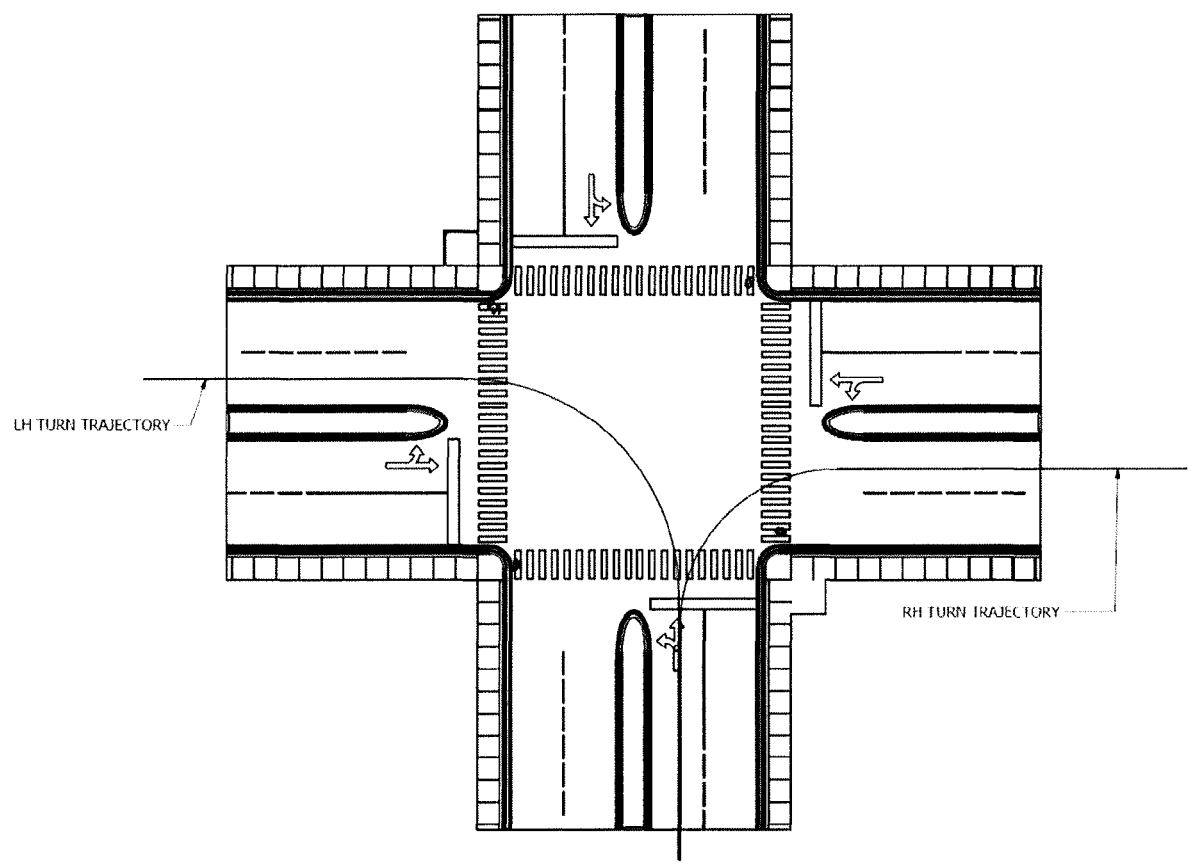
FIG. 19 is a top view of an intersection and left and right turn trajectories for a vehicle according to some embodiments.
Figure 20:
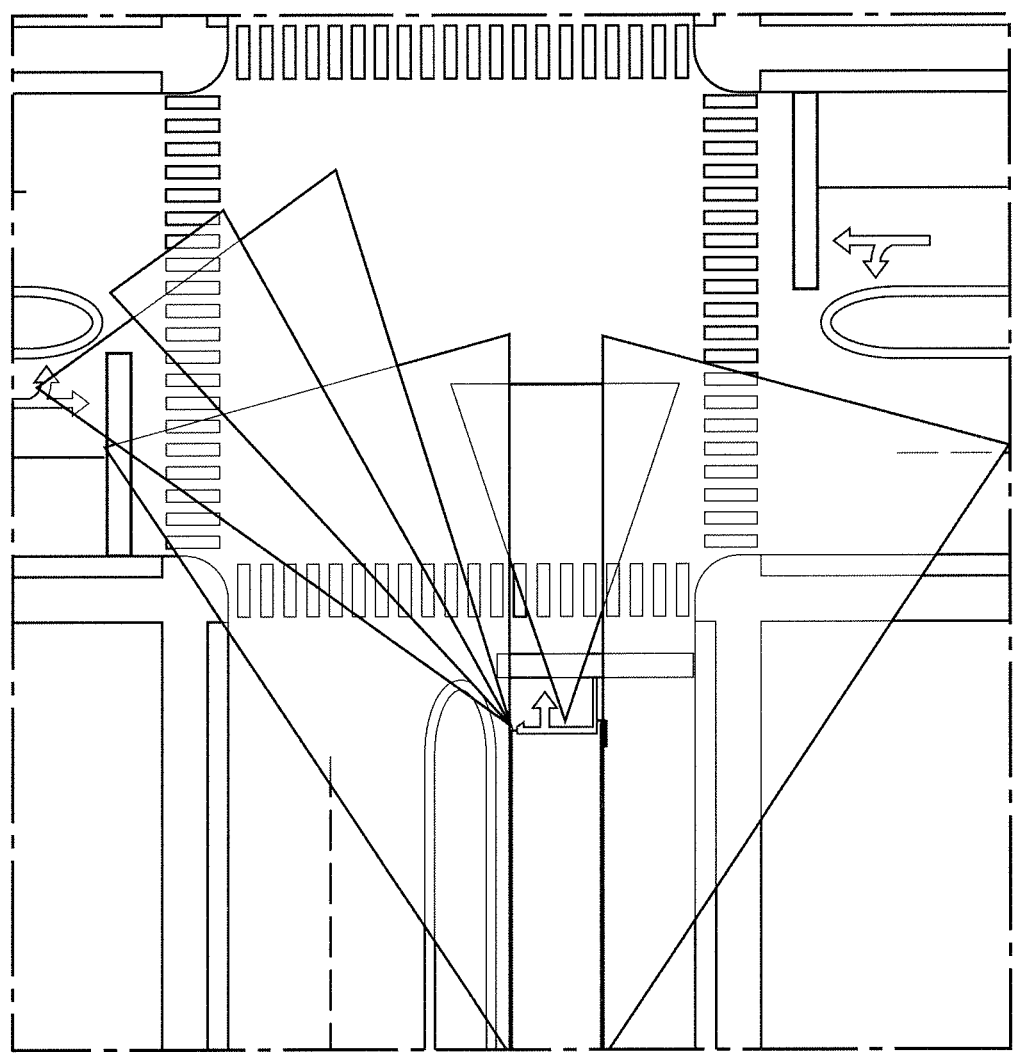
FIG. 20 is a top view of a vehicle with cameras/sensing devices and their fields of view in use according to some embodiments.
Figure 21:
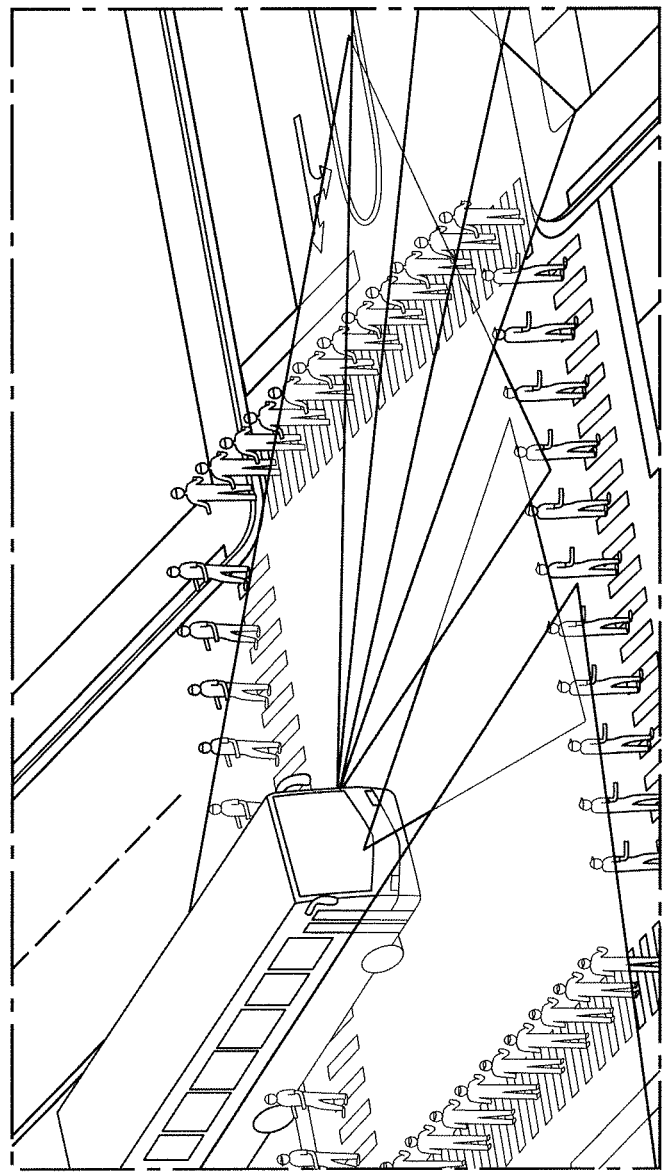
FIG. 21 is a perspective view of a vehicle with cameras/sensing devices and their fields of view in use during a left turn according to some embodiments.
Figure 22:
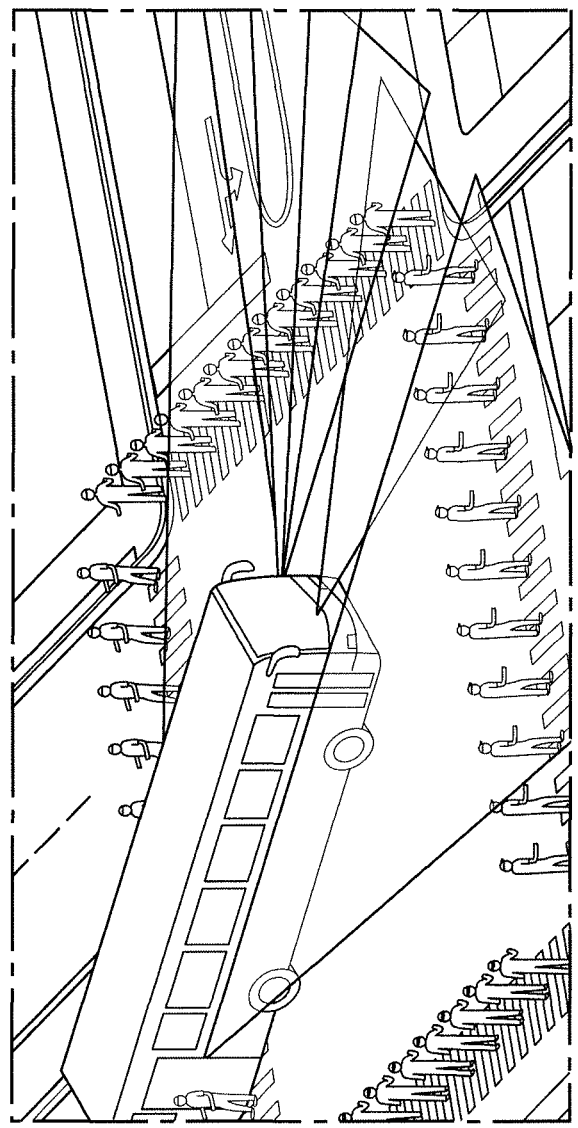
FIG. 22 is a perspective view schematic of a vehicle with cameras/sensing devices and their fields of view during a left turn according to some embodiments.
Figure 23:
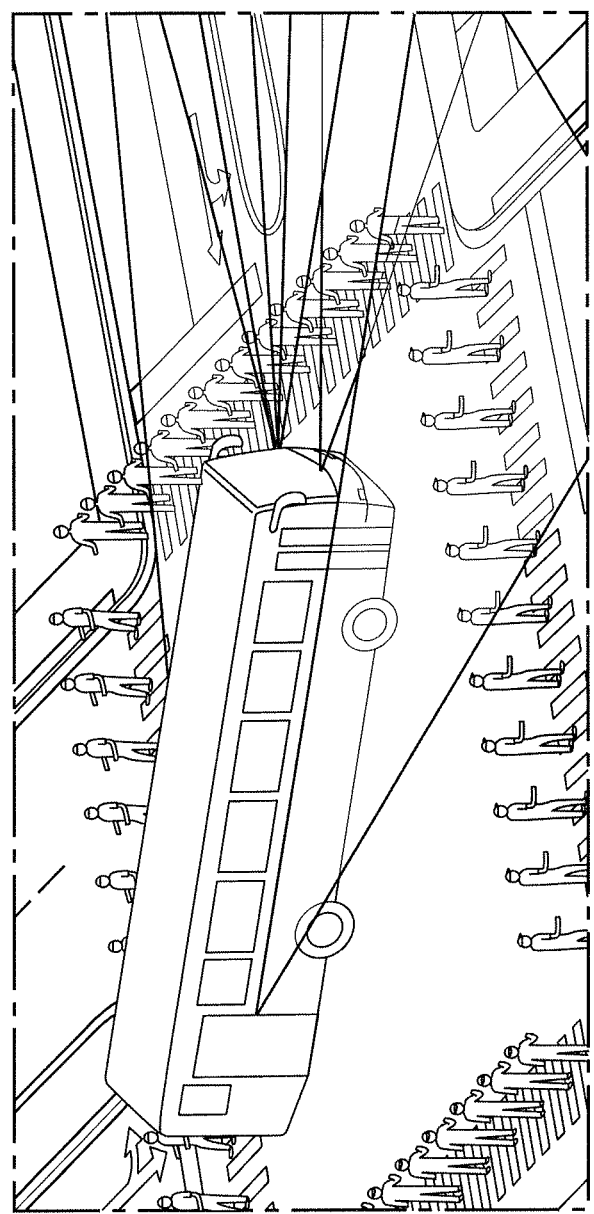
FIG. 23 is a perspective view of a vehicle with cameras/sensing devices and their fields of view in use during a left turn according to some embodiments.

Pedestrian hazards in particular arise when a bus travels through an intersection with pedestrians located at various places in the intersection, including the intersection crosswalks. An exemplary intersection is illustrated in FIGS. 19 and 20. An intersectional layout model includes pedestrians standing along the crosswalks. Each camera/sensor's field of view creates a cone of coverage, as illustrated in the figures referenced in the following discussion. In some embodiments, the camera/sensor's field of view may be configured or adjusted to be narrower when the vehicle is traveling in the forward direction, and wider when the vehicle is turning, optionally responsive to sensors that detect the vehicle's direction.

Figure 24:
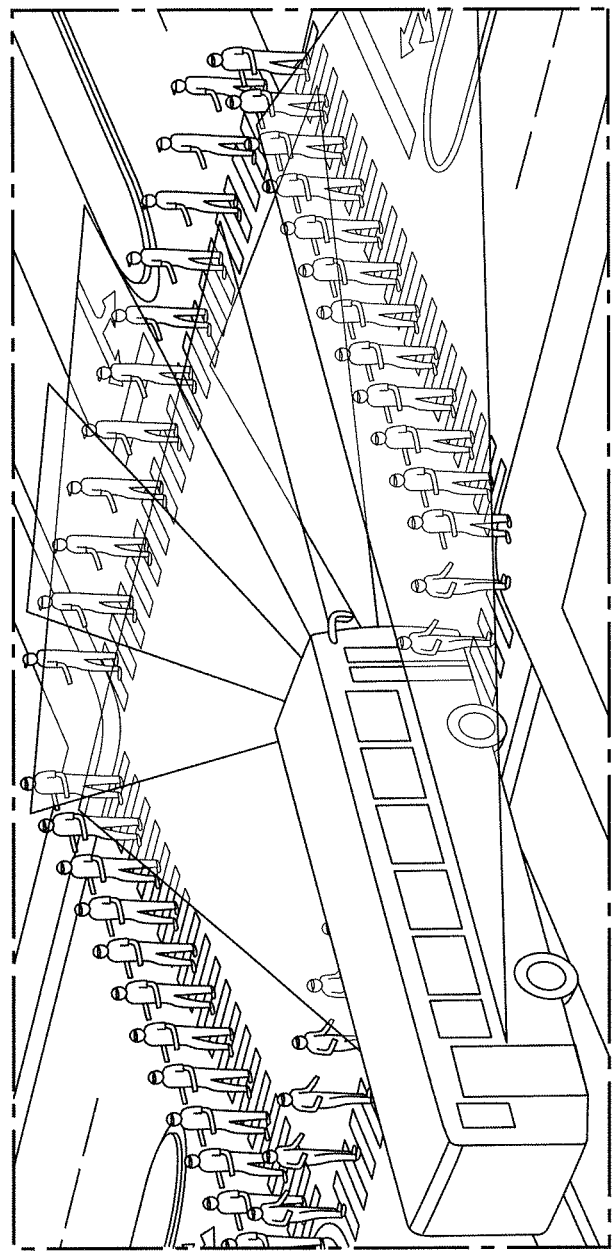
FIG. 24 is a perspective view of a vehicle with cameras/sensing devices and their fields of view in use during a right turn according to some embodiments.
Figure 25:
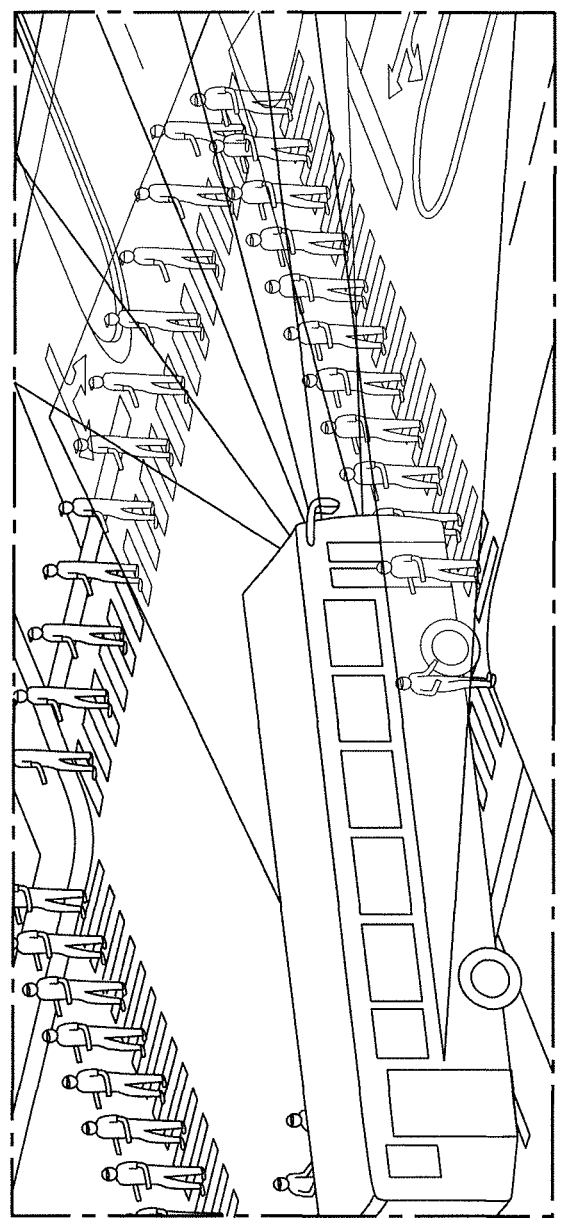
FIG. 25 is a perspective view of a vehicle with cameras/sensing devices and their fields of view in use during a right turn according to some embodiments.
Figure 26:
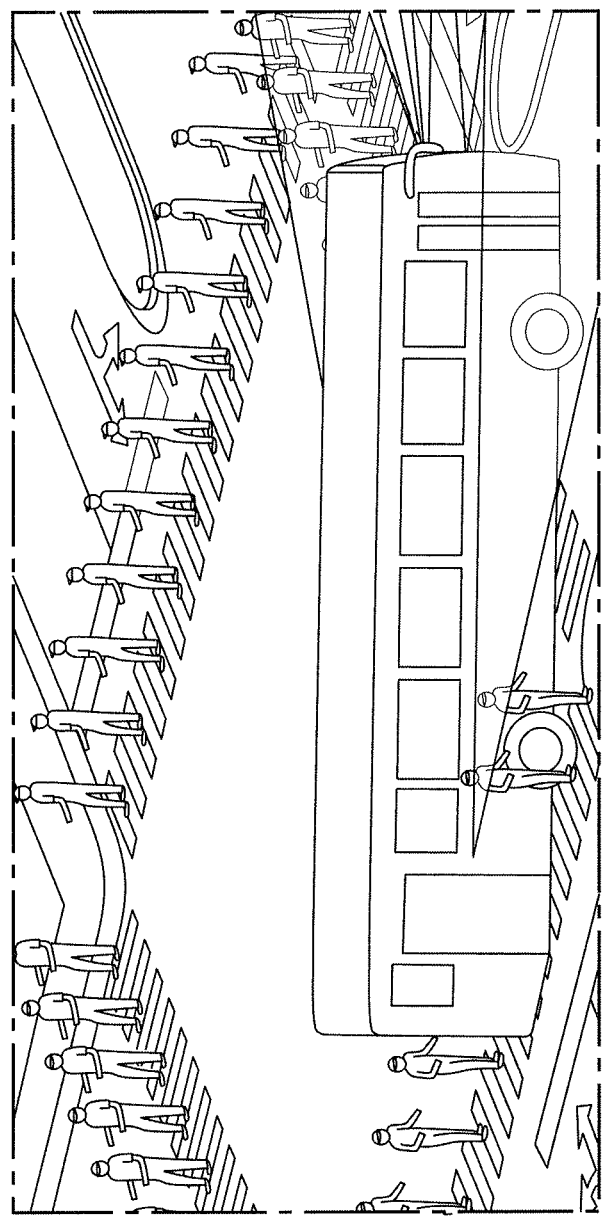
FIG. 26 is a perspective view of a vehicle with cameras/sensing devices and their fields of view in use during a right turn according to some embodiments.
Figure 27:
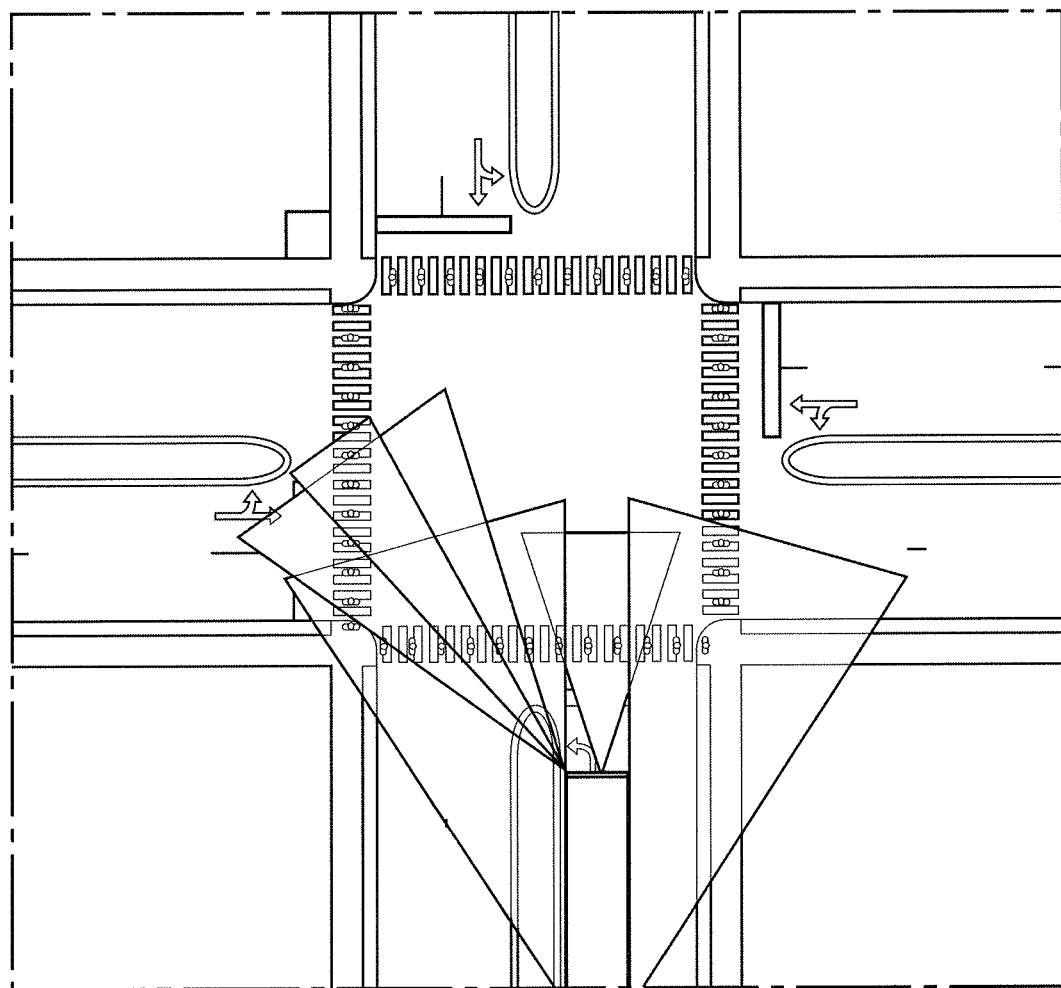
FIG. 27 is a top view of a vehicle with cameras/sensing devices and their fields of view in use according to some embodiments.

A pedestrian risk on the right side of the bus is illustrated in FIGS. 24-26, and arises when an unaware pedestrian, typically distracted by modern technology such as a phone, tablet or music device, enters a crosswalk alongside a bus in the midst of or beginning a right turn. The pedestrian, perhaps looking down at his device, keeps walking as the body of the bus "tracks" sideways during the turn and moves closer to the curb towards the pedestrian. The pedestrian may walk into the side of the bus, get knocked down and end up with his or her body or legs under the bus, risking getting rolled over by the rear wheels.

A pedestrian risk on the left side of the bus is illustrated in FIGS. 21-23 and 27, and presents similar tracking challenges as on the right side, but with the addition of a driver's forward blind spot that may hide a pedestrian who disembarks from the curb and walks in a direction opposite the travel of the bus. Specifically, the pedestrian continues in the crosswalk and as the bus penetrates the intersection and starts the left turn, the pedestrian remains in a blind spot as he moves and the bus turns. The corner area defined by the pillar and neighboring parts of the bus come into contact with the pedestrian. The pedestrian may not actually be in the blind zone, but may nonetheless be hit because the driver may be looking to his left after deciding to make the turn.

The presence of a pedestrian can be missed or ignored due to distractions. These distractions also include passenger interactions with the driver. The systems described herein can reduce the risk of accidents by increasing the driver's situational awareness, including by alerting the driver of nearby pedestrians and potential collision courses, and/or by increasing the pedestrian's situational awareness, including by alerting the pedestrian of the nearby vehicle.

In some embodiments, the plurality of cameras/sensors includes one or more forward-view cameras/sensors positioned on the front of the vehicle. A forward-view camera/sensor may provide a field of view centered along the forward facing longitudinal axis of the vehicle, and may detect a potential hazard and/or collision in the forward direction of travel. The forward-view camera/sensor may be an interior camera/sensor or an exterior camera/sensor. The forward-view camera/sensor is preferably positioned to provide a field of view that includes any hazards or pedestrians, including children, pets, or other small objects, immediately in front of the vehicle. Any or all of the cameras/sensors may be positioned with a vertical angular orientation and directed toward the desired target area. Various camera/sensor orientations, locations and/or angles may be used.

In some embodiments, each camera/sensor may provide a panoramic lens that provides a 120-degree view. Alternately, the field of view of a particular zone may result from a composition of multiple cameras/sensors. In order to provide a margin of error or to expand the field of view of a camera/sensor or cameras/sensors with limited fields of view, the fields of view of multiple cameras/sensors may be overlapped. Each camera/sensor may provide a 90° view or smaller, such as 25°-50°, and thus provide a reduced distortion in its field of view. Also, it will be understood that two or more cameras/sensors may be mounted in place of each of the cameras/sensors described, such that each of the cameras/sensors is positioned at a slightly different angle to increase the field of view of the combined cameras/sensors. The individual camera/sensor signals analyzed by the system may then be digitally combined in a seamless fashion to provide a combined camera/sensor signal. Thus, some embodiments may include one or more combination signals that are stitched together from signals from multiple camera/sensors.

Figure 15:
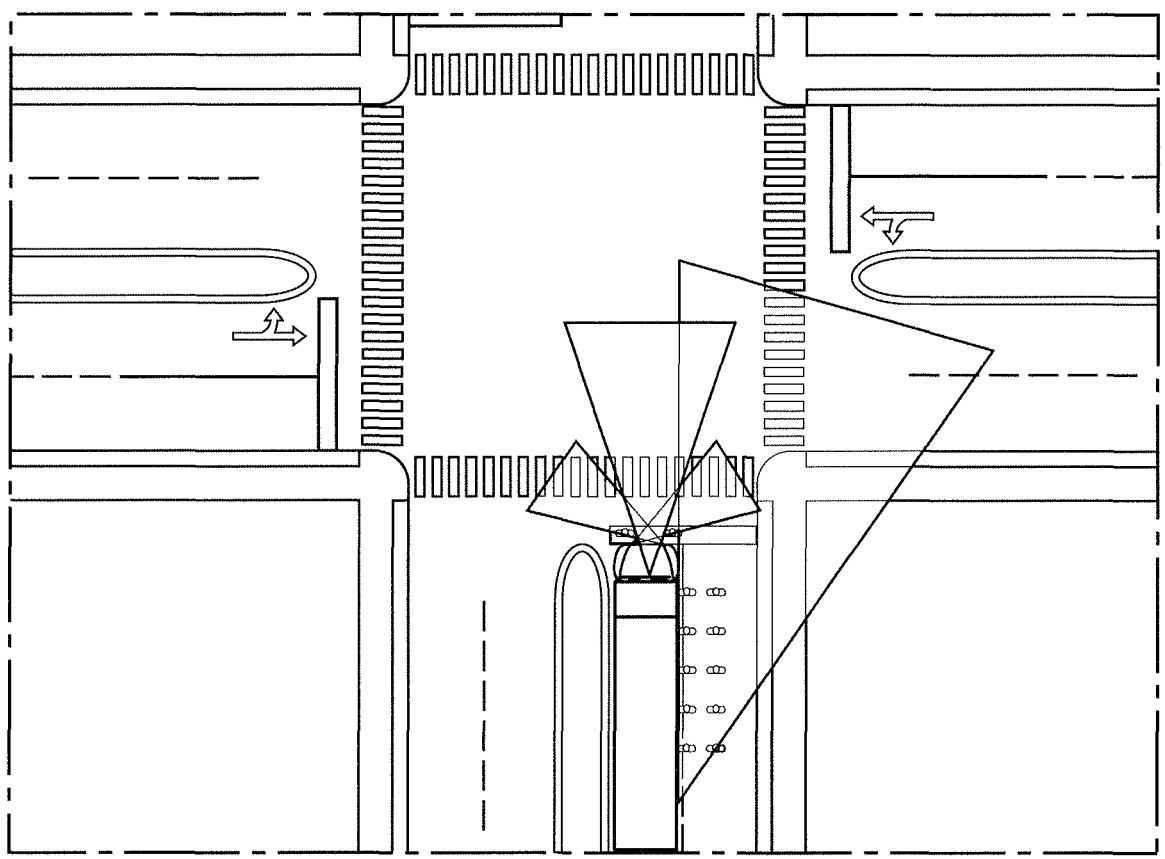
FIG. 15 is a top view of a vehicle with cameras/sensing devices and their fields of view in use according to some embodiments.
Figure 16:
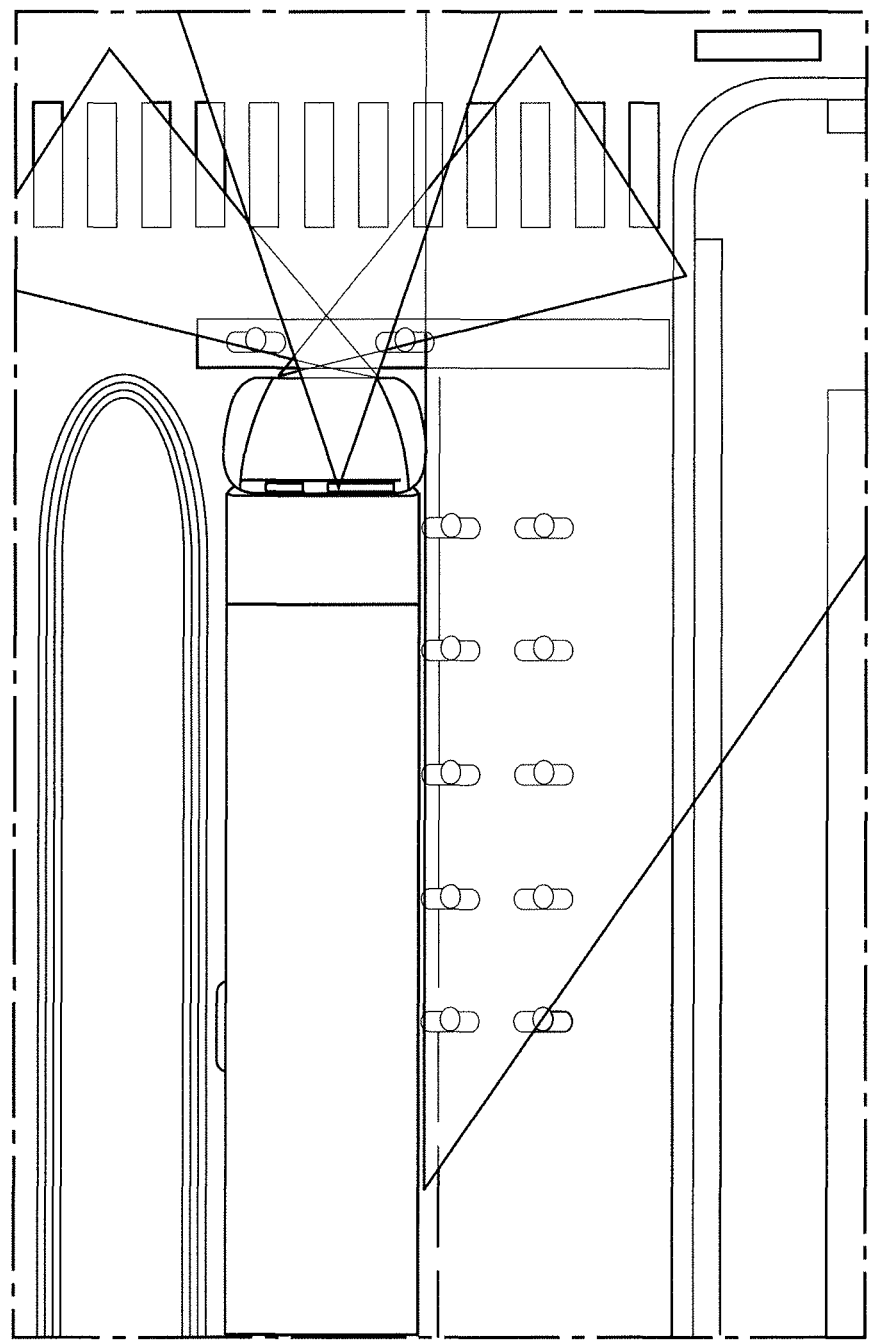
FIG. 16 is a top view of a vehicle with cameras/sensing devices and their fields of view in use according to some embodiments.
Figure 17:
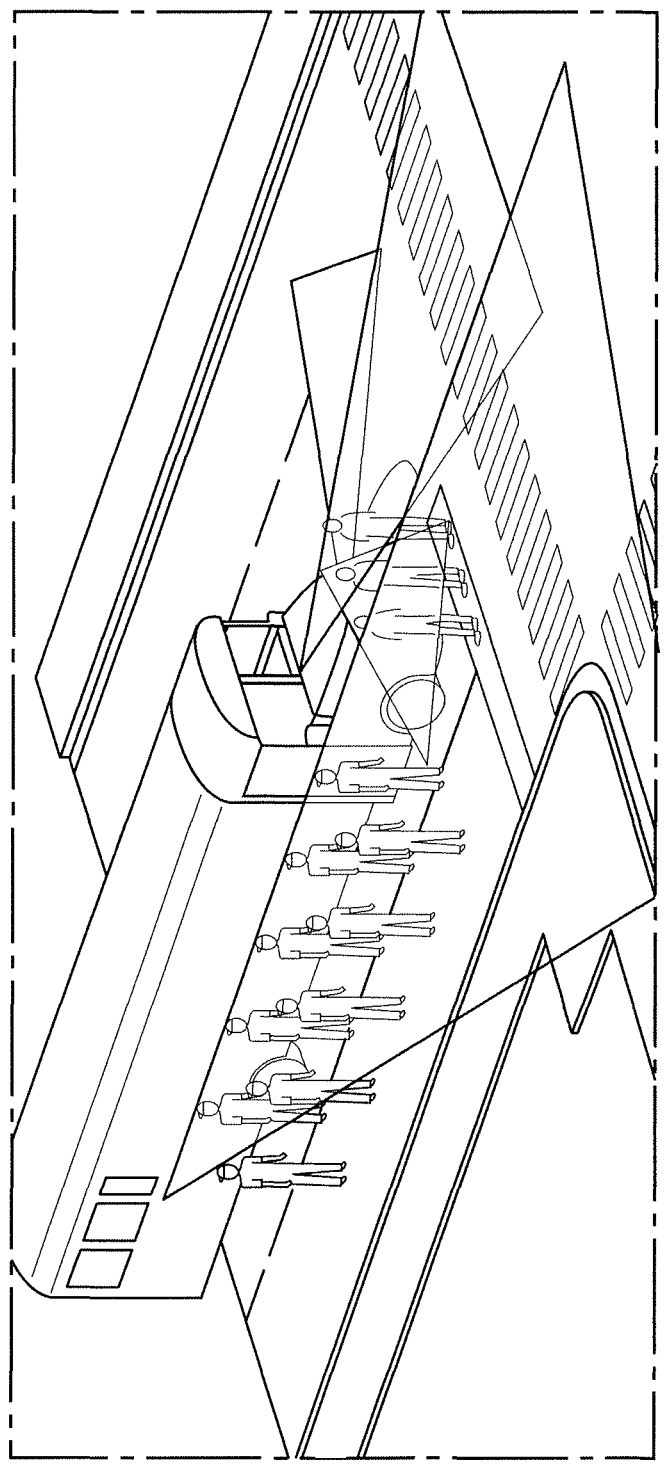
FIG. 17 is a perspective view of a vehicle with cameras/sensing devices and their fields of view in use according to some embodiments.
Figure 18:
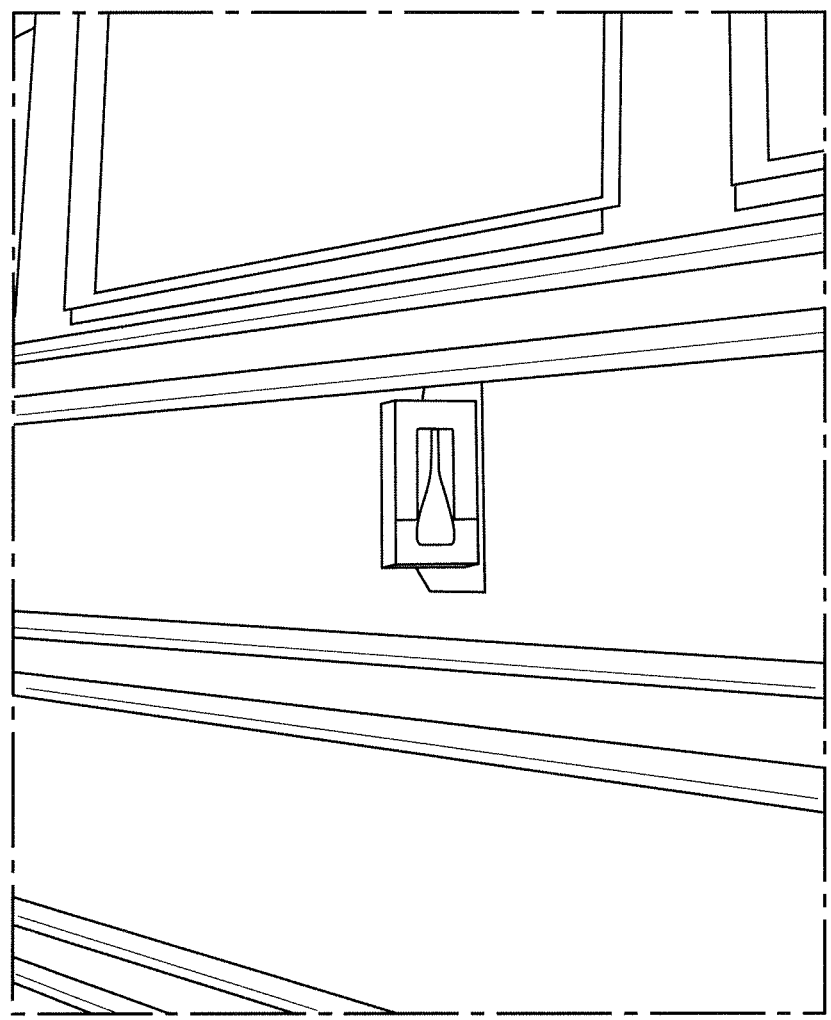
FIG. 18 is a perspective view of a vehicle with a camera/sensing device in use according to some embodiments.

For example, where each camera/sensor's field of view is between 25°-50°, such as 38° or 40°, three cameras/sensors may be used. For example, the forward view may consist of three forward-view cameras/sensors: a center camera/sensor facing forward and two side-facing front cameras/sensors placed at either side of the front of the bus, such as on the windshield. The side-facing front cameras/sensors may be oriented with an angular tilt towards the front corners opposite to the corner that each side-facing front camera/sensor is mounted, in order to focus on a pedestrian disembarking in the crosswalk at the opposite side of the intersection as the bus starts a left or right turn. The front view cameras/sensors may have fields of view that correspond to those illustrated in FIGS. 15-16.

The center camera/sensor may be configured with detector system functions such as lane departure warning, headway monitoring, collision avoidance and/or sign reading. The center camera/sensor may also be configured for pedestrian detection. The side-facing front cameras/sensors may optionally have the basic functions turned off, so they are only active for pedestrian detection. The cameras/sensors may be programmed specifically for a predetermined range of coverage specific for turning situations, as discussed further below.

In some embodiments, the plurality of detectors/cameras/sensors includes one or more detectors/cameras/sensors that are oriented to detect hazards on the same side of the bus. For example, a detector/camera/sensor may be mounted on the front left portion of the bus and oriented towards an oncoming crosswalk during a left turn, for example, pointing at a 45 degree angle towards the oncoming crosswalk. Additionally and/or alternatively, a detector/camera/sensor may be mounted on the front right portion of the bus and oriented towards an oncoming crosswalk during a right turn, for example, pointing at a 45 degree angle towards the oncoming crosswalk. The plurality of cameras/sensors may additionally include cameras/sensors near the rear wheel on either or both sides of the bus. These rear-side cameras/sensors can cover the "tracking" activities of the bus during the turns described above. The rear-side cameras/sensors are oriented toward the front of the bus with the inner edge of their respective fields of view running along the side of the bus, and provide fields of view that include the area immediately to the side of the bus. A right rear-side camera/sensor may be positioned just forward of the rear of the vehicle on the right side of the vehicle and may be oriented to provide a field of view along the right side of the vehicle. On the left side of the vehicle, possibly aligned approximately at the same distance from the rear of the vehicle as the right rear-side camera/sensor, is a left rear-side camera/sensor. The left rear-side camera/sensor may be positioned to provide a field of view along the left side of the vehicle. The rear-side cameras/sensors may have fields of view that correspond to those illustrated in FIGS. 15-17 and 20-27. For simplicity's sake, not all camera/sensor fields of view are illustrated in each of these figures. The system and/or method may be configured to issue a warning when one or more of the front-side and/or rear-side mounted detectors/cameras/sensors detects a hazard. In some embodiments, the system and/or method may be configured to issue a warning only when both the left front-side and left rear-side mounted detectors/cameras/sensors or both the right front-side and right rear-side mounted detectors/cameras/sensors detect the same hazard and/or detect multiple hazards in the same and/or adjacent danger zones.

In some embodiments, the cameras/sensors are fixedly attached to the vehicle so that they provide a fixed field of view in their respective positions. Thus, the driver is always afforded a view that includes each of the danger zones around the bus, ensuring the safety of passengers boarding or disembarking from the bus or of pedestrians surrounding the bus. For example, children disembarking from the bus are at risk of falling under the bus, so it may be desirable to maintain a fixed field of view for one or more cameras/sensors.

In some embodiments, one or more cameras/sensors may be secured to the bus in such a way that driver is able to control their fields of view by moving the cameras/sensors left and right and/or up and down. Similarly, the cameras/sensors may be configured to allow zooming in or out to provide the driver with a close-up view or a greater depth of field. Such camera/sensor control may be provided by monitor controls, including a reset button to allow the driver to reset each of the cameras/sensors to a default position. In this way, pre-set danger zones around the vehicle can be easily viewed with the press of a button.

It will be understood that the specified fields of view of the respective cameras/sensors are described for the purposes of illustration and are not intended to be comprehensive of all contemplated fields of view. Many other configurations of fields of view are possible without departing from the spirit of the present invention.

Figure 28:
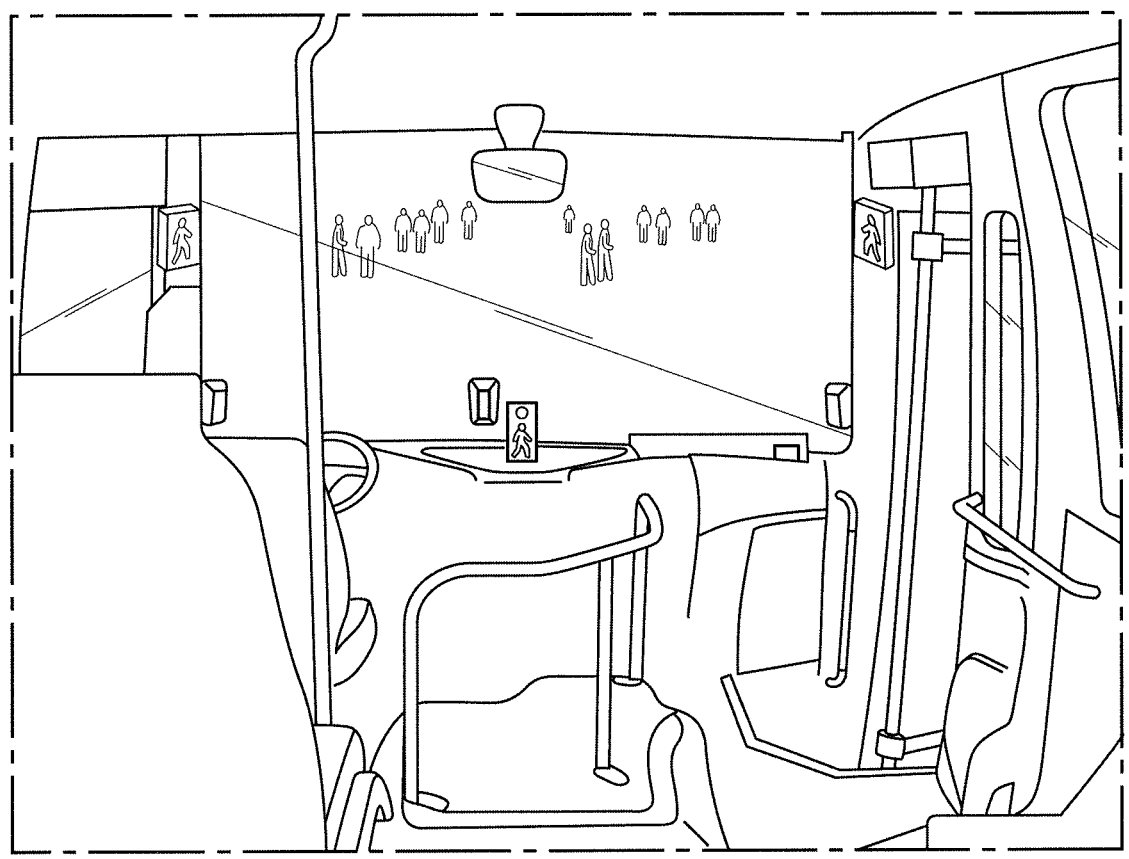
FIG. 28 is a perspective view of a driver interface according to some embodiments.

The forward-view cameras/sensors may be placed on the interior of the bus just below the roof, behind the windshield inside the driver's cabin as shown in the cockpit layout illustrated in FIG. 28. Alternately, the forward-view cameras/sensors may be placed external to the vehicle, on the windshield or on the roof of the driver's cabin near the center of the vehicle. Each of the forward-view cameras/sensors may be positioned on the top of the roof of the bus, inside the bus, or alternatively, may be provided partially inside the vehicle with the lens portions of the side facing front cameras/sensors positioned just outside of the bus. Positioning the lens portion outside of the bus can avoid glare is generated by the window of the bus. On the other hand, providing the camera/sensor entirely inside the vehicle will tend to keep the lens freer of precipitation, dust and urban smog, and will tend to keep the camera/sensor safer from theft, vandalism or the like. Similarly, the forward-view cameras/sensors may be positioned partially inside the vehicle with the lens portions protruding outside of the bus, outside of the windshield, outside of the grill of the hood or otherwise. In addition, the forward-view cameras/sensors may be positioned underneath the body of the bus since their primary aim may be to view small objects or pedestrians located near the vehicle.

The rear-side cameras/sensors may be mounted on the exterior of the bus or located on the interior such as in one of the windows. The left rear-side camera/sensor may be identical or different from the right rear-side camera/sensor in the way it is mounted to or integrally formed with the wall of the bus. Similarly, any other cameras/sensors may be identical to or different from either or both of the rear-side cameras/sensors in structure and in the way they are mounted to or formed integrally with the external wall of the bus.

The cameras/sensors may be located on the engine hood, or mounted on snubbed hood buses so that the cameras/sensors would be located very close to the bus windshield. The cameras/sensors can also be located on arm assemblies of the type that are typically provided for cross-view mirrors of the type disclosed in the present assignee's U.S. Pat. Nos. 7,055,973; 6,883,923; 6,796,667; 5,576,899; and 6,371,618, the contents of all of which are hereby incorporated by reference.

The cameras/sensors may be provided such that they are substantially inside the vehicle to prevent theft or vandalism. Alternately, any or all of the cameras/sensors may be mounted by camera/sensor arms to the exterior of the vehicle. For example, the side-facing front cameras/sensors may be mounted on arm assemblies which are typically provided for cross-view mirrors and which are often located at a position forward and to the side of the actual silhouette or outline of the vehicle.

Furthermore, any or all of the cameras/sensors may be provided as breakaway cameras/sensors such that if they undergo excessive impact the vehicle will not be damaged because the camera/sensor and/or the camera/sensor mount breaks off because of the impact. For example, any or all of the various cameras/sensors may be mounted on an arm assembly such that if the camera/sensor hits an obstacle, it swings sideways (backwards with respect to the motion of the bus) to protect the camera/sensor from becoming damaged and may automatically rebound or swing back to its original position. In some embodiments, the base on which the camera/sensor is mounted may swing and rebound as the result of an impact with an object. The cameras/sensors on the side may swing back and forth with respect to the movement of the vehicle and they may be provided with a gooseneck mount to facilitate the swinging and rebounding. The present assignee has described swinging and rebounding mirror mounts and breakaway and snap back mirror supports which can be utilized directly for mounting the cameras/sensors. Such descriptions appear, among other places, in the present assignee's U.S. Pat. Nos. 6,398,376; 6,796,667; and 6,883,923, the contents all of which are hereby incorporated by reference. Similarly, the cameras/sensors mounted to the front of the vehicle may swing and rebound from left to right (or right to left) with respect to the moving direction of the vehicle.

Further, each of the cameras/sensors may be surrounded to the extent possible by a protective tubular structure which is anchored to the arm assembly to allow the protective structure to absorb any blow or sudden force resulting from an object impact, thereby protecting the camera/sensor from damage. For example, the cameras/sensors may be encased in a heavy duty protective case, such as a plastic case, a PVC case or a metallic case, that absorbs impact or shock to the cameras/sensors impacts with from moving objects or from vandals. In some embodiments, any or all of the cameras/sensors are each separated into two or more distinct assemblies. For example, a first assembly or set of assemblies may include a lens and an imaging processor, and may be placed in a small housing on the vehicle exterior in various locations, while a second assembly including the control circuitry may be located in the vehicle interior, for example, on the wall opposite the sensors, camera and/or first assemblies, n a special enclosure connected, for example, by a long cable and/or wireless connection to the first assembly or set of assemblies, or other suitable location.

Figure 4:
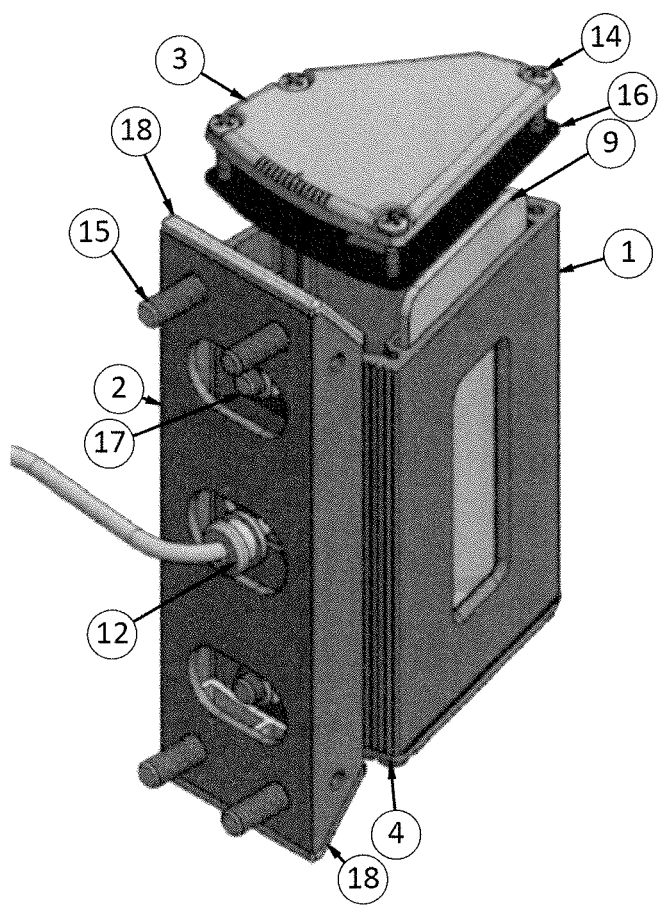
FIG. 4 is a perspective view of a camera/sensing device housing and mounting hardware according to some embodiments.
Figure 5:
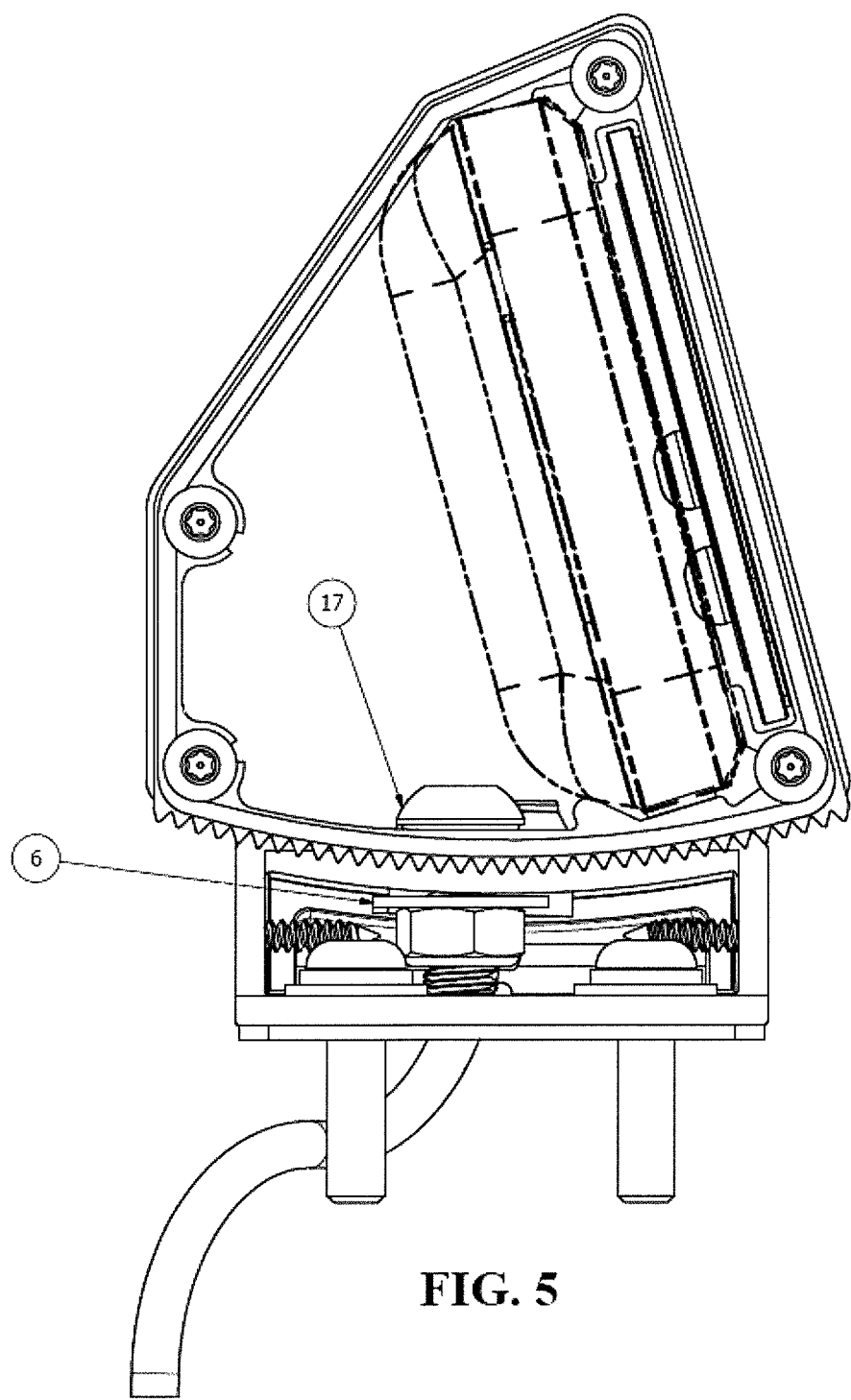
FIG. 5 is a top view of a camera/sensing device housing and mounting hardware with top cover removed according to some embodiments.
Figure 6:
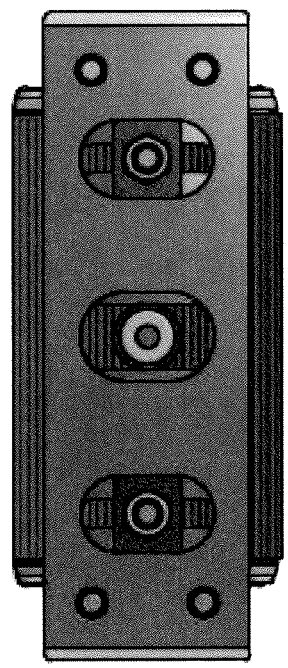
FIG. 6 is a rear view of a camera/sensing device housing and mounting hardware according to some embodiments.
Figure 7:
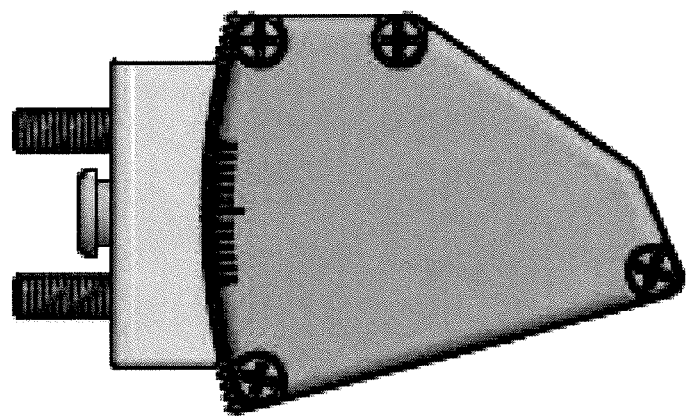
FIG. 7 is a bottom view of a camera/sensing device housing and mounting hardware according to some embodiments.
Figure 8:
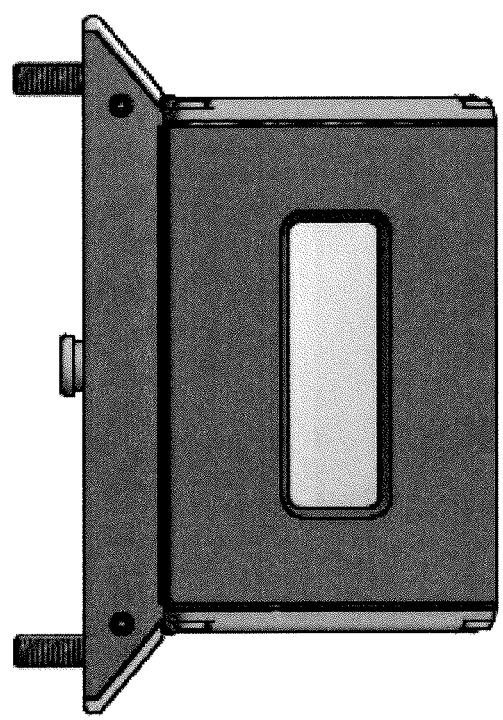
FIG. 8 is a front view of a camera/sensing device housing and mounting hardware according to some embodiments.
Figure 9:
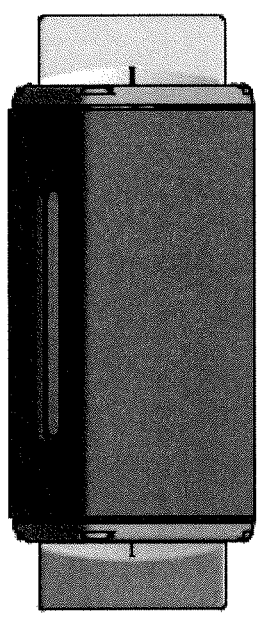
FIG. 9 is a side view of a camera/sensing device housing and mounting hardware according to some embodiments.
Figure 10:
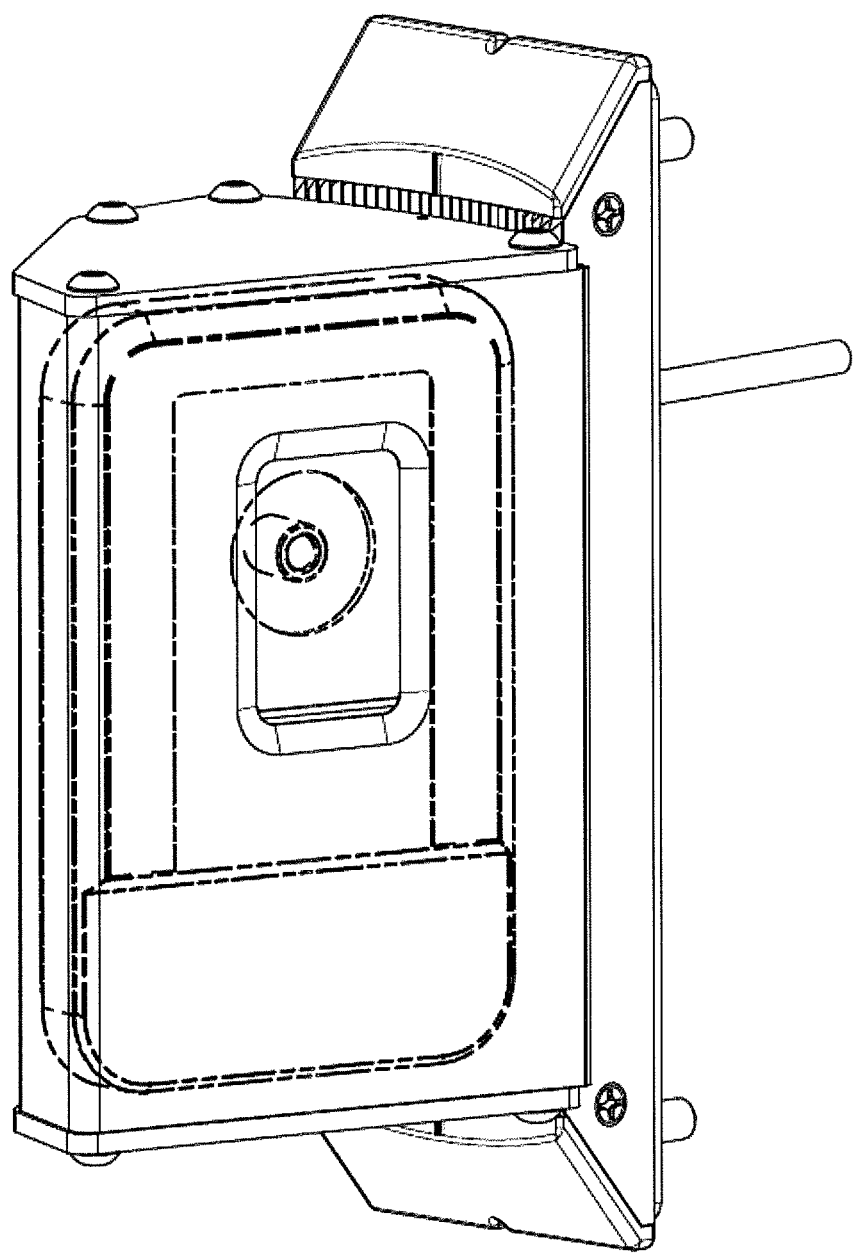
FIG. 10 is a perspective view of a camera/sensing device housing and mounting hardware according to some embodiments.
Figure 11:
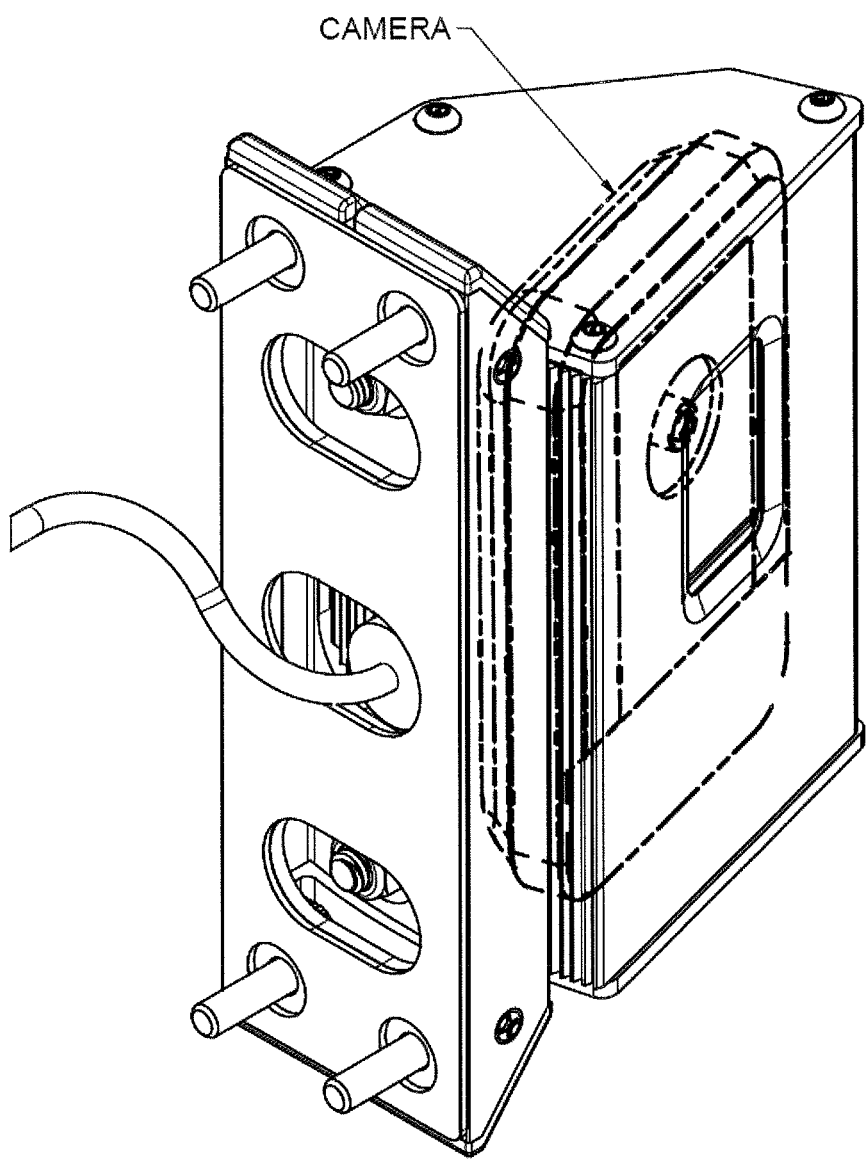
FIG. 11 is a perspective view of a camera/sensing device housing and mounting hardware according to some embodiments.
Figure 33:
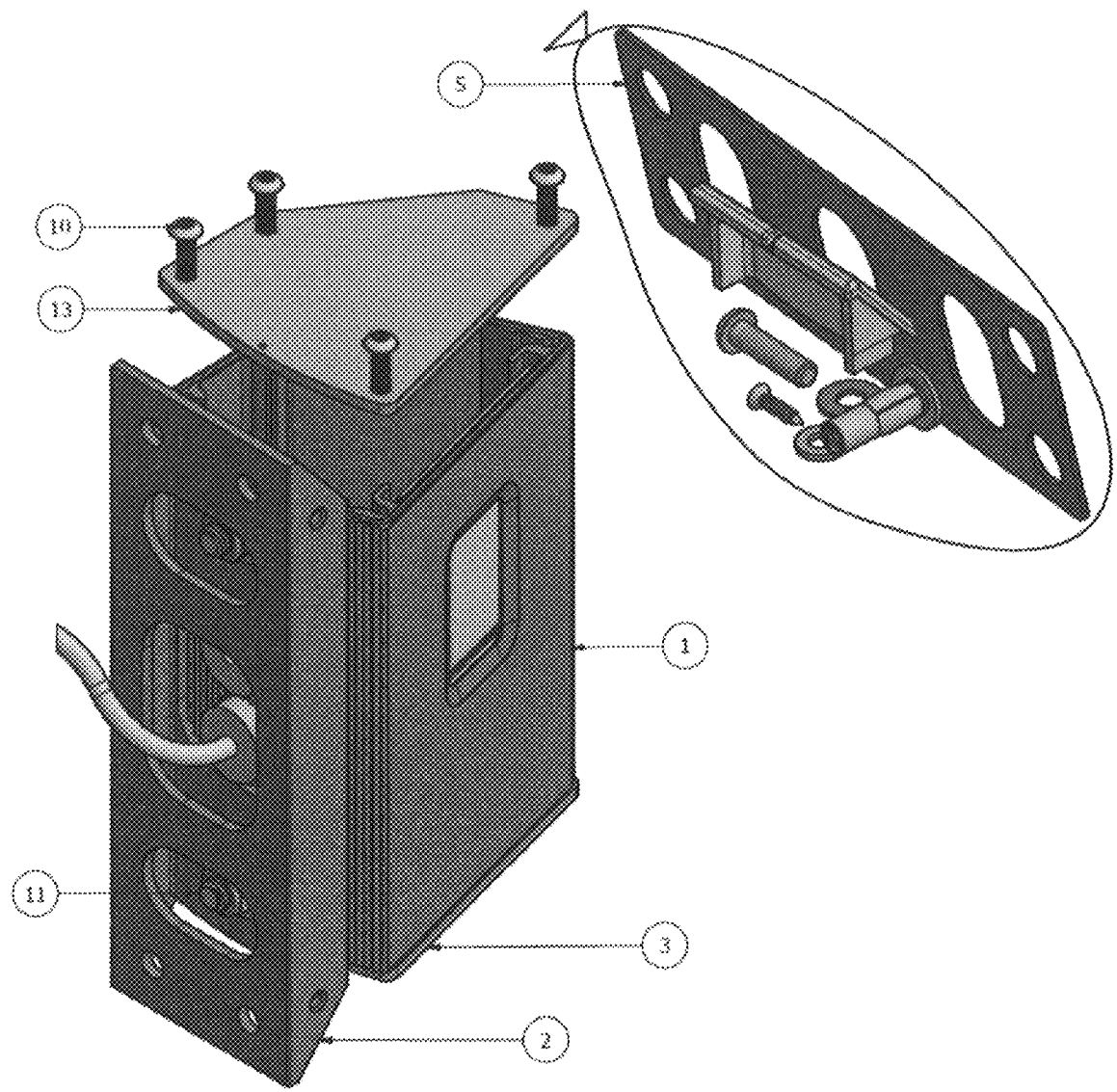
FIG. 33 is a perspective view of a camera/sensing device housing and mounting hardware according to some embodiments.
Figure 42:
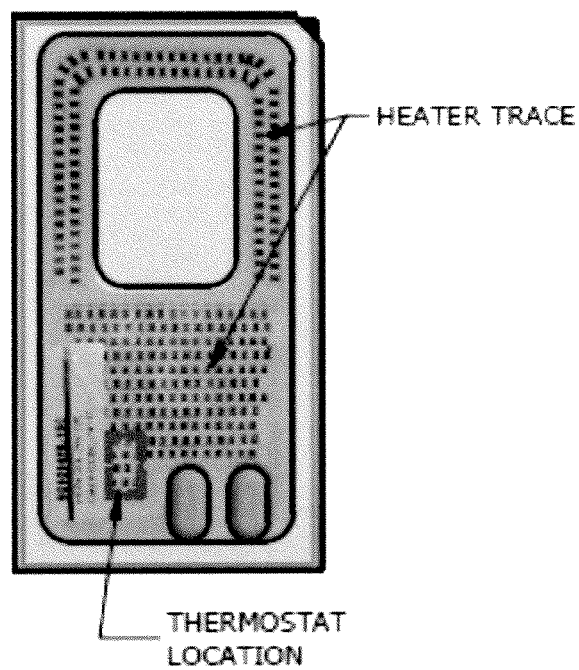
FIG. 42 is a back view of a protective lens with heater and thermostat for a camera/sensing device housing according to some embodiments.
Figure 43:
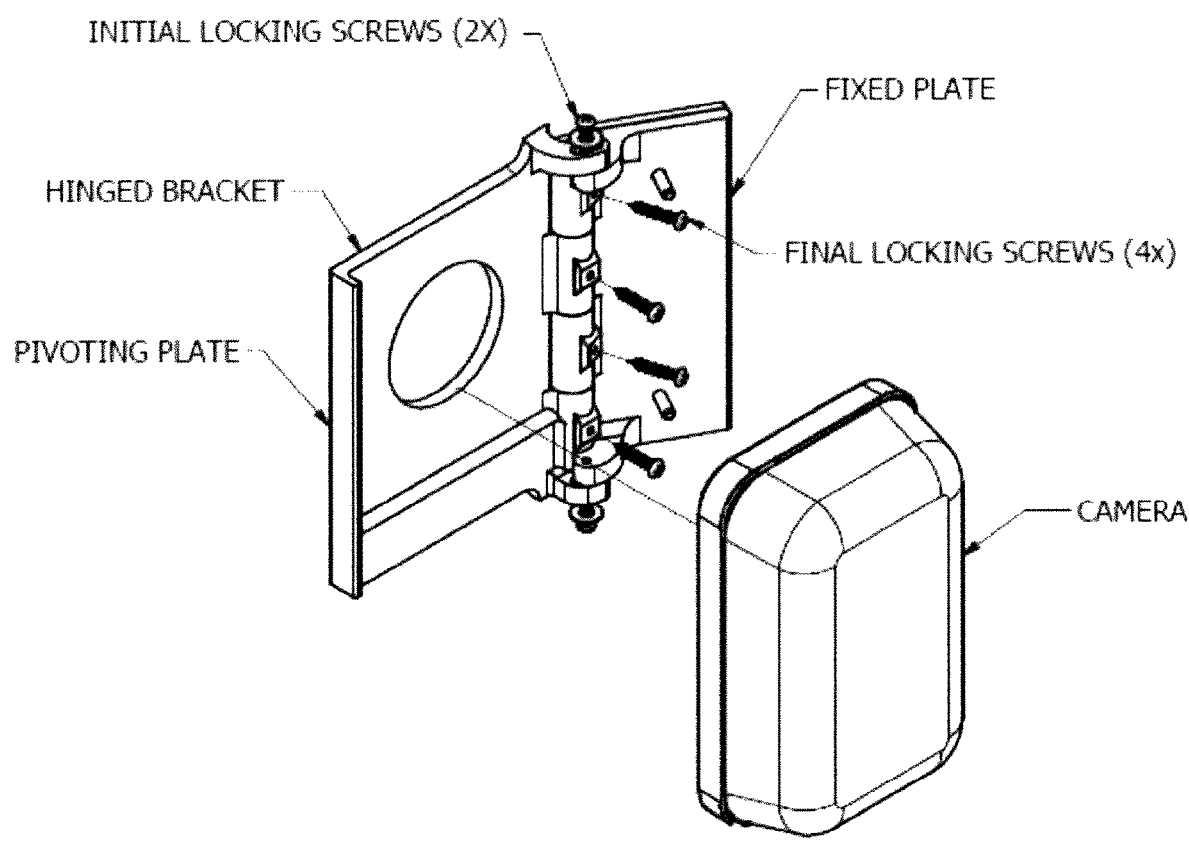
FIG. 43 is a perspective view of a camera/sensing device housing and mounting hardware according to some embodiments.
Figure 44:
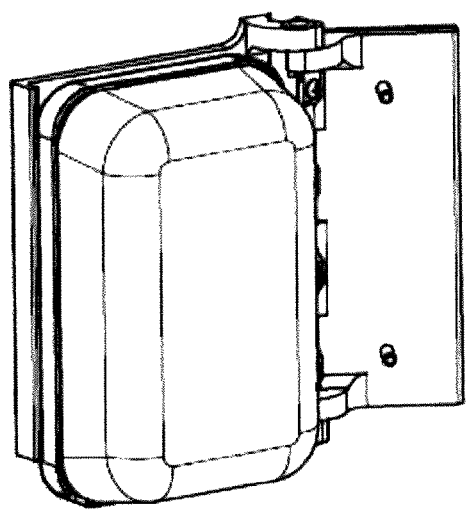
FIG. 44 is a perspective view of a camera/sensing device housing and mounting hardware according to some embodiments.
Figure 45:
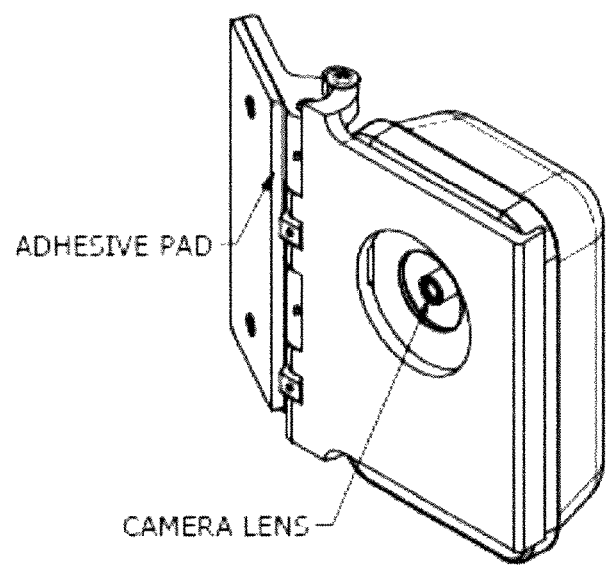
FIG. 45 is a perspective view of a camera/sensing device housing and mounting hardware according to some embodiments.
Figure 46:
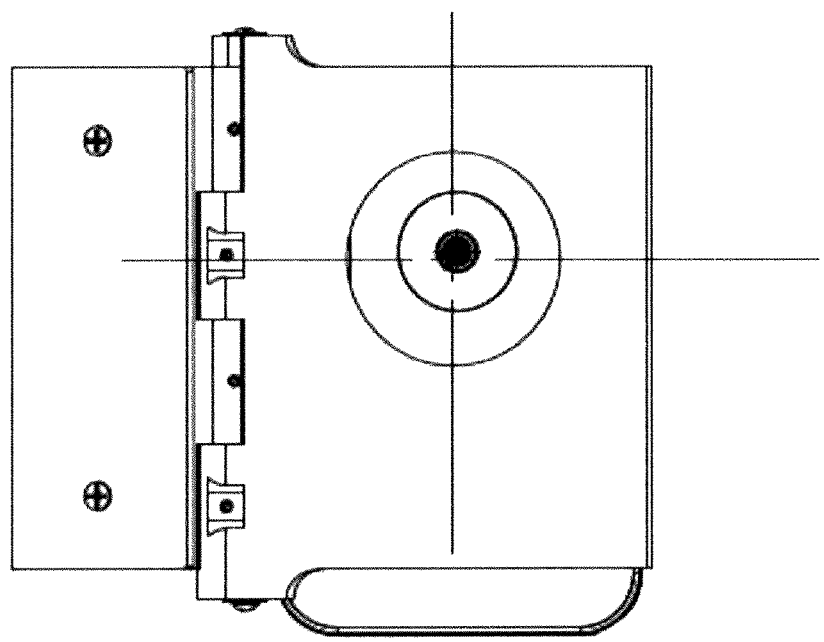
FIG. 46 is a front view of a camera/sensing device housing and mounting hardware according to some embodiments.
Figure 47:
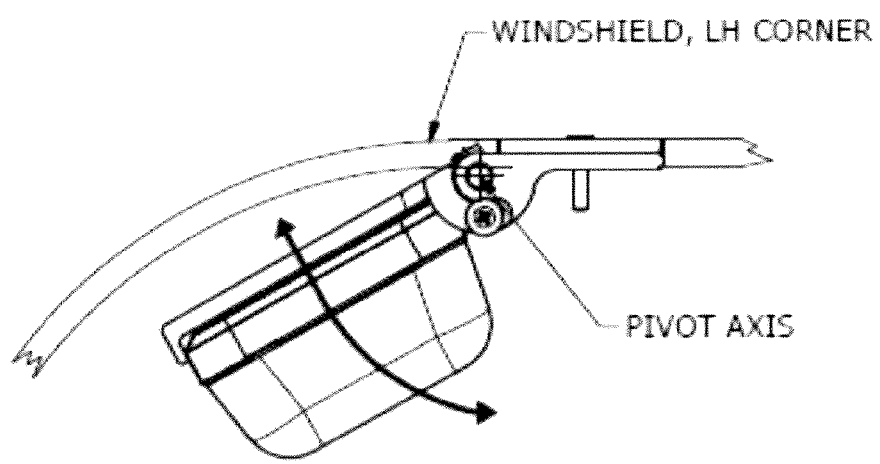
FIG. 47 is a top view of a camera/sensing device housing and mounting hardware according to some embodiments.
Figure 48:
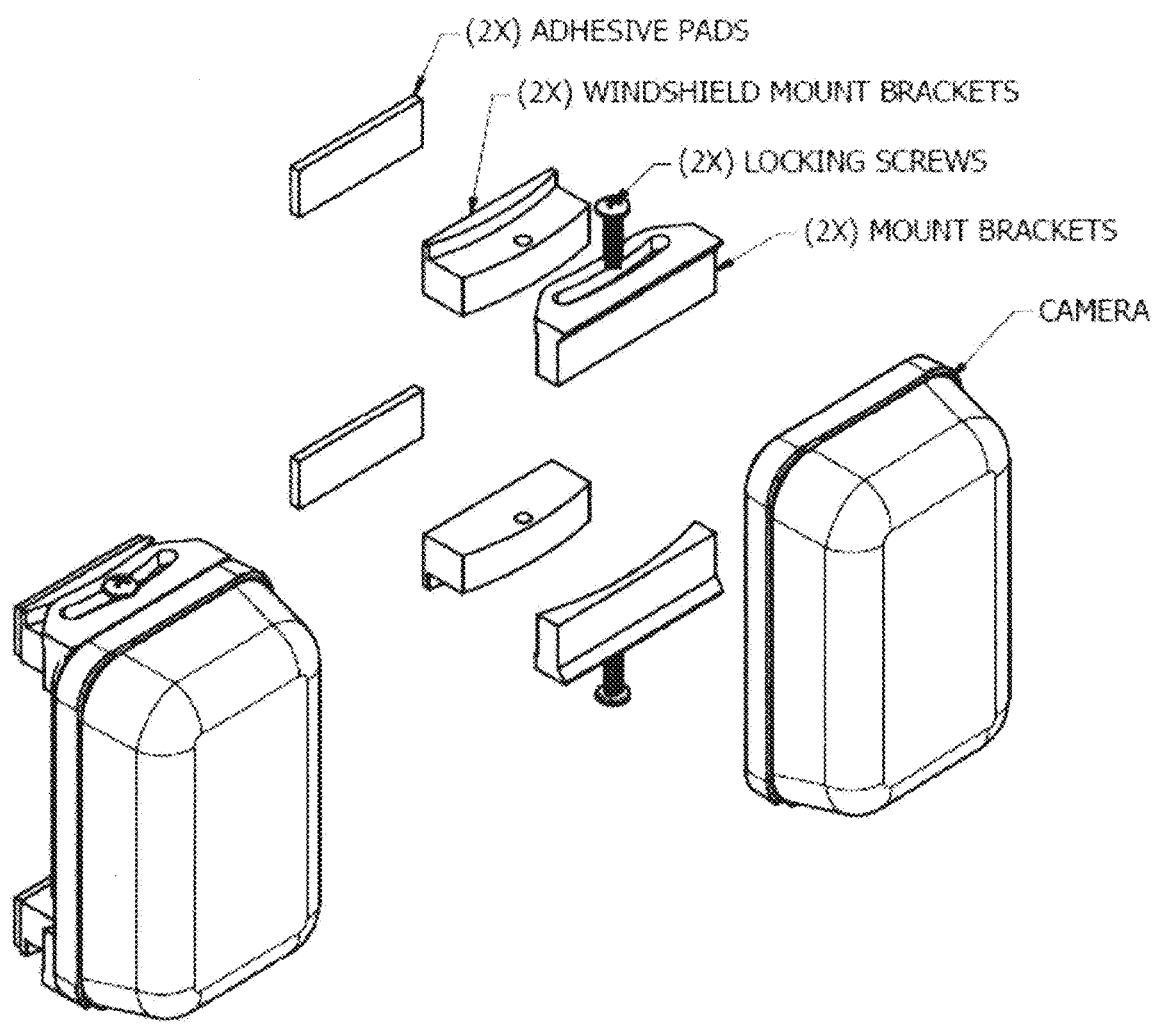
FIG. 48 is a perspective view of a camera/sensing device housing and mounting hardware, assembled and unassembled, according to some embodiments.
Figure 49:
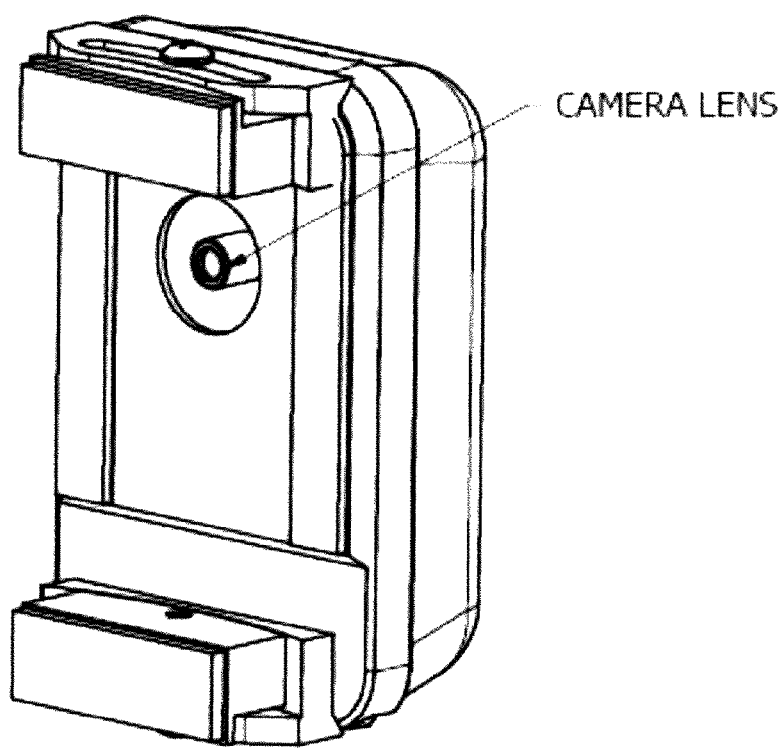
FIG. 49 is a perspective view of a camera/sensing device housing and mounting hardware according to some embodiments.
Figure 50:
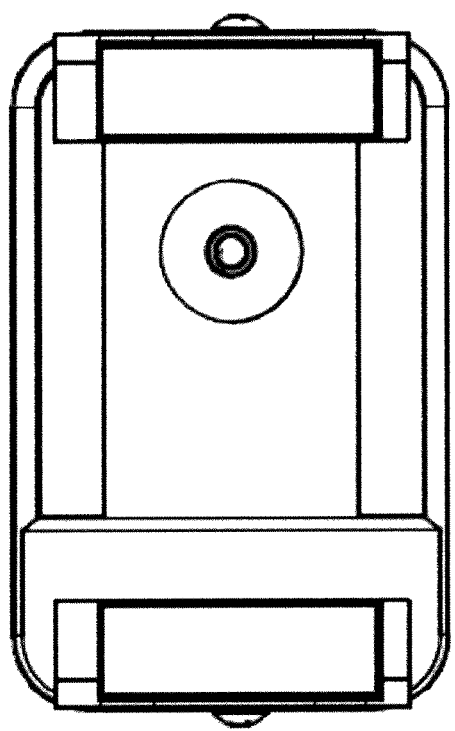
FIG. 50 is a front view of a camera/sensing device housing and mounting hardware according to some embodiments.
Figure 51:
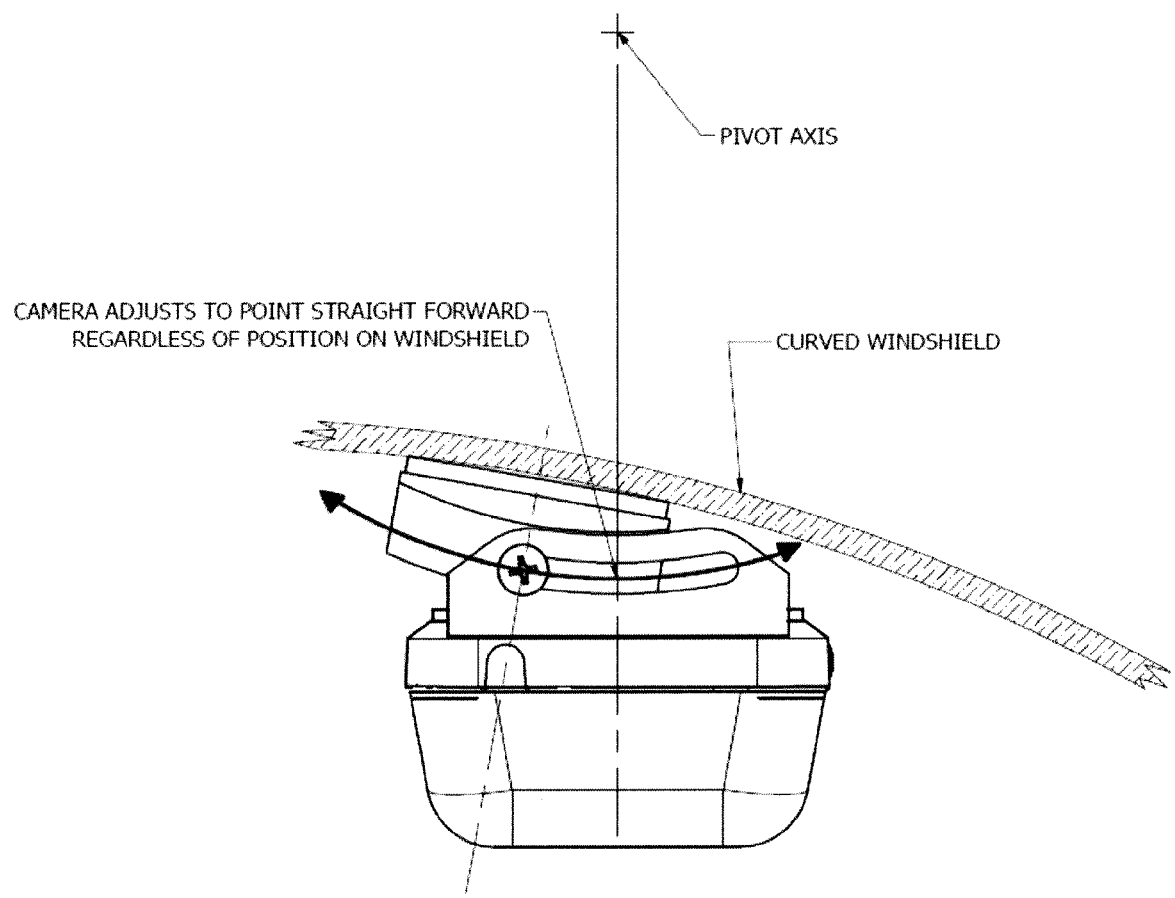
FIG. 51 is a top view of a camera/sensing device housing and mounting hardware according to some embodiments.
Figure 52:
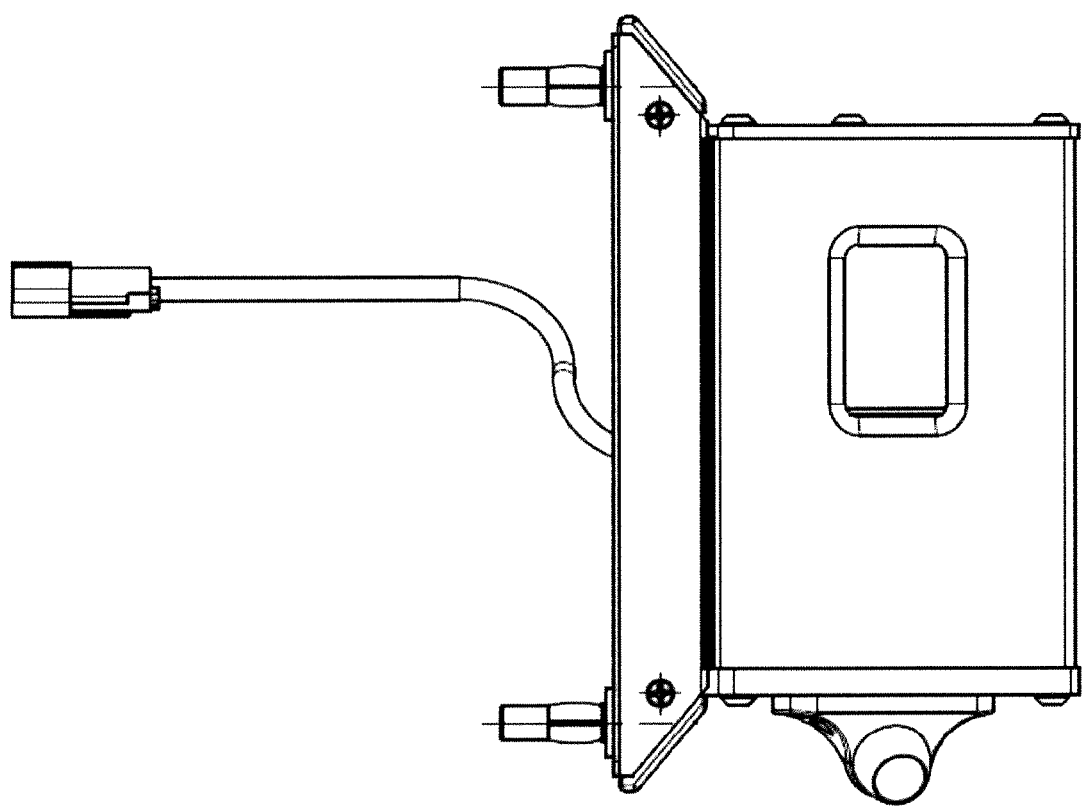
FIG. 52 is a front view of a camera/sensing device housing and mounting hardware according to some embodiments.
Figure 53:
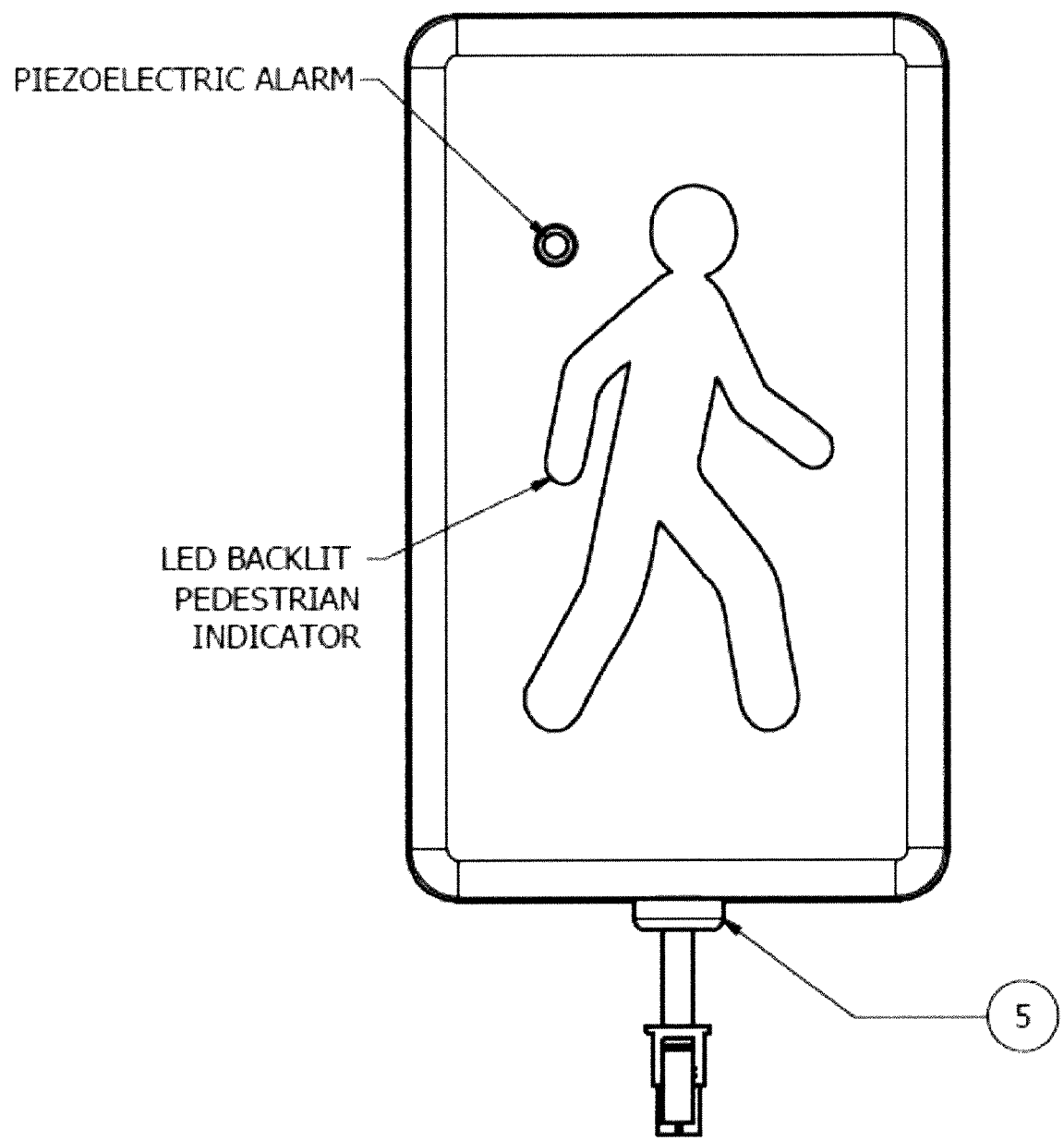
FIG. 53 is a front view of a pedestrian detection display with alarm according to some embodiments.
Figure 54:
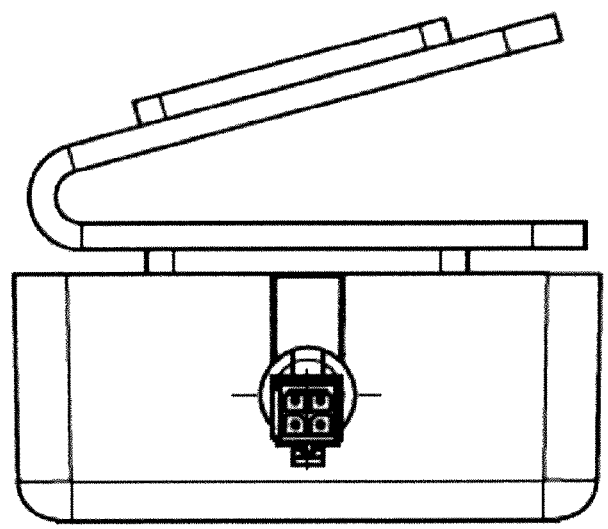
FIG. 54 is a top view of a pedestrian detection display housing and mounting hardware according to some embodiments.
Figure 55:
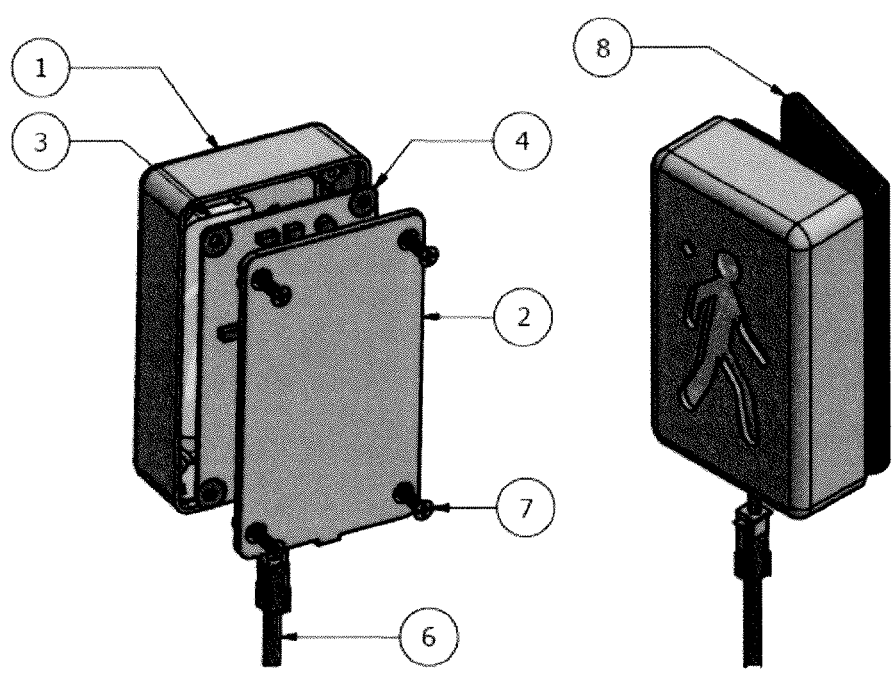
FIG. 55 is a perspective view of a pedestrian detection display housing and mounting hardware, assembled and unassembled, according to some embodiments.
Figure 56:
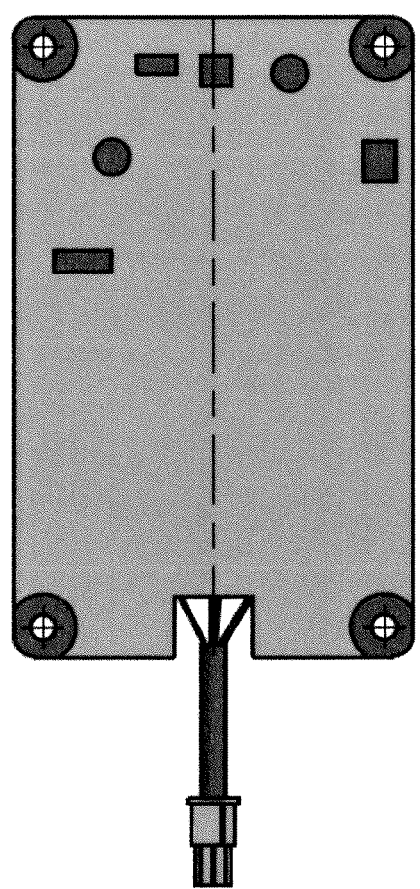
FIG. 56 is a back view of a pedestrian detection warning circuit board according to some embodiments.
Figure 57:
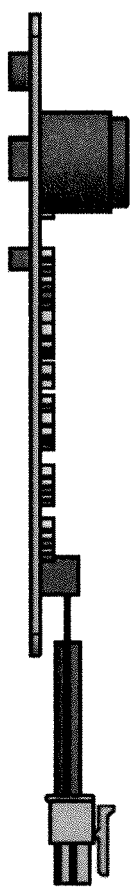
FIG. 57 is a side view of a pedestrian detection warning circuit board according to some embodiments.
Figure 58:
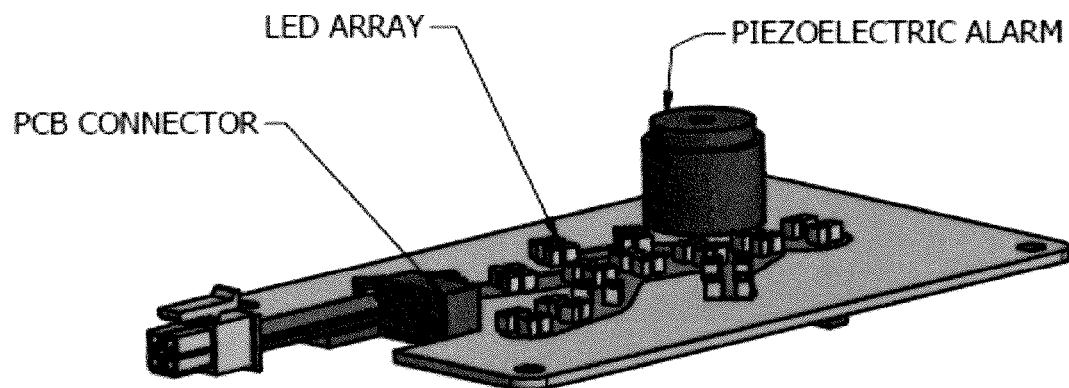
FIG. 58 is a perspective view of a pedestrian detection warning circuit board according to some embodiments.
Figure 64:
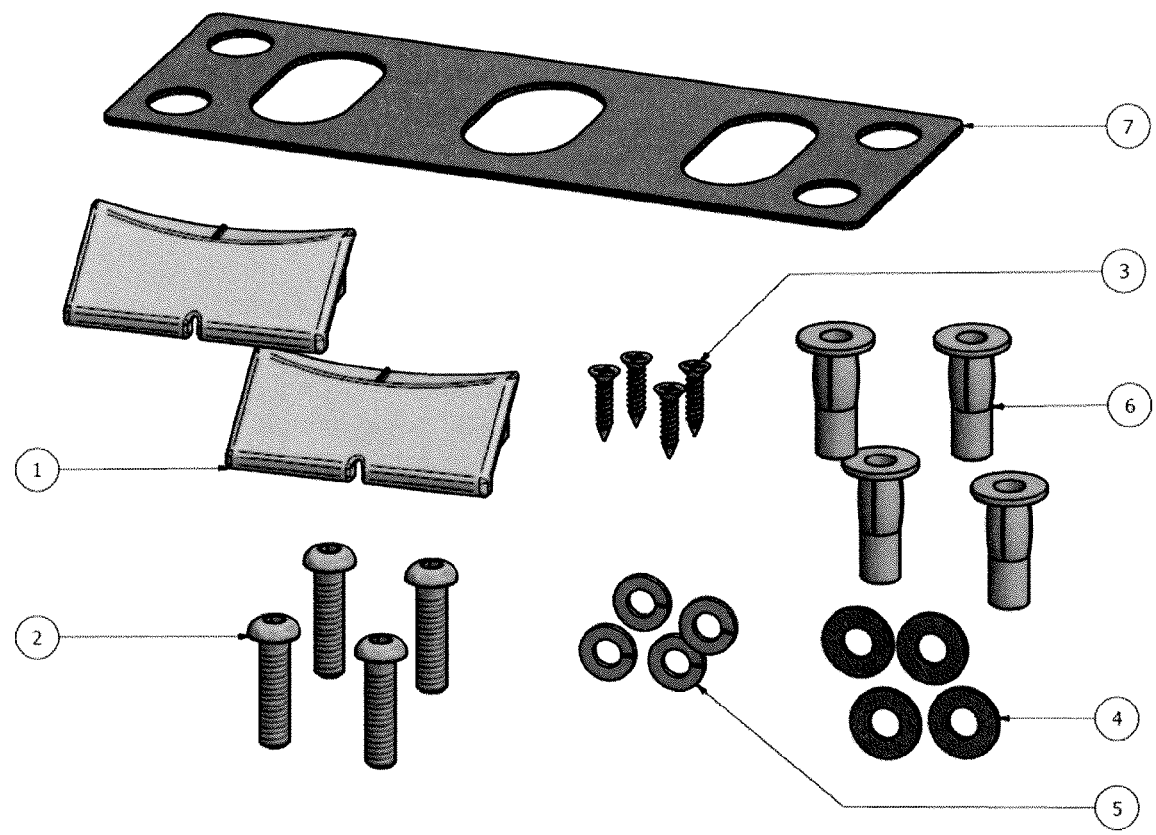
FIG. 64 is a detail view of mounting hardware from FIG. 33 according to some embodiments.

In some embodiments, exterior cameras/sensors are secured in robust exterior housings as illustrated, for example, in FIGS. 4-14, 18, 33-42, and 64-68. Table 1 lists the exemplary parts labeled in FIGS. 4 and 5. Table 2 lists the exemplary parts labeled in FIGS. 33 and 34. Table 3 lists the exemplary parts labeled in FIG. 64 (which provides an expanded view of the screw kit, mounting hardware depicted in FIG. 33 at numeral 5). Each housing may completely enclose each camera/sensor and include a portion through which the camera or sensor can operate, such as a window, which may be covered with a protective lens made of glass or other material transparent or substantially transparent to the camera or sensor (e.g., polycarbonate). As shown, for example, in FIGS. 4, 5, 12, 33 and 34, the housing body may include an inner track portion bracketing the lens on either side, securing the lens at the window so that it does not fall backward, but allowing the lens to slide in and out of the housing from the top (as shown in FIG. 4) and/or the bottom. The lens may be treated on one side (e.g., just the exterior-facing side) or both sides with a hydrophobic coating so that water sheets off and does not leave marks or other image-distorting remnants or spots. Additionally, a heater/heating element may be included in the housing, which can reduce frost on the housing and/or the lens. A thermostat may rest on, or otherwise attach to, the heating element. In some embodiments, the heating element may comprise a PTC (Positive Temperature Coefficient) heater comprising ceramic PTC heating elements or polymer PTC heating elements. As shown, for example, in FIG. 42, in some embodiments, the PTC heater may be positioned on the back of the lens in a trace layout with a ring shape surrounding the window portion, and the thermostat attached thereto, covering the heater trace as shown. In other embodiments, the heater and/or thermostat may be positioned differently in the housing.

TABLE 1

| Item | Quantity | Description |
|---|---|---|
| 1 | 1 | CAMERA HOUSING |
| 2 | 1 | MOUNTING BASE |
| 3 | 1 | BOTTOM COVER |
| 4 | 1 | TOP COVER |
| 6 | 2 | CONTOURED WASHER |
| 9 | 1 | PROTECTIVE LENS |
| 12 | 2 | RUBBER GROMMET |
| 14 | 8 | SCREW |
| 15 | 4 | HEXAGON SOCKET BUTTON HEAD CAP SCREW |
| 16 | 2 | HOUSING SEALING GASKET |
| 17 | 2 | HEXAGON SOCKET BUTTON HEAD CAP SCREW |
| 18 | 2 | MOUNTING BASE COVER |

TABLE 2

| Item | Quantity | Description |
|---|---|---|
| 3 | 1 | BACK, CAMERA HOUSING, SMALL WINDOW, LEFT |
| 2 | 1 | MOUNTING BASE, CAMERA ASSEMBLY |
| 3 | 1 | HOUSING BOTTOM COVER, ALUM., THIN, W/HOLES |
| 4 | 1 | FELT STRIP, CAMERA ASSEMBLY |
| 5 | 1 | SCREW KIT, MOUNTING HARDWARE, CAMERA ASSEMBLY |
| 6 | 2 | LOCK NUT |
| 7 | 2 | WASHER, FLAT |
| 8 | 1 | GROMMET, EPDM LIQUID TIGHT |
| 9 | 4 | FOAM-SD CARD DOOR |
| 10 | 8 | TAMPER RESISTANT BUTTON HEAD O-RING |
| 11 | 2 | SOCKET BUTTON HEAD O-RING |
| 12 | 2 | O-RING, STEAM RESISTANT |
| 13 | 1 | HOUSING TOP COVER, ALUM., THIN, W/HOLES |
| 14 | 1 | PROTECTIVE LENS, HYDROPHOBIC COATING ON ONE SIDE |
| 15 | 1 | HARNESS, HOUSING, HEATER, CONDUCTOR, W/GROMMET |
| 16 | 1 | PROTECTIVE LENS HEATING ELEMENT, PTC HEATER |

TABLE 2-continued

| Item | Quantity | Description |
|---|---|---|
| 17 | 1 | SILICONE SEALANT |
| 18 | 1 | CONN, PACKARD, 2 POSITION RECEPTACLE |
| 19 | 1 | WEDGE LOCK, 2 POSITION |
| 20 | 2 | TERMINAL, PACKARD, PIN, MALE |
| 21 | 1 | THERMOSTAT, SNAP ACTION |

TABLE 3

| Item | Quantity | Description |
|---|---|---|
| 1 | 2 | MOUNTING BASE COVER |
| 2 | 4 | SCREW |
| 3 | 4 | SCREW PHILLIPS FLAT HD |
| 4 | 4 | FLAT WASHER |
| 5 | 4 | SPLIT LOCKWASHER |
| 6 | 4 | NUT, PLUSNUT |
| 7 | 1 | MOUNTING BASE GASKET |

In some embodiments, the housing is tubular, with a removable panel such as a top cover and/or a bottom cover that attach to the housing by means of, for example, screws, bolts, rivets, welds or otherwise. In some embodiments, at least one cover is attached to the housing using attachment devices that can be easily removed, such as screws. In some embodiments, the top cover and/or the bottom cover may be made of aluminum plate, which is sturdier than plastic, and resists bowing at the center and/or compression of the gasket at the center. The camera/sensor housing body may be made of extruded aluminum or aluminum alloy for lightness and strength. A finish may be added thereto (e.g., a black powder coating, textured). The camera/sensor may be positioned in the housing as shown, for example, in FIGS. 5, 10, 11, and 12 (in which the camera position is indicated by dotted lines) and/or FIGS. 65, 67, and 68. The camera/sensor may permanently reside in the housing, or may be removable. For example, the camera/sensor may slide into and out of the housing. The camera/sensor may fit into the housing with little to no additional clearance to prevent movement inside the housing. For example, a top cover and a bottom cover may prevent vertical camera/sensor movement. In some embodiments, a mechanical, magnetic or other type of spacer or wear pad, such as a strip of felt inside the housing (see, e.g., FIG. 34 numeral 4 and FIG. 67), may prevent camera/sensor movement and provide mechanical damping. In some embodiments, the housing includes one or more gaskets that seal the enclosure, providing additional protection from the outer elements. In some embodiments, one or more gaskets create a vacuum inside the housing that slows the deterioration of internal components, extending the expected life of the camera/sensor. The one or more gaskets may additionally prevent camera/sensor movement within the housing. In some embodiments, a flat sealing gasket may be provided which includes a groove machined in the top and bottom walls of the housing body and an O-ring that rests in the groove and seals the assembly (see, e.g., FIGS. 34, 67 and 68). In some embodiments, the O-ring may be made of a durable synthetic rubber, such as a steam resistant EPDM (ethylene propylene diene monomer) rubber.

Figure 12:
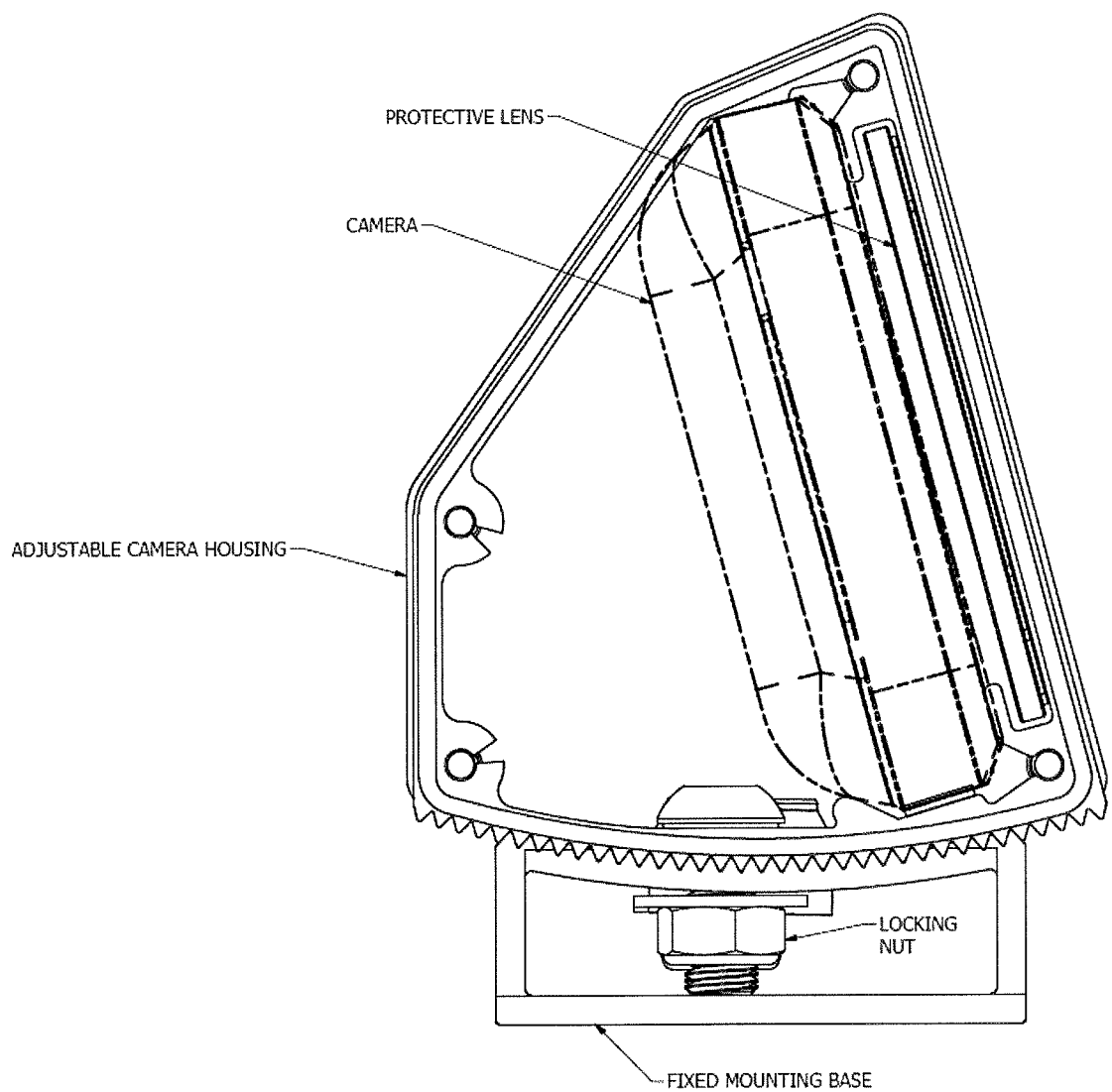
FIG. 12 is a bottom view of a camera/sensing device housing and mounting hardware according to some embodiments.
Figure 13:
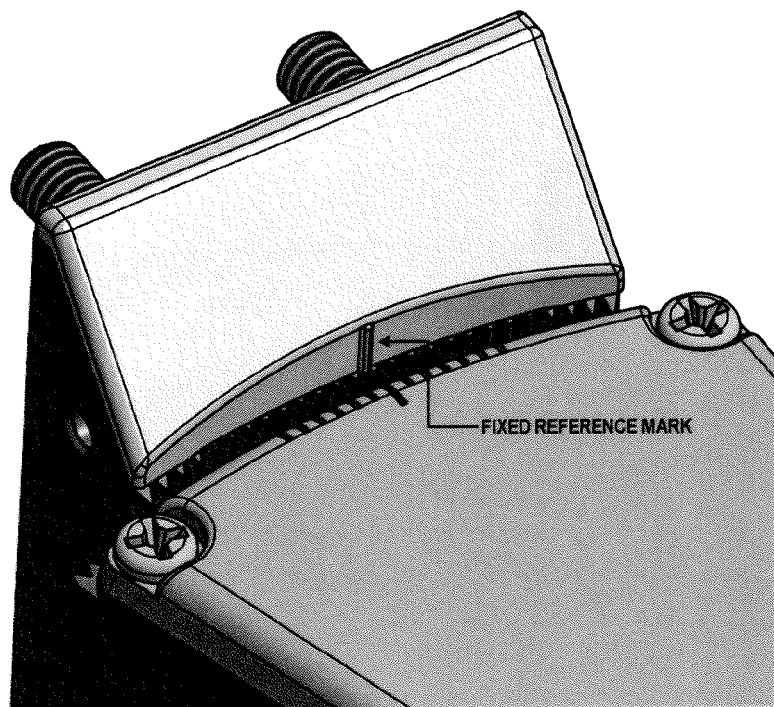
FIG. 13 is a perspective view of a camera/sensing device housing and mounting hardware according to some embodiments.
Figure 14:
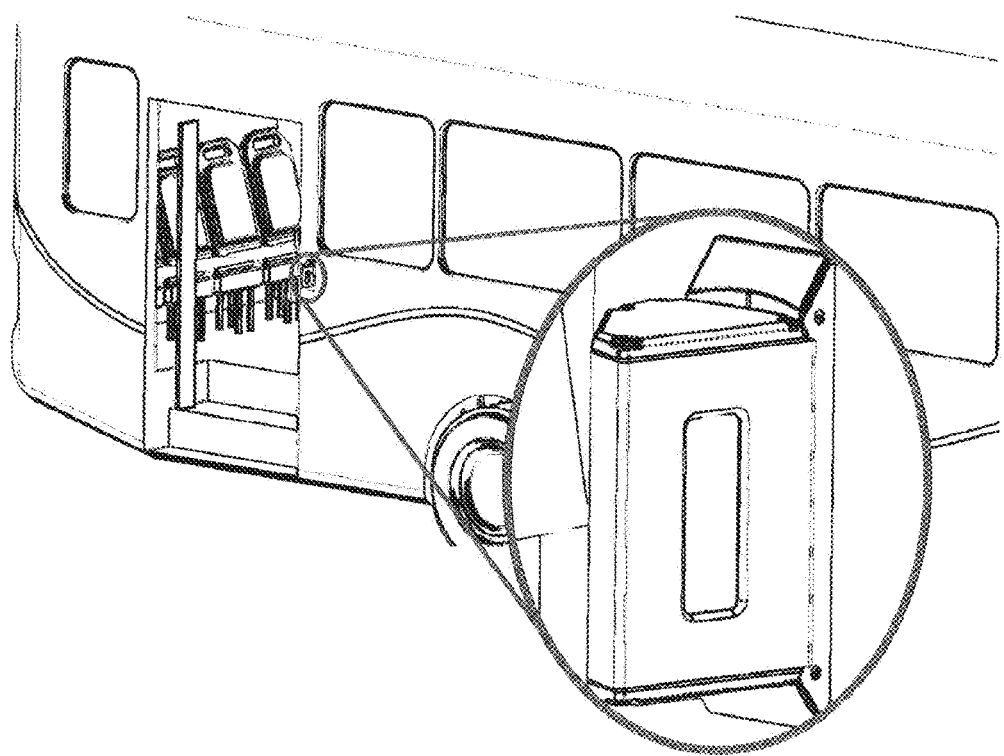
FIG. 14 is a perspective view of a camera/sensing device mounted on the rear passenger side of a vehicle according to some embodiments.
Figure 34:
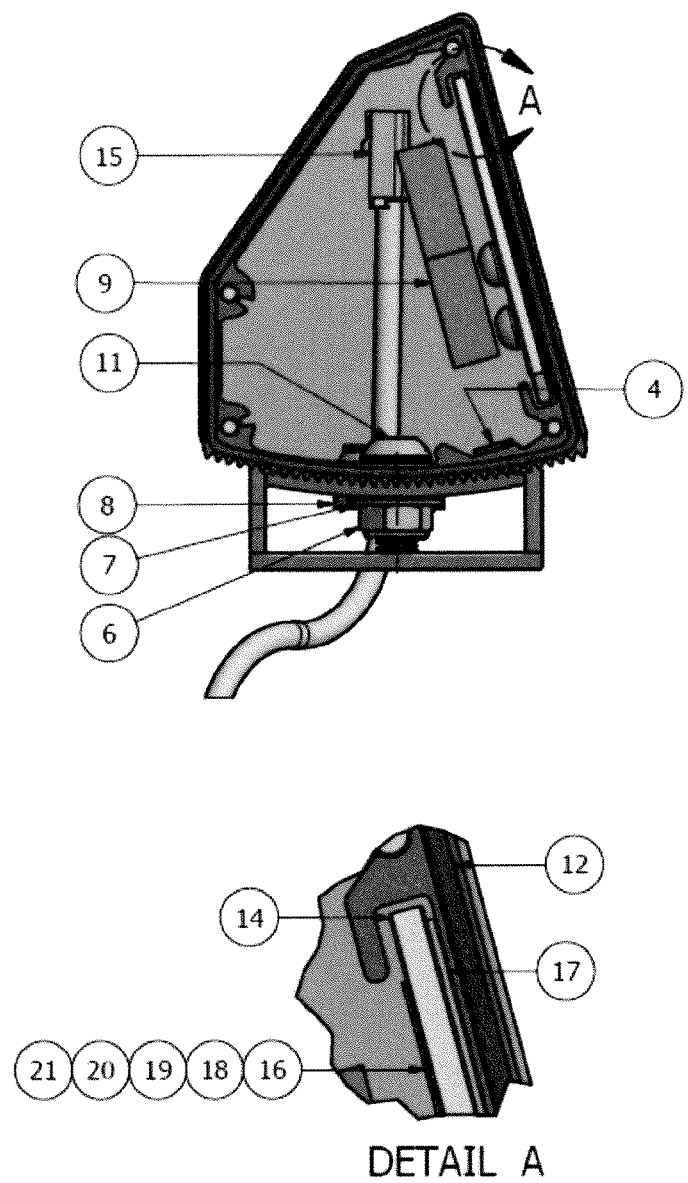
FIG. 34 is top view of a camera/sensing device housing and mounting hardware with top cover removed according to some embodiments, including a detail of section A.
Figure 35:
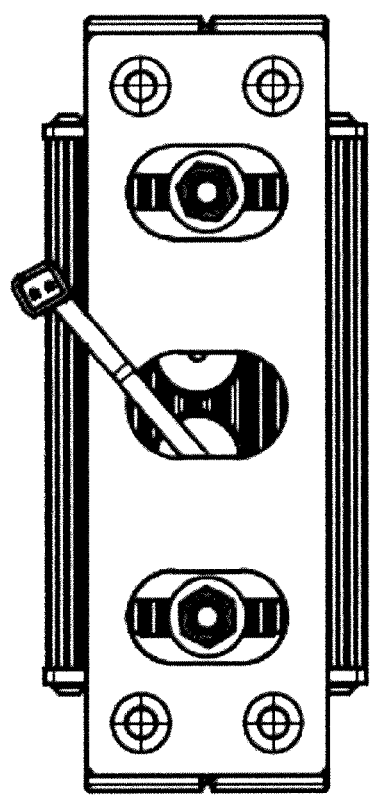
FIG. 35 is a rear view of a camera/sensing device housing and mounting hardware according to some embodiments.
Figure 36:
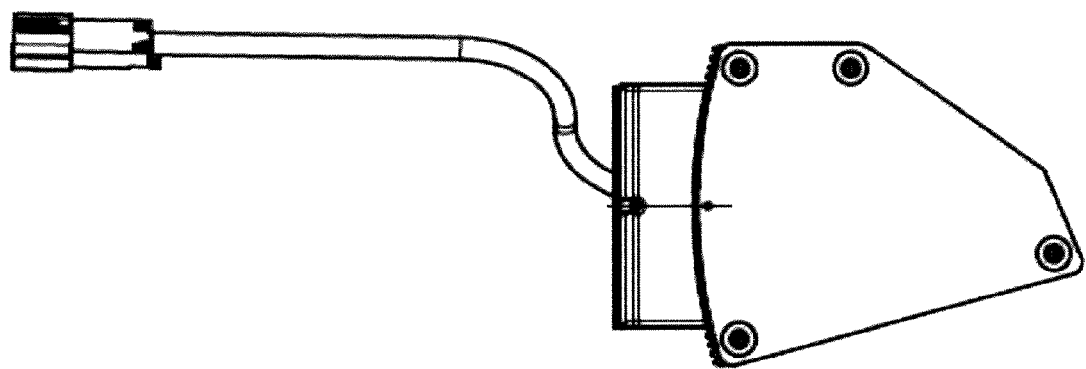
FIG. 36 is a top view of a camera/sensing device housing and mounting hardware according to some embodiments.
Figure 37:
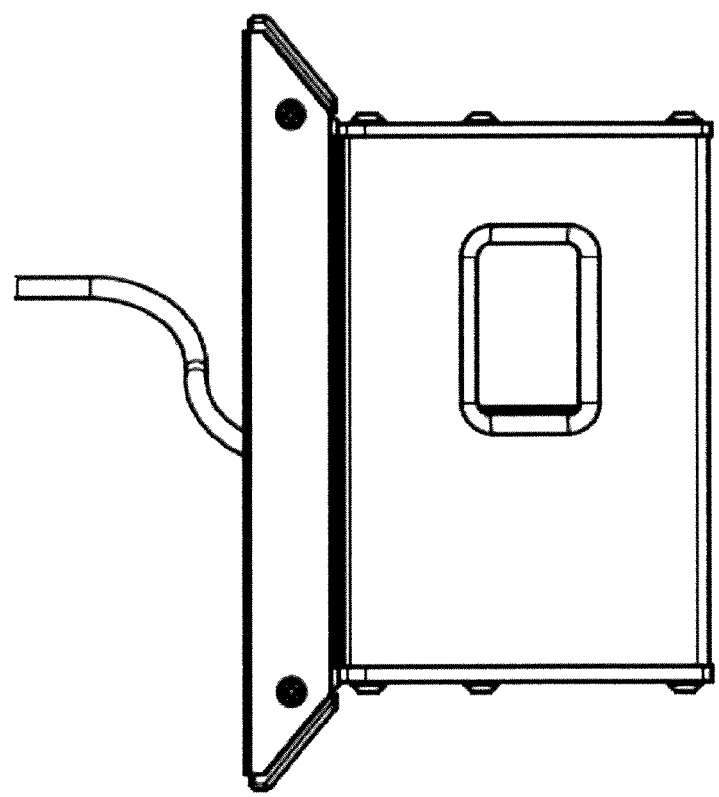
FIG. 37 is a front view of a camera/sensing device housing and mounting hardware according to some embodiments.
Figure 38:
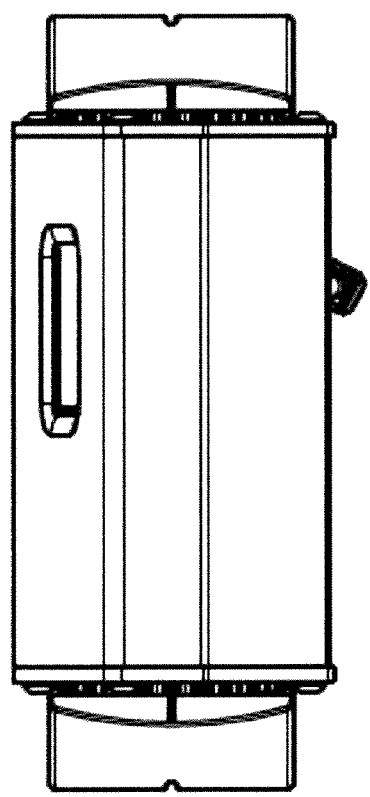
FIG. 38 is a side view of a camera/sensing device housing and mounting hardware according to some embodiments.
Figure 39:
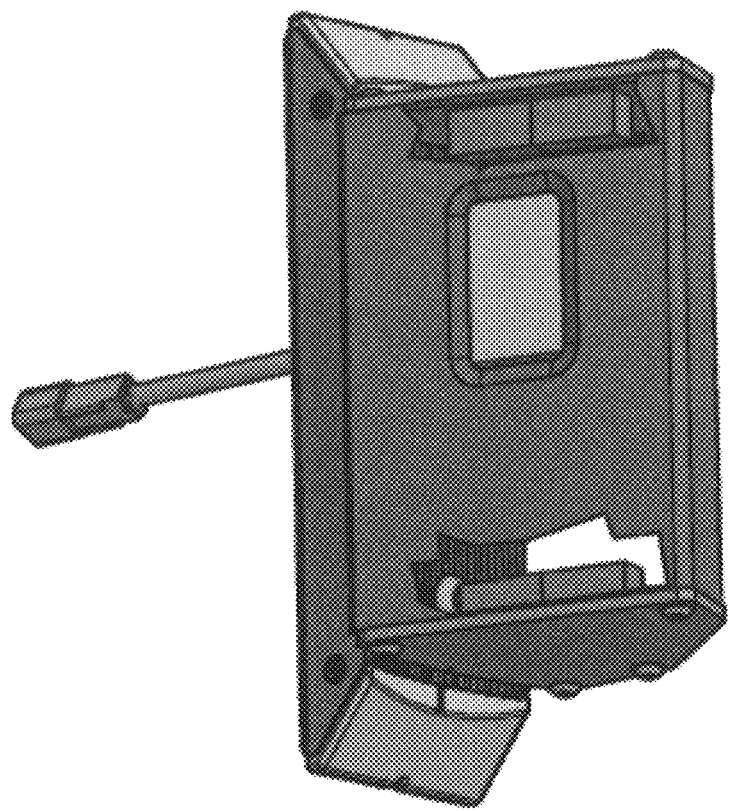
FIG. 39 is a perspective view of a camera/sensing device housing and mounting hardware according to some embodiments.
Figure 40:
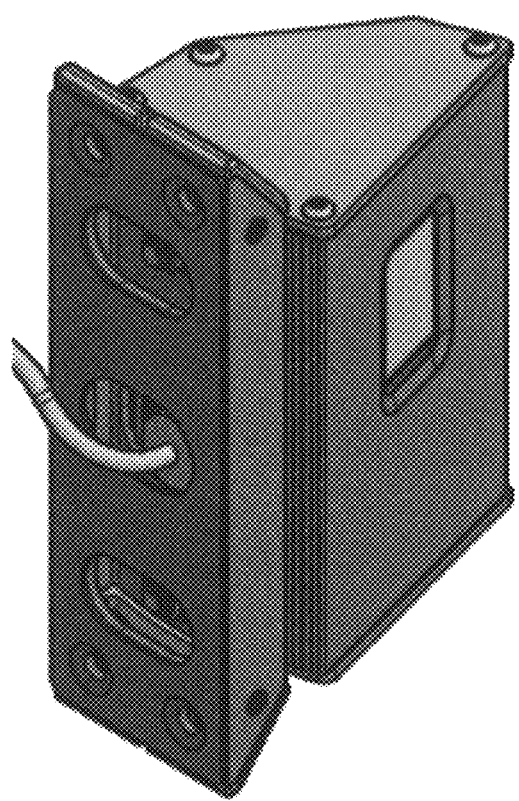
FIG. 40 is a perspective view of a camera/sensing device housing and mounting hardware according to some embodiments.
Figure 41:
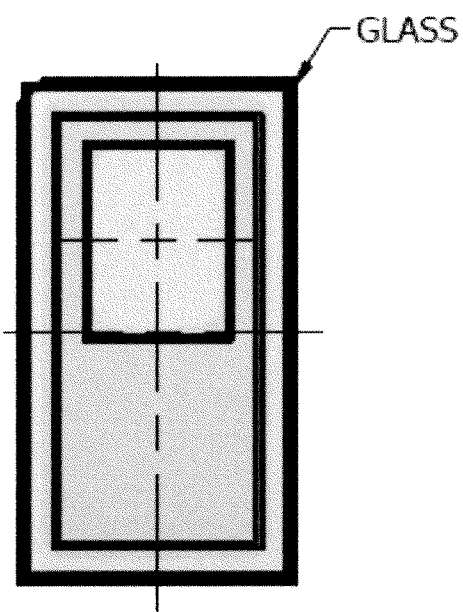
FIG. 41 is a front view of a protective lens for a camera/sensing device housing according to some embodiments.

The housings may attach to the vehicle directly, or via a mounting bracket or other attachment device, with the use of screws, bolts, rivets, welds or other connection mechanism. In some embodiments, the housing is attached to the vehicle using a mounting bracket that receives the housing at an pivotable interface that permits the rotation of the camera/sensing device with one or more degrees of freedom. In some embodiments, the camera/sensing device housing is limited to rotational movement in a single direction. In other embodiments, the camera/sensing device housing can rotate in two directions with an additional pivot mechanism or three directions using a three dimensional pivot, such as a standard ball and socket mechanism. For example, the pivot may include fixed mechanical spacings or a continuous range of rotation. The pivot may be controllable mechanically, electrically, magnetically or otherwise. The housing may include incremental angular adjustments of, for example, 1° increments, that may be achieved, for example, by using a mechanical teeth engagement between the housing and the base, as illustrated in FIGS. 12, 13, and 34. For example, a locking nut may be loosened to allow the teeth to temporarily disengage, permitting the housing to pivot to a new position. Alternately or additionally, the pivot may be controlled by a remote electronic interface, for example, via a control panel accessible to the driver. The housing may be configured to be weather proof to an IP-69 rating. The housing comprises a material strong enough to withstand the impacts of driving and bus washes, and may be constructed so as to hide any wiring.

The housing may be constructed using a thermally conductive material so that the housing acts as a heat sink by remaining in full or substantially full contact with one side of the camera/sensor either directly or indirectly, while the housing remains in full or substantially full contact with a thermally conductive portion of the vehicle such as the body panel, either directly or indirectly.

In some embodiments, interior cameras/sensors are secured in interior housings as illustrated, for example, in FIGS. 43-51. FIGS. 43-47 show an exemplary side camera/sensor assembly with a hinged bracket, according to some embodiments. A fixed plate can be mounted to the windshield (e.g., via an adhesive pad or other attachment mechanism), while a pivoting plate attached to the fixed plate via a hinge can pivot about a pivot axis. A camera/sensor can be attached to the pivoting plate, which has an opening or transparent window therein for the camera lens. The camera/sensor may comprise a standard sensor system. This hinged bracket provides adjustability, for example, for a left front interior camera, mounted to a left hand corner of the windshield, which may need to be adjusted to about 45 degrees with respect to the direction of travel. FIGS. 48-51 show an exemplary camera/sensor assembly for a forward-view (e.g., front center) camera with adjustable mount, according to some embodiments. Windshield mount brackets can be attached to the windshield (e.g., via adhesive pads or other attachment mechanism) and camera mount brackets can be attached thereto via locking screws. As shown, for example, in FIG. 51, the camera mount brackets are configured to be movable in relation to the fixed windshield brackets and locking screws, so that the camera is movable about a pivot axis and can be adjusted so that the camera lens points straight forward regardless of the camera's position on the windshield. Thus the forward-view "center" camera is adjustable, and its positioning on the windshield can be varied. In some embodiments, the mounts shown in FIGS. 43-51 are advantageously universal, so that they can be used in any type of transit bus or other vehicle. These mounts may be used in place of, for example, one or more of the fixed-mount cameras/sensors shown in FIG. 28, which are located on the windshield near the dashboard (left, center, and right).

Figure 59:
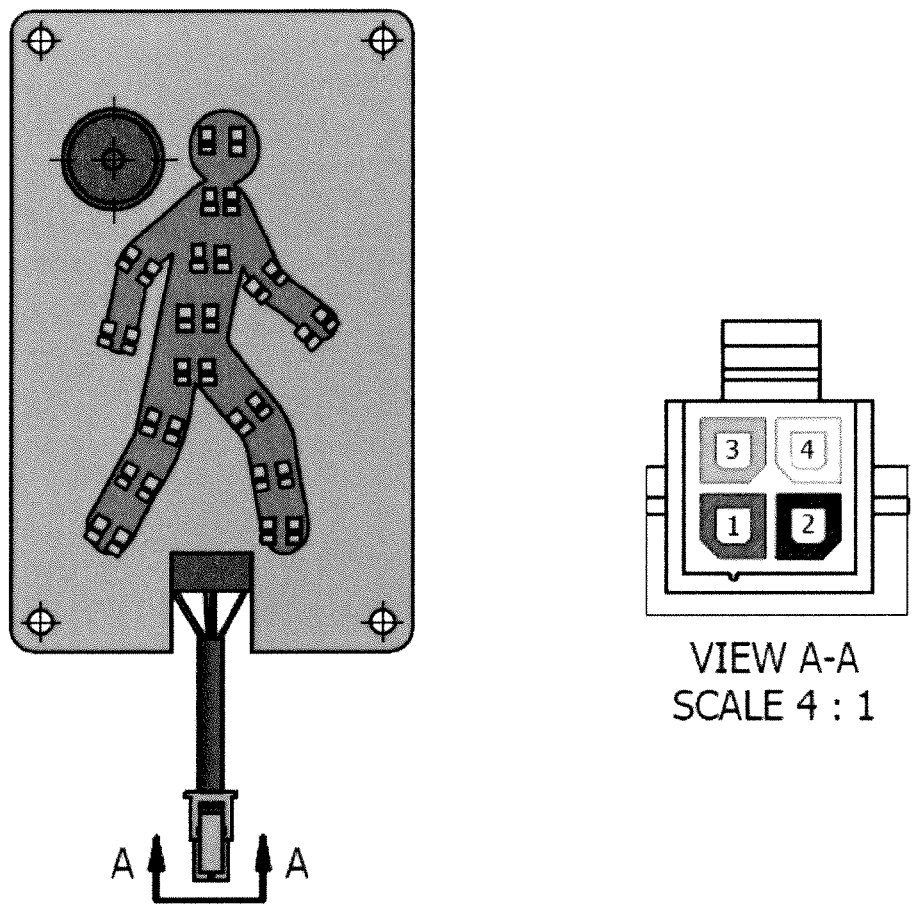
FIG. 59 is a front view of a pedestrian detection warning circuit board according to some embodiments, including an end section A-A.
Figure 60:
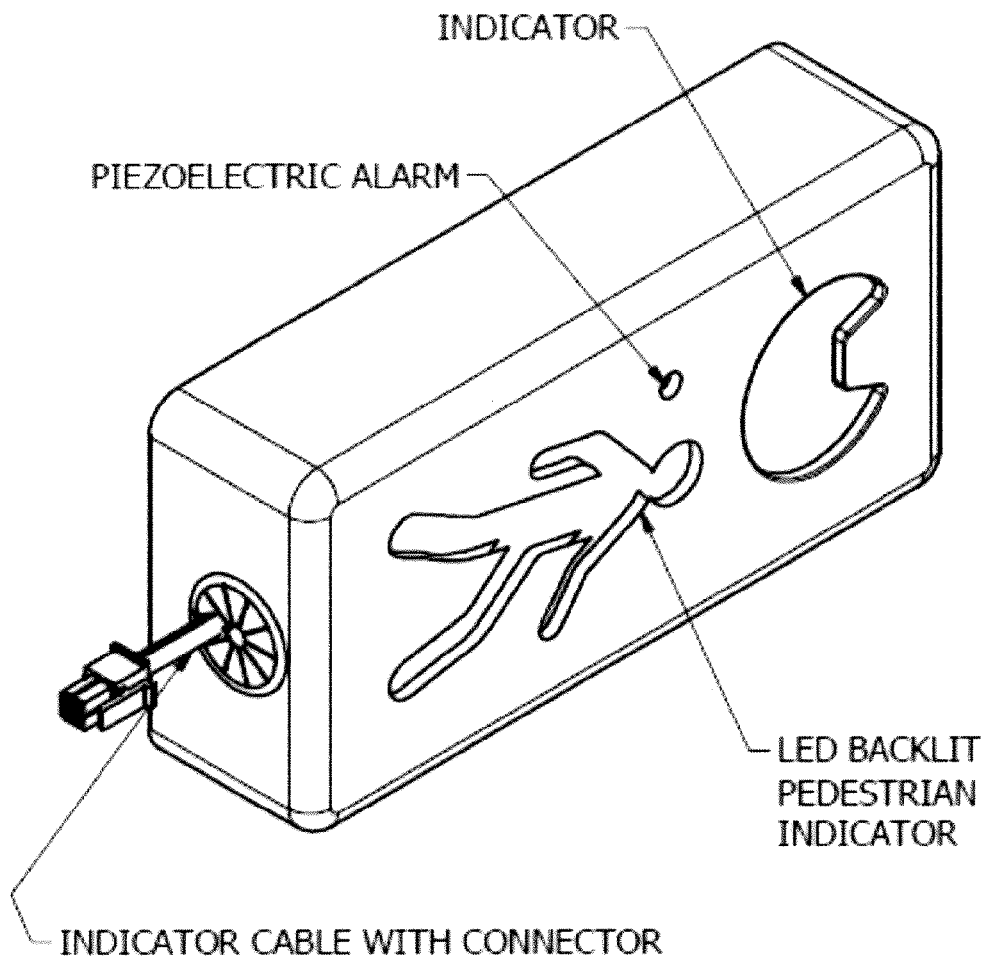
FIG. 60 is a perspective view of a pedestrian detection display with alarm according to some embodiments.
Figure 61:
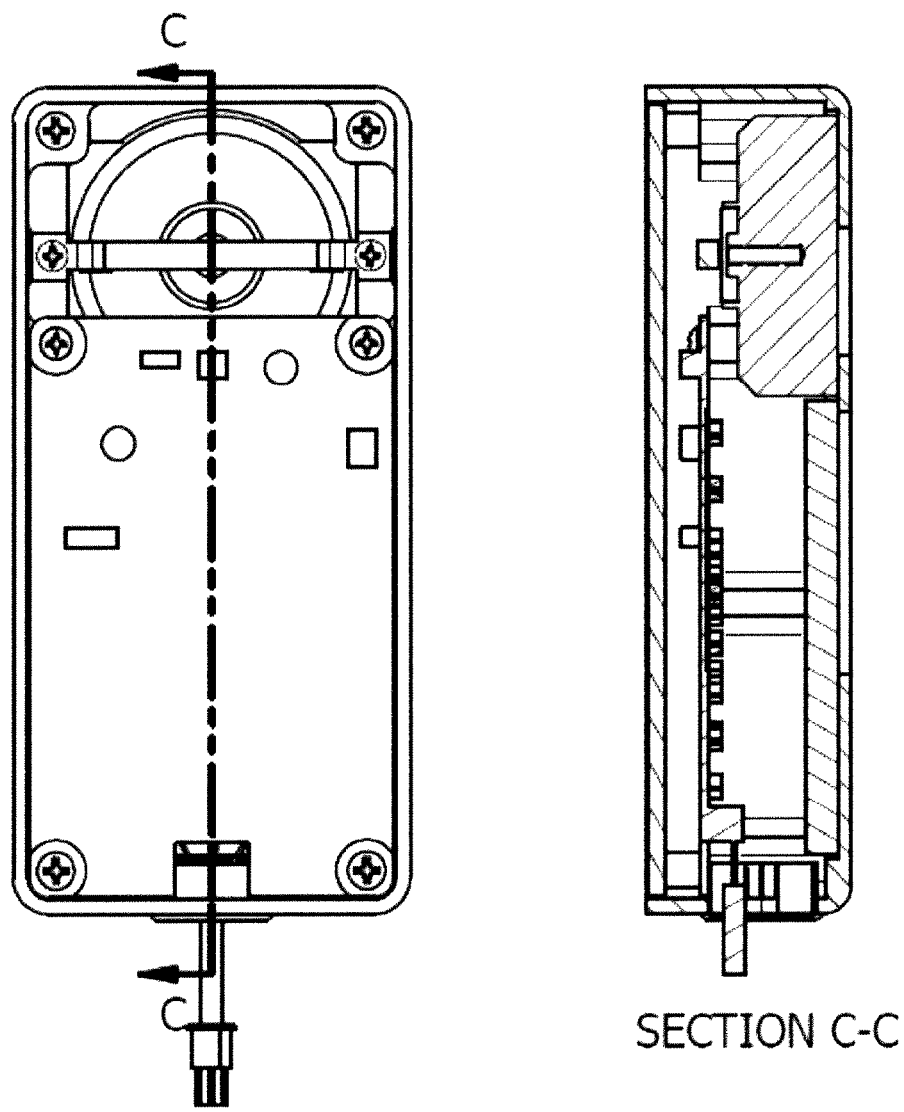
FIG. 61 is a back view of a pedestrian detection display housing and mounting hardware according to some embodiments, including a side section A-A.
Figure 62:
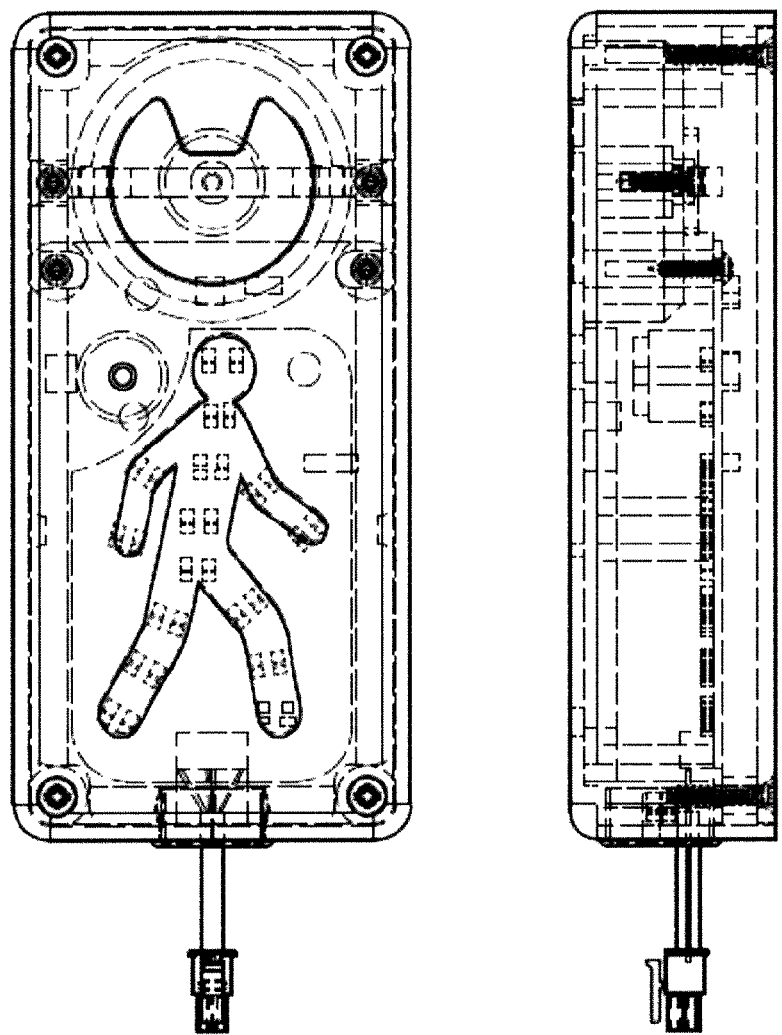
FIG. 62 is a front view of a pedestrian detection display with alarm according to some embodiments, including side section as in FIG. 61, with housing shown in dotted lines to reveal the circuit board therein.
Figure 63:
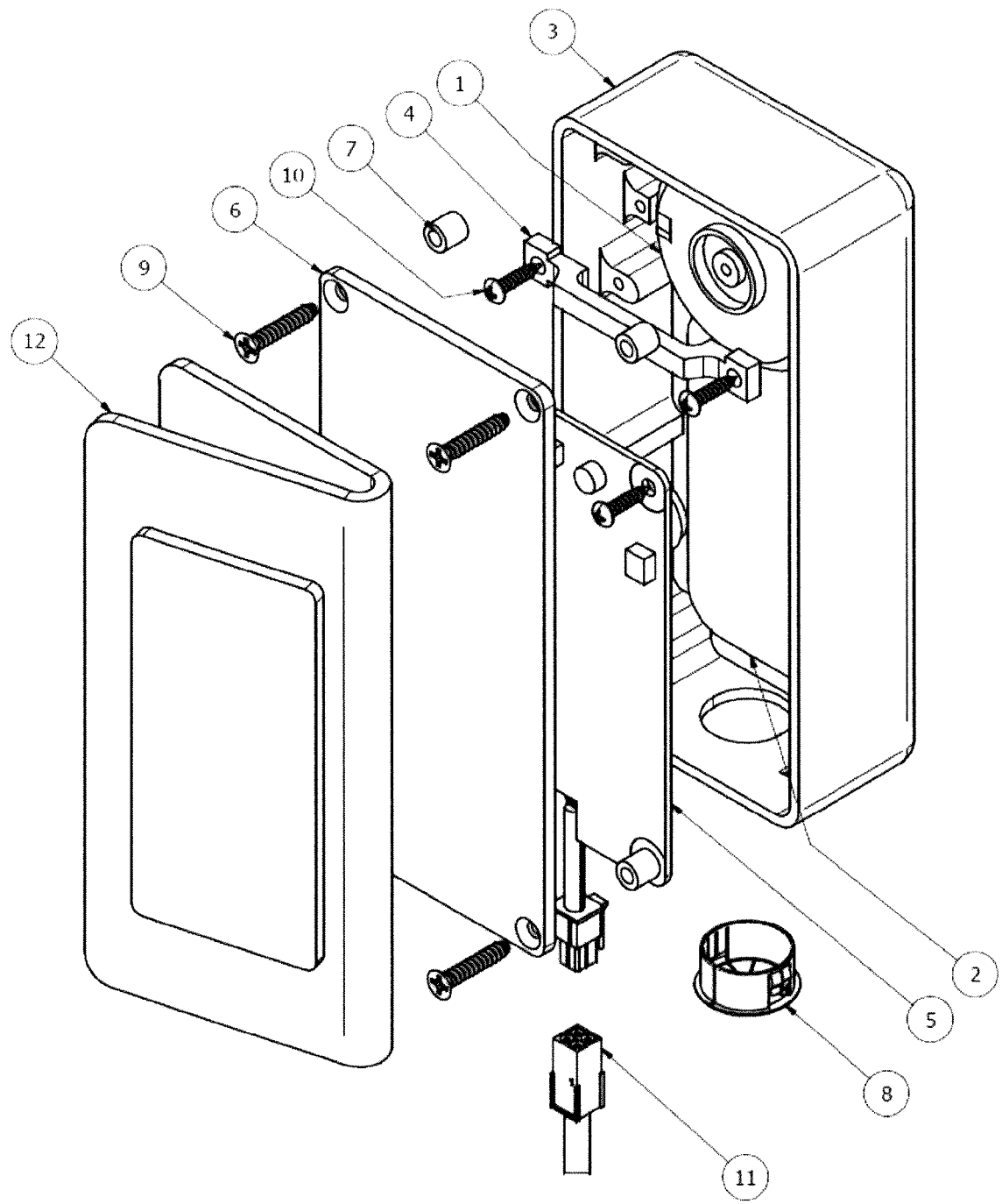
FIG. 63 is a perspective view of a pedestrian detection display housing and mounting hardware, unassembled, according to some embodiments.

In some embodiments, the system may include a graphic driver interface including a series of alarms activated when a hazard, such as the presence of pedestrians in a location where they may be hit by a turning vehicle, is detected, for example, a series of readouts comprising electronic display screens that light up with a graphical representation of a pedestrian and/or a series of audible alerts. An example driver interface is illustrated in FIG. 28. The readouts may be distributed around the cockpit/driving area of the vehicle to present an alert corresponding to the location of a hazard or of a collision risk, and at pre-defined locations where the driver is likely to look. For example, a left side readout may be mounted to the left A pillar or B pillar near the left mirror where the driver might be looking during a left turn, and similarly for a right side readout. In some embodiments, the right side readout may provide alerts for a right rear camera/sensor, and the left side readout may provide alerts for both a left rear camera/sensor and a left front camera/sensor. A center readout, which may be associated with one or more front and/or front center cameras/sensors and/or one or more rear and/or rear center cameras/sensors, may be positioned at or near the center of the dashboard, or at or near the upper center of the windshield. Where multiple cameras/sensors detect the same hazard or collision risk, the system may, but need not, distill the multiple detections into a single visual alarm and/or audible alert. FIGS. 53-59 show an exemplary right side readout, comprising a right hand display with LED backlit pedestrian indicator and piezoelectric alarm, according to some embodiments. Table 4 lists the exemplary parts labeled in FIGS. 53 and 55. The pedestrian detection warning LED board with piezoelectric alarm (shown in further detail in FIGS. 56-59) fits inside a molded housing, with back plate and mounting hardware attached thereto to form the side readout assembly as shown, for example, in FIG. 55. As shown in FIG. 59, the LED array on the circuit board may be arranged to match the pedestrian graphic cutout in the housing. The connector may include four pins (e.g., #1-+ 12V to 24V DC power; #2-ground; #3-red danger LED, negative trigger; #4-yellow warning LED, negative trigger). A separate opening in the housing (see FIGS. 53, 55) may be provided for the piezoelectric alarm. The piezoelectric alarm may provide an audible alert, for example, of about 85 dBA (decibel A-weighting) at 10 cm (2300±300 Hz). In some embodiments, the mounting hardware may comprise a base with a fixed angle (e.g., about 15 degrees). In other embodiments, the base may have an angle of another fixed value or may have an adjustable angle.

TABLE 4

| Item | Quantity | Description |
| --- | --- | --- |
| 1 | 1 | HOUSING, PEDESTRIAN DISPLAY |
| 2 | 1 | PLATE, BACK, MOLDED, PEDESTRIAN DISPLAY |
| 3 | 1 | ACRYLIC PLATE, PEDESTRIAN DETECTION DISPLAY |
| 4 | 1 | PEDESTRIAN DETECTION WARNING LED BOARD WITH PIEZOELECTRIC ALARM |
| 5 | 1 | CAP, STRAIN RELIEF |
| 6 | 1 | HARNESS, EXTENSION |
| 7 | 4 | SCREW, FLAT HEAD PHILLIPS |
| 8 | 1 | MOUNTING HARDWARE KIT, DISPLAY |

The center readout may comprise an electronic display as described above, which may include an oversized pedestrian graphic and/or may include a readout for collision alerts, lane departure warning, headway monitoring, etc. from a standard sensor system. FIGS. 60-63 show an exemplary center readout, comprising a center display with LED backlit pedestrian indicator with piezoelectric alarm and eye watch indicator. Table 5 lists the exemplary parts labeled in FIG. 63.

TABLE 5

| Item | Quantity | Description |
| --- | --- | --- |
| 1 | 1 | EYE WATCH, PEDESTRIAN DISPLAY, CENTER |
| 2 | 1 | ACRYLIC PLATE, PEDESTRIAN DETECTION DISPLAY |
| 3 | 1 | HOUSING, PEDESTRIAN DISPLAY, CENTER, BLACK |
| 4 | 1 | EYE WATCH BRIDGE LOCK, DISPLAY, CENTER |
| 5 | 1 | PEDESTRIAN DETECTION WARNING LED BOARD WITH PIEZOELECTRIC ALARM |
| 6 | 1 | PLATE, BACK, ACRYLIC, PEDESTRIAN DISPLAY (CENTER) |
| 7 | 4 | SPACER, NYLON |
| 8 | 1 | OPEN/CLOSED UNIVERSAL BUSHINGS |
| 9 | 4 | SCREW, FLAT HEAD PHILLIPS |
| 10 | 4 | PAN HD PHILLIPS SCREW |
| 11 | 1 | HARNESS, EXTENSION |
| 12 | 1 | MOUNTING HARDWARE KIT, DISPLAY, CENTER |

The audible alerts may be placed near the visual alerts (e.g., on the same readout as described above) or near the driver's head to present an increased directional awareness of the location of the danger. Outputs from the system may also include seat vibration or other forms of awareness such as seat headrest speakers and the like.

In some embodiments, the graphic driver interface may include two visible stages: an awareness stage and a warning. The visual alert may include a pedestrian graphic lit in yellow or amber to provide awareness of a pedestrian in range of a danger zone. The visual alert may then turn to red and the system may warn audibly if the system calculates that the pedestrian and bus are on a collision course. This calculation may be based on algorithms that determine a time to collision (TTC) based on the speed of the bus and trajectory of the pedestrian's movement, such that the system triggers an alarm if the calculated TTC falls within a preset threshold or other criteria indicating that a collision is possible or probable.

In some embodiments, the system and/or method avoids and/or minimizes false positives. A false positive is a detection warning when, for example, no risk is present and/or other predetermined conditions that are optionally user selectable are not met. The wider the area of coverage and sensitivity, the greater the sensing during normal driving that can lead to false positives. For example, driving straight with a side facing camera/sensing device engaged can lead to false positives when the cone of coverage is too wide. The system calculates a TTC based on trajectories that, given the increased speed of straight travel, become too inclusive and cognizant of pedestrians even 15-20 feet away alongside the bus where there is no risk of being hit.

False positives can be reduced or eliminated by, for example, turning off the side camera/sensing device outputs or reducing the sensitivity of the side cameras/sensing devices above a preset speed such as 12-15 mph. Additionally or alternately, the side cameras/sensing devices can have their outputs cut off or their sensitivity reduced except when the vehicle is detected to be in a turning activity. This detection can occur, for example, based on steering wheel turn sensing, gyroscopic sensing, actual wheel sensors tied to the vehicle Controller Area Network (CAN bus) system, multiplex system or other user selectable parameter. The system and/or method triggers the cut off of predetermined side cameras/sensing devices and/or front cameras/sensing devices, based on criteria such as the amount of a vehicle turn to ensure, for example, that the vehicle is committed to a turn which would represent a collision risk with the pedestrian before triggering the outputs or increasing the sensitivity of the side cameras/sensing devices. For example, a 10° turn to pull into a bus stop may be considered too little to engage the side cameras/sensing devices because the system should not be actively outputting at a bus stop where the risk of pedestrian collision is reduced for the side cameras/sensing devices when the vehicle is pulling into the bus stop. In contrast, once a turn exceeds a threshold such as 30° the system outputs are activated for the predetermined cameras/sensing devices. In some embodiments, the sensitivity of cameras/sensing devices that are not in the path of a turning bus may be decreased or the camera/sensing device outputs cut off while the bus is in the process of turning, for example, so alarms are not triggered by pedestrians, birds or other hazards that are not in likely to be in the path of the bus. In some embodiments, the system and/or method remains active and the side cameras/sensing devices continue to collect and store data, but the processors ignore the data collection for the determination of a potential collision when the side cameras/sensing devices are cut off. That is, in some embodiments, the data from the side cameras/sensing devices are merely ignored for a predetermined time period determined by when the potential for false positives is unacceptably high as programmed by the user or preset by the system/method.

In some embodiments, the camera/sensing device outputs and/or increased camera/sensing device sensitivity may be responsive to, or a function of, the speed or acceleration of the bus such that if the bus is turning faster and/or accelerating into a turn, the camera/sensing device sensitivity is increased, for example, in order to increase the response rate to compensate for the decreased time to a potential collision that results from the faster bus speed. Similarly, the camera/sensing device sensitivity may be decreased in response to a decreasing bus speed or acceleration while a turn is detected. Additionally and/or alternatively, the camera/sensing device sensitivity may be responsive to, or a function of, a changing turning angle, such as a first or higher order derivative of the turning angle with respect to time. For example, the camera/sensing device sensitivity may increase in response to the detection of a sharp, accelerating turn, and vice versa.

In some embodiments, the system and/or method may include an infrared (IR) illumination system to provide for night vision. One or more infrared illumination devices may be provided below or on top of each camera/sensing device or within the camera/sensing device, or a pair of such devices may be provided on either side of each camera/sensing device, to provide a field of view around the vehicle in levels of light approaching total darkness. The IR illumination system may be provided as an LED lighting strip, an incandescent light source or as some other type of illumination. The details of various illumination systems are described by the present assignee's U.S. Pat. No. 9,286,521, incorporated herein by reference.

Additionally or alternatively, an automatic target recognition (ATR) may be provided with one or more of the cameras/sensing devices. FLIR (Forward-Looking Infrared) systems, LIDAR (Light Detection And Ranging)/LADAR (Laser Detection And Ranging) and infrared laser (light amplification by stimulated emission of radiation) sensors are well known for sensing and tracking people or stationary or moving objects. Such ATR systems may be programmed to be particularly sensitive to detect and track images of people or children or other passersby in close proximity to the bus, for example.

Thus, such ATR systems, when used in combination with pedestrian detection systems and methods according to the present invention may be particularly useful to avoid accidents involving passersby moving around the vehicle. Such an ATR system may be deployed next to, for example above or below, each camera/sensing device and may be programmed to provide an audio input, or a flashing light or the like when an object is detected. Also, the ATR may track the moving object and a silhouette or outline of the moving object may be highlighted on a monitor provided in the driver's area. Any or all of the cameras/sensing devices could be moved automatically, or under the control of the driver, to follow the detected and tracked moving object near the bus.

The camera/sensing device control may optionally also include signal processing which detects pedestrians moving about the bus and which displays the moving pedestrians in a sharp color on a monitor, for example, red against a background of black, white or grey to allow the driver to keep a sharp eye and maintain sight of nearby pedestrians, for example, while passengers board or disembark the bus. Thereby, the system might be utilized for zooming in or adjusting the precise aim of the cameras/sensing devices while the bus is stationary to monitor a pedestrian or several pedestrians moving in front or alongside the bus by providing images and/or videos in a size that will effectively make their presence known to the driver. The signal processing system may provide an audible alert to the driver such as a buzzing sound as long as the system detects objects that are moving near and about the bus while the bus is parked in order to take on or discharge passengers. In some embodiments, the cameras/sensors may comprise a standard system/sensor system incorporated herein by reference and which offer features such as Forward Collision Warning, Lane Departure Warning, Headway Alert, Pedestrian Detection, Enhanced Object Detection, Automatic Headlight Control, Traffic Sign Recognition, Adaptive Cruise Control, Pre-Crash Collision Mitigation, Autonomous Braking, Blind Spot Detection, Lane Change Merge Assist, Rear Cross Traffic Alert, and/or Rear Pre-Crash Sensing which offer features such as Forward Collision Warning, Pedestrian and Cyclist Collision Warning, Headway Monitoring Warning, Lane Departure Warning, Intelligent High-Beam Control, Speed Limit Indicator, and/or Traffic Sign Recognition.

Also contemplated is a physical sun visor and sun shield provided over each of the cameras/sensors to block a significant portion of sun incident on the camera/sensor lens. Each camera/sensor lens may be covered with a light filter to screen out light or other harsh or bright radiation. In addition, electronic controls may be provided to filter out excessive sunshine or bright lights.

In some embodiments, one or more monitors are included in the driver's cabin. The monitors may be any type of monitors suitable for displaying a video or signal feed in real time, such as CRT displays, LCDs, LEDs, front or rear projection devices, flat panel devices, or the like. There may be a monitor corresponding to each camera/sensor. Alternately, multiple cameras/sensors may map to an individual monitor. For example, a monitor may be programmed to provide a split display showing multiple views provided by multiple cameras/sensors simultaneously. In some embodiments, the system may provide the driver the option of selecting which camera/sensor's image to display on a single monitor. Thus, the driver may switch between the fields of view of the various cameras/sensors by operating a control provided as part of the monitor. Alternatively, a central control may be provided on the dashboard or an otherwise accessible location to allow the driver to select between the various cameras/sensors.

The monitors may be one or more individual units located above the dashboard, or alternately, may be positioned on top of the dashboard, embedded in or formed integrally with the dashboard. The one or more monitors may be individual units, or may be configured as one large monitor providing a display corresponding to all or some of the cameras/sensors such that various portions of the unified monitor would be permanently dedicated to displaying one or more particular fields of view.

According to a further embodiment, the view displayed in the monitor may be automatically switched according to the operation of the bus. For example, when the bus turns left or right, the display of monitor may show the field of view corresponding to the left or right rear-side camera/sensor, respectively. Initially when the vehicle is shifted to the "drive" gear, the outputs of the rear-side cameras/sensors may be immediately shown on a monitor. Alternately, initially and for a period of about 7 to 15 seconds, or thereabout, the output of a forward looking camera/sensor continues to be displayed on a monitor, and thereafter, the output of the left and/or right rear-side camera/sensor begins to be displayed so that as the driver embarks on a trip to a given destination, the displays show the view to the side of the bus to improve the driver's ability to monitor traffic in adjacent lanes. Alternately, a controllable programmer may be provided to allow the driver to select when the different camera/sensor outputs are shown on the monitors, such as in response to the switching of the transmission from "drive" to "reverse" and vice versa. In another embodiment, the forward speed of the bus determines the camera/sensor output displayed on the monitor. For example, the output of a rear-side camera/sensor may be switched to the monitor once the bus has reached a given speed, for example, 10 miles an hour.

Also, the display on a monitor may be controlled based on the engaged gear. For example, after the bus is switched into the drive gear, or first gear, from park or reverse, the output of a forward view camera/sensor may be shown on a monitor. When the bus is shifted into the parking gear, or to first gear from a higher gear, the display in a monitor may be switched to the output of the left and/or right rear-side camera/sensor. These switching modes are provided as examples, and the sequence of displays provided may be programmed according to the convenience of the driver, or according to the wishes of the bus operator company.

Also contemplated is a night view mode for the monitor(s). In night view mode, the brightness of a monitor would be automatically dimmed or subject to driver control so as to prevent driver eye strain. The monitor could be dimmed gradually based on an automatic detection of the level of darkness.

The system may also include a digital video recorder (DVR), including memory, which receives signals from some or all or of the cameras with video capture capability. These DVRs may record the camera signals while the bus is in motion and/or while there is any activity in and around the bus. The recording can occur, for example, in response to detection of an approaching pedestrian or other hazard, in response to a dashboard pushbutton and/or when the bus is left unattended so as to prevent vandalism and theft.

In some embodiments, the system also includes an interior cabin camera, which provides the driver with a view of the inside of the vehicle. The interior cabin camera may be positioned just above the windshield in the driver's cabin or may be positioned posterior to the driver's cabin inside the vehicle. Particularly for a bus or other large vehicle application, the interior cabin camera affords the driver a view of what is happening inside the vehicle behind the driver in real time. Video from the interior cabin camera may be displayed on a monitor.

Figure 29:
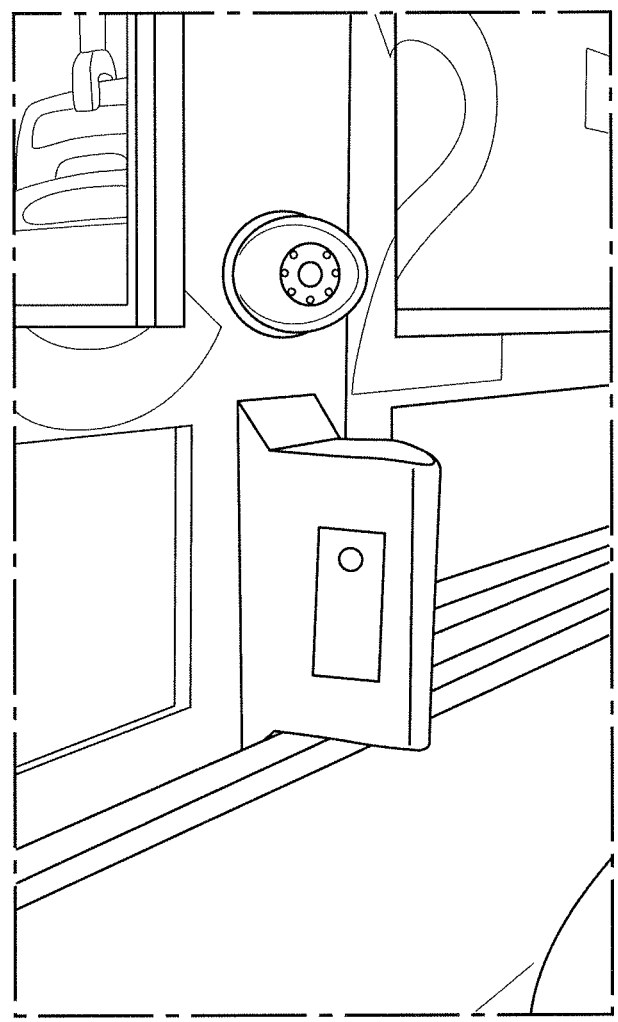
FIG. 29 is a perspective view of a vehicle with a camera/sensing device and a video camera mounted proximal to one another according to some embodiments.

In some embodiments, the system also includes one or more video cameras installed in addition to the cameras/sensors described above. For example, where the camera/sensor systems used for pedestrian detection do not have video capture functionality, one or more additional video cameras may be installed near each camera/sensor, for example, immediately above or below each camera/sensor. The captured video can be used, for example, for testing, verification and/or training, sent to a driver or fleet-manager monitor, stored via a DVR, and/or otherwise. For example, the captured video can be compared to the data detected by the camera/sensor to confirm that a detected pedestrian is sufficiently close to warrant an alarm. Similarly, the captured video can be used to confirm that the detection system was correct in not issuing an alarm and/or incorrect in issuing an alarm. Accordingly, this comparison can be used, for example, to tune the sensitivity of the detection system, train a driver by allowing the driver to review events and experience the alarm conditions and/or allow for monitoring by a fleet manager, optionally in real-time for driver performance. An exemplary embodiment of a camera/sensor and a video camera mounted proximal thereto is illustrated in FIG. 29. An exemplary embodiment of a camera/sensor with video camera mounted to the bottom cover of the exterior housing is illustrated in FIGS. 52 and 71-77. In alternative embodiments, the mount may comprise a mounting bracket with a hinge and a fixed plate, or other suitable mount, rather than the fixed mounting base as shown, for example, in FIGS. 29, 37, 39, and 64 and FIGS. 52 and 71-77. In some embodiments, a standard bullet camera is used that has a mount attached to that screws into the housing, and therefore, no additional mounting to the bus is required. A cable runs to the camera from the housing. The camera can be a standard CMOS camera and/or standard bullet camera. In some embodiments, the camera is connected to the bottom plate of the housing. Alternatively, the camera can be connected to any plate of the housing that allows the camera to provide an additional view that tracks the detector/camera used within the housing. According to this alternative embodiment, the invention advantageously uses cameras and/or detection devices to ascertain accuracy of collision avoidance for the cameras and/or detectors within the housing that will be used in real-life/live situations. In some embodiments, multiple video cameras may be mounted at various locations around the vehicle to create a video environment. For example, two video cameras may be mounted at the rear of the vehicle, one on the left side of the vehicle and one on the right, and two video cameras may be mounted at the front of the vehicle facing rearward, one on the left side of the vehicle and one on the right, all of which can be oriented to capture video of the desired target areas. Optionally, a fifth camera may be mounted inside the cabin behind the driver, for example four feet behind the driver, and oriented to capture the driver and the graphic driver interface including the pedestrian readouts. These video feeds can be used, for example, during test runs where a driver's reactions to various events, with and without alarms, are recorded and subsequently reviewed, for example, to test how the driver reacts to the presence or absence of various alarms, for driver training, or otherwise. In some embodiments, the video feeds are, for example, displayed to the driver during operation, stored for later review, for example, to determine what happened during an accident, used for real-time fleet manager review, and the like.

In some embodiments, one or more dual-vision cameras (e.g., a dual view video camera) may be provided inside the vehicle, for example, on the windshield. Dual-vision cameras can provide views inside and outside of the vehicle. For example, a first built-in camera can capture footage from a forward perspective, while a second can record the activity of drivers and passengers. Views from one or more dual-vision cameras can be compared with views from one or more outside cameras to track movement of pedestrians around the vehicle. In some embodiments, the pedestrian detection system may comprise, for example, one dual-vision windshield camera (e.g., Rosco DV231, a high-capacity audio/video digital recorder with a post-route GPS tracker included) mounted inside the windshield at or near the center of the vehicle, and two side cameras, left and right. The structure and operations of at least one embodiment of the dual vision system is disclosed, for example, in U.S. Pat. No. 8,520,070, incorporated herein by reference.

Figure 30:
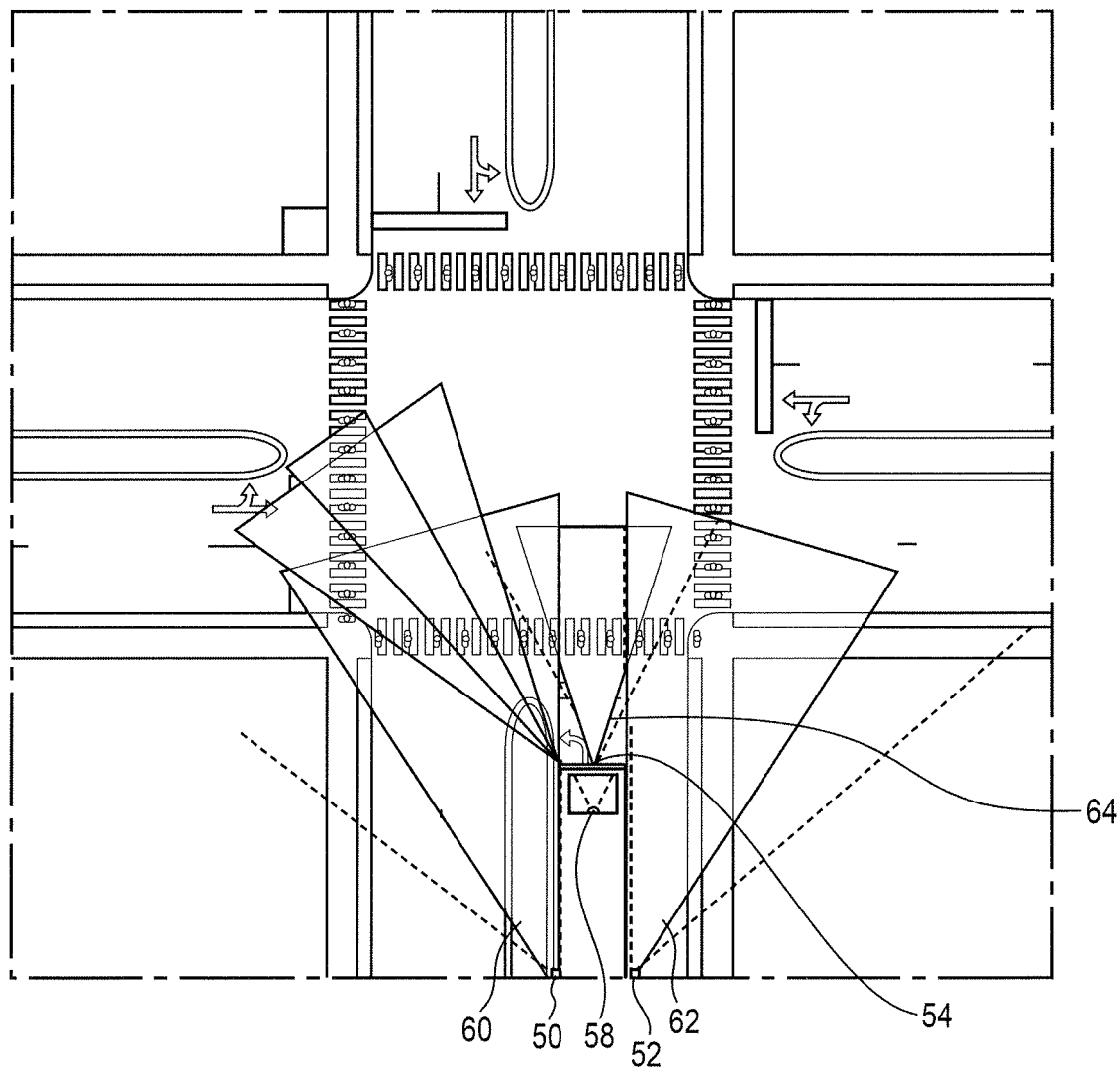
FIG. 30 is a top view of a vehicle with a pedestrian detection system including various cameras/sensing devices and video cameras, and their fields of view, according to some embodiments.

FIG. 30 illustrates an exemplary embodiment of a pedestrian detection system which includes video cameras as part of the pedestrian detection system, and their exemplary fields of view. For example, the pedestrian detection system may include cameras/sensors comprising detectors without video capture functionality that produce fields of view 60, 62, and 64. In addition, video cameras 50, 52 and 54 are advantageously mounted near each non-video detector and produce the corresponding dashed fields of view to capture video for storing, playback and/or analysis. The fields of view of the video cameras need not perfectly overlap the fields of view of each of the cameras/sensors, though preferably the video camera fields of view encompass those of each non-video detector and/or at least the areas near the vehicle that are considered dangerous and/or possible collision locations with the pedestrian. Optional interior video camera 58 (which may be a dual-vision camera as described above) captures the driver and the graphic driver interface that falls within the corresponding dashed field of view. In some embodiments, the captured video is transmitted and stored in a memory on board the vehicle and/or at a remote location, for example, as described in U.S. Pat. No. 8,520,070, incorporated herein by reference in its entirety, and utilized as described therein and/or as described herein.

In some embodiments, the pedestrian detection system/method may include an exterior audible alert system/speaker system configured to transmit an audible alert (e.g., a warning message) outside the bus, for pedestrians, when a hazard is detected. In some embodiments, the exterior alert sound system is a smart system, which transmits alerts only responsive to predetermined conditions/triggers detailed further below, so that it alerts pedestrians only when needed. In various embodiments, the speaker system comprises an audio storage and playback unit, a power supply, a speaker, and an amplifier. In some embodiments there may be, for example, three speakers to cover left, center, and right zones. In some embodiments, there is an amplifier for each speaker. The audio storage and playback unit monitors various inputs and drives the speakers when appropriate. An amplifier is used to drive each speaker loud enough, for example, so that it can easily be heart in the vicinity of a moving bus. The speaker projects an auditory warning such as a voice message or other alarm sound from the amplifier at the required sound level. The speaker is preferably configured for outdoor use. The audio amplifier amplifies the line-level audio signals to the speaker. Volume can be controlled digitally or through an adjustable potentiometer. In some embodiments, the system may be configured to detect ambient noise and adjust the volume according to the amount of background noise. In some embodiments, the system may be configured to use geo-sensing to adjust the volume louder or quieter depending on the specific neighborhood the vehicle is in. The power supply powers the voice storage and playback circuits from the vehicle electrical system.

The audio storage and playback unit may comprise a circuit board that can store voice messages for playback. Separate means may trigger the playback of each voice message. Playback of the selected voice message can be configured to continue repeatedly while the activation signal for that message is present. The audio storage and playback unit may store a minimum of two separate digital audio tracks, for example, "yellow" and "red." The yellow message (e.g. "yellow.mp3" audio file) may be a warning, for example, that pedestrian(s) are in a dangerous position relative the vehicle's path. In some embodiments, the yellow.mp3 file provides the following voice message, or similar: "Caution, bus approaching." The red message (e.g., "red.mp3" audio file) may be a more urgent warning (louder and/or different message as compared to yellow), for example, when the system calculates that a collision may occur within 1-2 seconds. In some embodiments, the red.mp3 file provides the following voice message, or similar: "Danger! Step back!" The unit can play back either audio track upon predetermined trigger input, as described below. Audio storage media may comprise, for example, a removable form of digital media, such as an SD/Micro SD/USB storage device. In some embodiments, the audio storage and playback unit comprises a controller and an audio codec circuit. The controller can monitor inputs from the cameras/sensors that are active, and play, for example, either the "yellow" or "red" audio file from the SD reader on the audio codec circuit responsive thereto.

The audio codec circuit can decode the audio file and output line-level signals to be amplified by individual 10 W/20 W audio amplifiers for each appropriate speaker.

In some embodiments, the controller monitors one or more of the following eight (8) camera/sensor inputs, with logic as described below. In some embodiments, these triggers are in the form of brief pulses and the logic employs a latching mechanism to read the pulses.

(1) YELLOW LEFT REAR CAMERA TRIGGER ("LR CAM TRIG"). This is a negative trigger. When this line senses a GROUND connection, the "Yellow" audio track will be played back from the following channels: AUDIO OUT LEFT REAR; AUDIO OUT ALL LEFT REAR; AUDIO OUT ALL RIGHT REAR; AUDIO OUT ALL FRONT.

(2) YELLOW RIGHT REAR CAMERA TRIGGER ("RR CAM TRIG"). This is a negative trigger. When this line senses a GROUND connection, the "Yellow" audio track will be played back from the following channels: AUDIO OUT RIGHT REAR; AUDIO OUT ALL LEFT REAR; AUDIO OUT ALL RIGHT REAR; AUDIO OUT ALL FRONT.

(3) YELLOW FRONT LEFT CORNER CAMERA TRIGGER ("CRNR CAM TRIG"). This is a negative trigger. When this line senses a GROUND connection, the "Yellow" audio track will be played back from the following channels: AUDIO OUT FRONT; AUDIO OUT ALL LEFT REAR; AUDIO OUT ALL RIGHT REAR; AUDIO OUT ALL FRONT.

(4) YELLOW FRONT CENTER CAMERA TRIGGER ("CENT CAM TRIG"). This is a negative trigger. When this line senses a GROUND connection, the "Yellow" audio track will be played back from the following channels: AUDIO OUT FRONT; AUDIO OUT ALL LEFT REAR; AUDIO OUT ALL RIGHT REAR; AUDIO OUT ALL FRONT.

(5) RED LEFT REAR CAMERA TRIGGER ("LR CAM TRIG"). This is a negative trigger. When this line senses a GROUND connection, the "RED" audio track will be played back from the following channels: AUDIO OUT LEFT REAR; AUDIO OUT ALL LEFT REAR; AUDIO OUT ALL RIGHT REAR; AUDIO OUT ALL FRONT. In some embodiments, if a yellow trigger is received from the same location, the RED audio track will override the Yellow track.

(6) RED RIGHT REAR CAMERA TRIGGER ("RR CAM TRIG"). This is a negative trigger. When this line senses a GROUND connection, the "RED" audio track will be played back from the following channels: AUDIO OUT RIGHT REAR; AUDIO OUT ALL LEFT REAR; AUDIO OUT ALL RIGHT REAR; AUDIO OUT ALL FRONT. In some embodiments, if a yellow trigger is received from the same location, the RED audio track will override the Yellow track.

(7) RED FRONT LEFT CORNER CAMERA TRIGGER ("CRNR CAM TRIG"). This is a negative trigger. When this line senses a GROUND connection, the "RED" audio track will be played back from the following channels: AUDIO OUT FRONT; AUDIO OUT ALL LEFT REAR; AUDIO OUT ALL RIGHT REAR; AUDIO OUT ALL FRONT. In some embodiments, if a yellow trigger is received from the same location, the RED audio track will override the Yellow track.

(8) RED FRONT CENTER CAMERA TRIGGER ("CENT CAM TRIG"). This is a negative trigger. When this line senses a GROUND connection, the "Yellow" audio track will be played back from the following channels: AUDIO OUT FRONT; AUDIO OUT ALL LEFT REAR; AUDIO OUT ALL RIGHT REAR; AUDIO OUT ALL FRONT. In some embodiments, if a yellow trigger is received from the same location, the RED audio track will override the Yellow track.

In order to respond to these triggers with the associated sounds, an audio codec circuit DSP evaluation board may be used to read from a microSD card to covert the audio file into line-level signals ready to be amplified. In some embodiments, different a d/or predetermined triggers can be used as described herein.

In some embodiments, the same or similar triggers may be used for the sound and the visual displays. For example, the YELLOW LEFT REAR CAMERA TRIGGER and/or the YELLOW FRONT LEFT CORNER CAMERA TRIGGER may also trigger the left readout inside the bus as described above (e.g., lighting up the yellow/amber LED pedestrian indicator and/or sounding the piezoelectric alarm), the YELLOW FRONT CENTER CAMERA TRIGGER may also trigger the center readout, and so on, for the right rear camera triggers, and the red alerts, etc.

Additional inputs may include, for example: (9) POWER IN ("PWR") and (10) AUDIO IN ("AUD IN") A monaural or stereo microphone may be used for recording voice audio. The microphone may be integrated into the audio unit or may be removable via a connector (e.g., an XLR connector or similar).

In some embodiments, there are six outputs: AUDIO OUT FRONT ("FRONT OUT"), AUDIO OUT LEFT REAR ("LR OUT"), AUDIO OUT RIGHT REAR ("RR OUT"), AUDIO OUT ALL FRONT ("ALL FRONT"), AUDIO OUT ALL LEFT REAR ("ALL LR"), and AUDIO OUT ALL RIGHT REAR ("ALL RR"). Line level outputs may be determined by logic described above. Line level output should be compatible with the amplifier input to avoid any harmonic distortion.

In some embodiments, no overlapping messages, waveforms, etc. are played on any output. The system uses logic to allow a full Yellow or Red message to be played on each speaker before playing any subsequent messages. Preferably, no messages are queued. For example, in some embodiments, if the "Yellow" message is being played and a "RED" message is triggered, then the Yellow message is immediately stopped, and the RED message is played instead. In some embodiments, messages are overlapped.

The playback unit is preferably selected and configured to play back all messages with minimal delay. In some embodiments, the time between initial trigger and final speaker output is less than 100 milliseconds.

A user interface may be provided for recording, for example, a set of buttons/switches for recording audio. In some embodiments, a user can record, for example, a minimum of two separate audio tracks, labeled "YELLOW" and "RED". A user interface may also be provided for playback testing, for example, set of buttons/switches for playing back the desired audio track to test the system.

The amplifier may comprise, for example, three separate amplifiers or one amplifier with three channels. The power level may be set as needed. The amplifier is powerful enough to drive a loud speaker that can cut through a noisy city environment. In some embodiments, loudness may be similar to a truck horn or equivalent (e.g., about 50-150 Watts). The amplifier line level input is compatible with the audio storage and playback unit. Input preferably has enough head room to avoid any harmonic distortions. Speaker level outputs are compatible with the external loud speakers. Output preferably has enough headroom to prevent harmonic distortion. The amplifier may comprise, for example, a Stereo 10 W/20 W Class D Audio Amplifier. This board may be powered at 5-12 VDC and can preferably drive two 4 Ohm channels at 20 W each, and two 8 Ohm channels at 10 W each. In some embodiments, each amplifier module is configured to drive a single 8 Ohm speaker at 10 W, using approximately 2A of input current. In some embodiments, one Stereo 10 W/20 W Class D Audio Amplifier is provided for each of the three speakers. Three amplifiers are used to independently control both the volume and activity of the LEFT, CENTER, and RIGHT channel speakers. In some embodiments, at any point in time only one of the two audio files ("yellow" or "red") may be played on any one speaker. In some embodiments, the volume may be controlled digitally, either muting or driving the speaker with the appropriate audio file depending upon the input triggers.

The speaker power level may also be set as needed. The loud speaker is powerful enough that it can cut through a noisy city environment. In some embodiments, loudness may be similar to a truck horn or equivalent (e.g., about 50-150 Watts). The speaker may comprise, for example, an outdoor speaker horn, with one or more of the following specifications: loading rating: 50 W; nominal impedance: 8 Ohm; frequency range: 500 Hz-5 kHz; SPL at 1 W/m: 100 dB; dimensions (W*H*D): 6 in*4 in*8 in). In some embodiments, when applied with 10 W, the speaker is calculated to have a Sound Pressure Level (SPL) of 90 dB when measured 10 m away. This meets an exemplary specification of 90-100 dB at a distance of 10m. The speaker size and weight is preferably such that it does not protrude from the vehicle body more than about six inches, is under nine inches tall, and is mountable on a sheet metal non-load bearing surface. Different dimensions and/or weight for the speaker may also be used.

The speaker system preferably provides enough clarity and fidelity to understand a human voice at high volumes. In some embodiments, only the Middle and Treble frequency ranges may be emphasized (e.g., about 500 to about 3000 Hz). These frequency ranges are easier to drive at loud volumes and require less energy. The speaker system does not need to output loud bass frequencies or to produce high fidelity audio. In some embodiments, the speakers may have one or more of the following features: Max Output Volume: Up to 95 dB at 10 M; Sensitivity: 20-100 Watts RMS at 4 Ohms; Frequency Response: 100 Hz-20,000 Hz.

The speaker system is configured to be mounted on a moving vehicle. Accordingly, the system is preferably configured to ensure maximize durability. For example, the system is preferably configured to meet one or more of the following requirements: Operating temperature ° F. (C°): 5° to 149° (−15° to +65° C.); Storage temperature: −4° to +158° (20° to +70° C.); Vibration Rating: 6.9 G at 3 mm amplitude and 10-30 Hz; Shock rating: 8 G.

In some embodiments, an enclosure may be provided to protect the speaker from environmental conditions for the life of the vehicle. Examples of environmental conditions include: rain; fog, dust; vehicle washing (High pressure water, solvents/soap, steam, etc.); Operating temperature ° F. (C°): 5° to 149° (−15° to +65° C.); Storage temperature: −4° to +158° (20° to +70° C.); Vibration Rating: 6.9 G at 3 mm amplitude and 10-30 Hz; Shock rating: 10 G. The enclosure preferably allows mounting to the sheet metal on the exterior of a bus or truck. The enclosure can orient the speaker "line of sight" roughly parallel to the vehicle surface. With the speaker mounted at the front of the bus, the speaker can thus be oriented to point to the rear of the bus without obstruction. The speaker/enclosure assembly preferably does not protrude from the surface of the vehicle more than four inches. Height is preferably under six inches. Length along the side of the bus is preferably under eight inches. Weight preferably does not exceed five pounds. Different dimensions and/or weight for the speaker/enclosure assembly may also be used. The enclosure may be optimized to lower atmospheric drag. For example, flush-mount to a flat surface with the aid of an environmental gasket may be used. The enclosure is preferably configured to minimize the possibility of damage resulting from flying debris, birds, insects etc. and/or snagging on external debris such as tree branches/foliage, wires, power/telephone lines, clothing, etc.

The power supply preferably accepts +12 VDC and +24 VDC nominal power and supplies enough output to power the entire speaker system. The power supply may comprise, for example, an isolated 12V DC-DC converter (e.g., Murata UWE-12/10-Q12P-C) that outputs 12 VDC and is used to power the system using either the 24 V rail or the 12V rail. This power supply can replace switching regulators as this converter is an isolated power supply, and can be supplied an input voltage of 12 VDC and 24 VDC depending on which bus is to be used. The DC-DC converter preferably has an input range of 9 VDC to 36 VDC, and output a typical voltage of 12 VDC. The regulators can output a maximum of 10A. Because the input range is 9 VDC to 36 VDC, the input voltage can be connected to either the 12 VDC line or the 24 VDC line, depending on which bus is used. The 12 VDC output voltage can connect to all three amplifiers, using a total continuous current of approximately 6A. In addition, the DC-DC converter can also connect to the controller and the audio codec circuit. The current consumption of the controller is less than about 500 mA. The current consumption of the audio codec circuit is less than about 150 mA. As the amplifier uses about 6A, this totals to a current of about 6.65 A, which is less than the maximum output of 10A. In some embodiments, the system may include an evaluation board that provides several options for making input power (Vin and GND) and output load (Vout and GND) connections.

Figure 65:
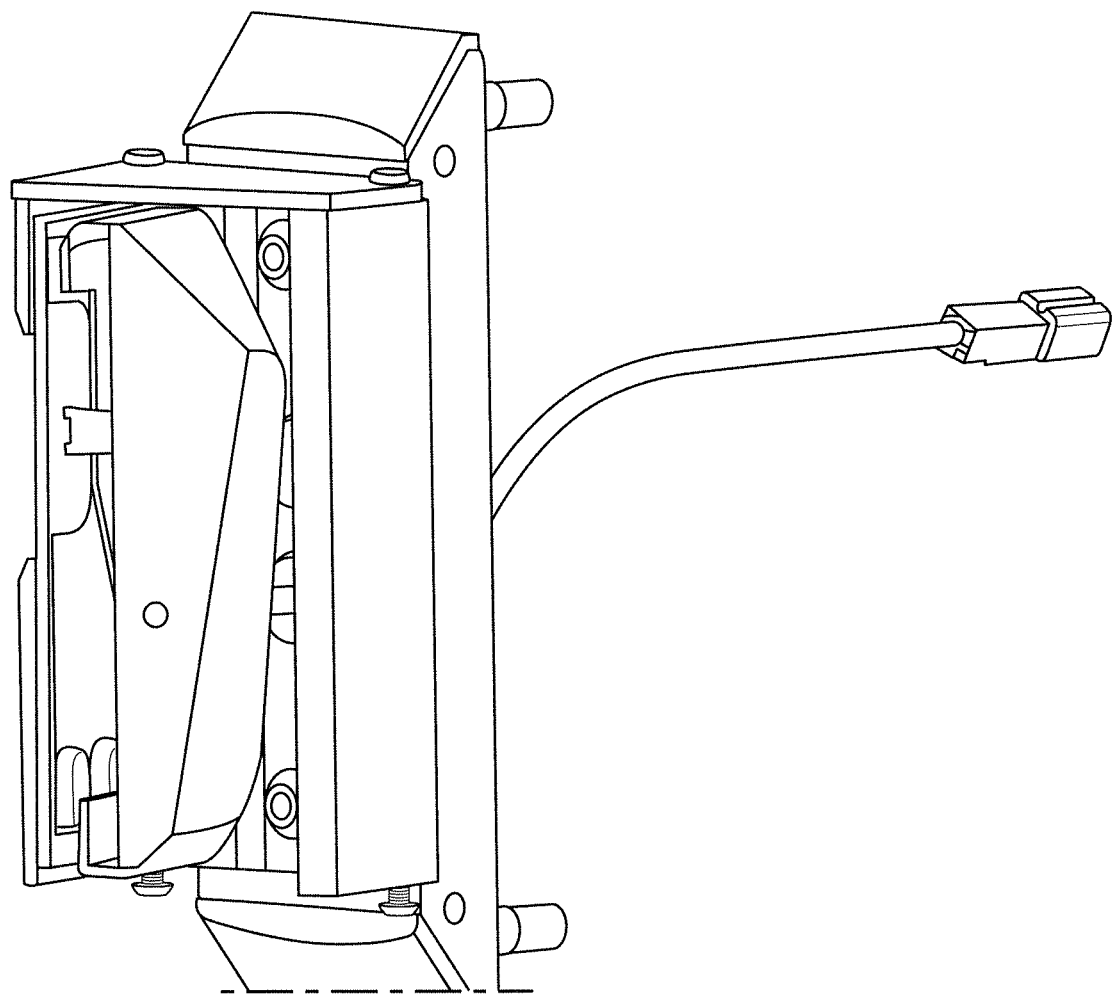
FIG. 65 is a perspective cutaway view of a pedestrian detection display housing and mounting hardware, with camera/sensor therein, according to some embodiments.
Figure 66:
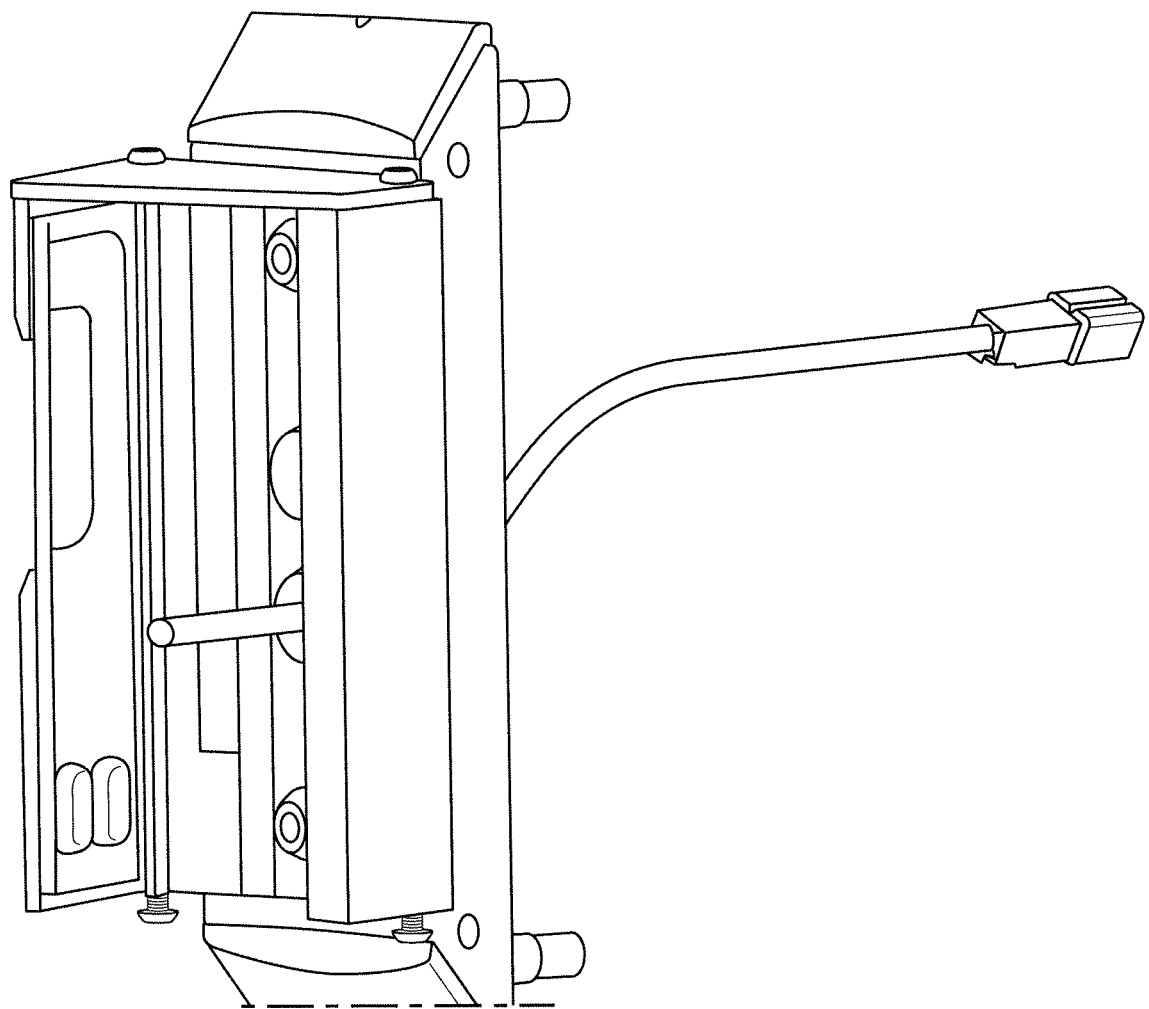
FIG. 66 is a perspective cutaway view of a pedestrian detection display housing and mounting hardware, without camera/sensor, according to some embodiments.
Figure 67:
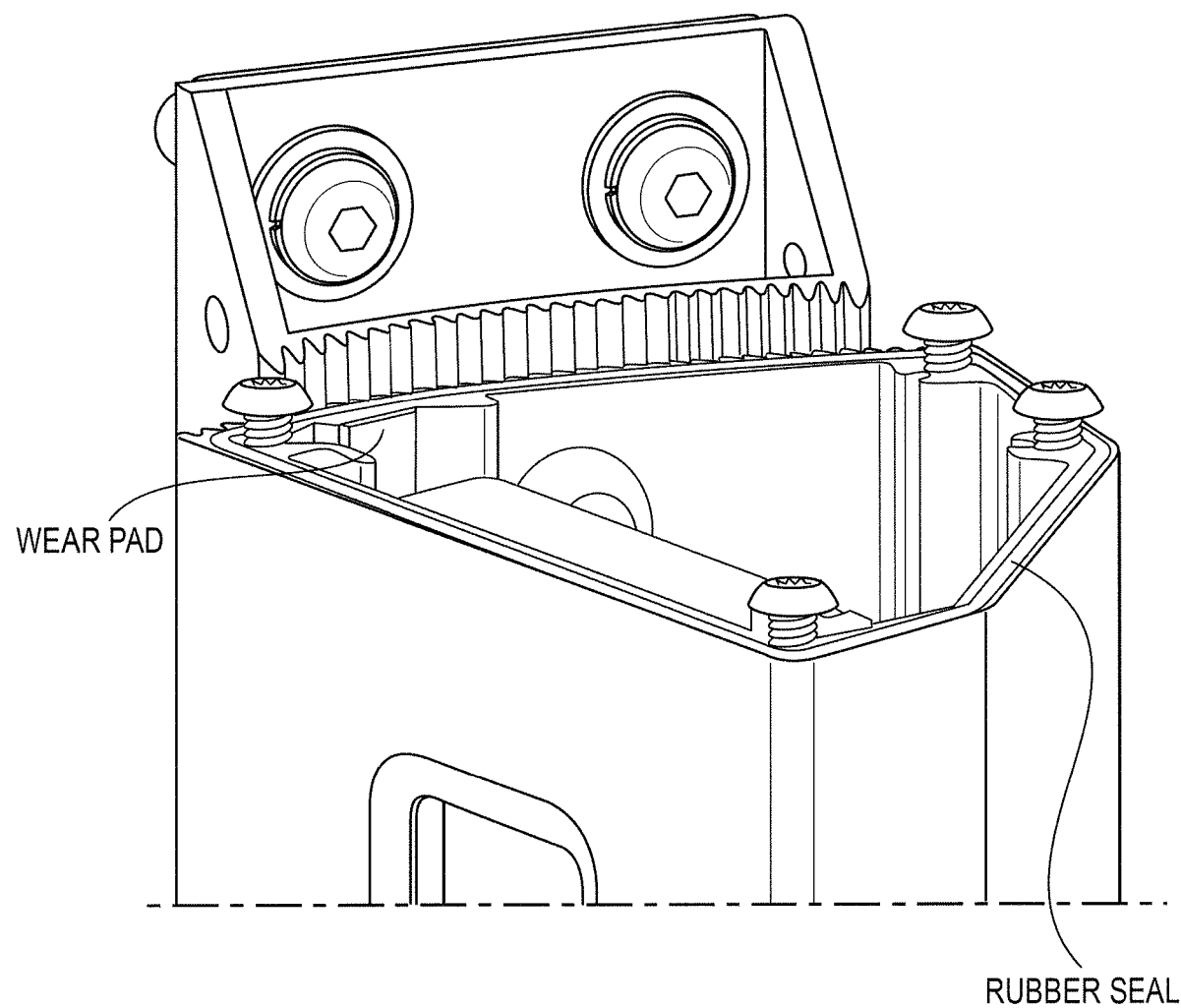
FIG. 67 is a perspective cutaway view of a pedestrian detection display housing and mounting hardware, with camera/sensor therein, according to some embodiments.
Figure 68:
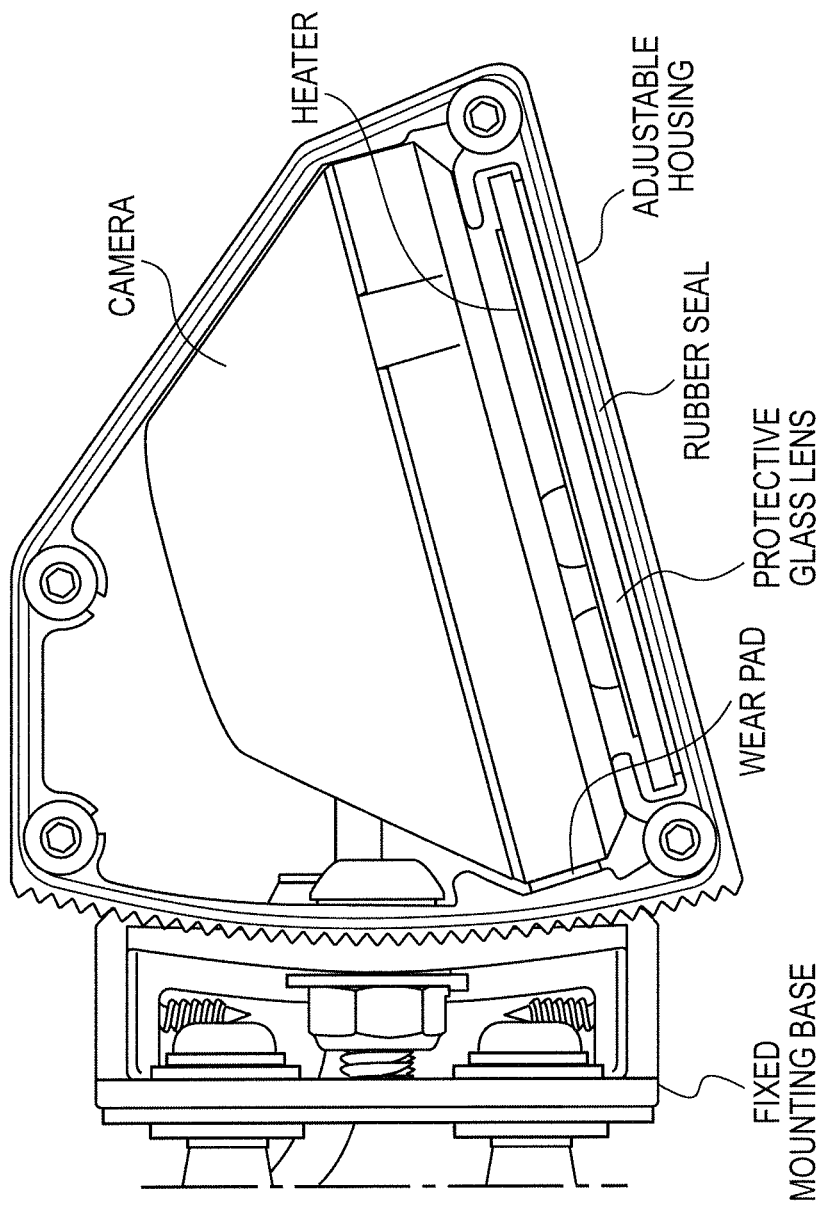
FIG. 68 is a top cutaway view of a pedestrian detection display housing and mounting hardware, with camera/sensor therein, according to some embodiments.
Figure 69:
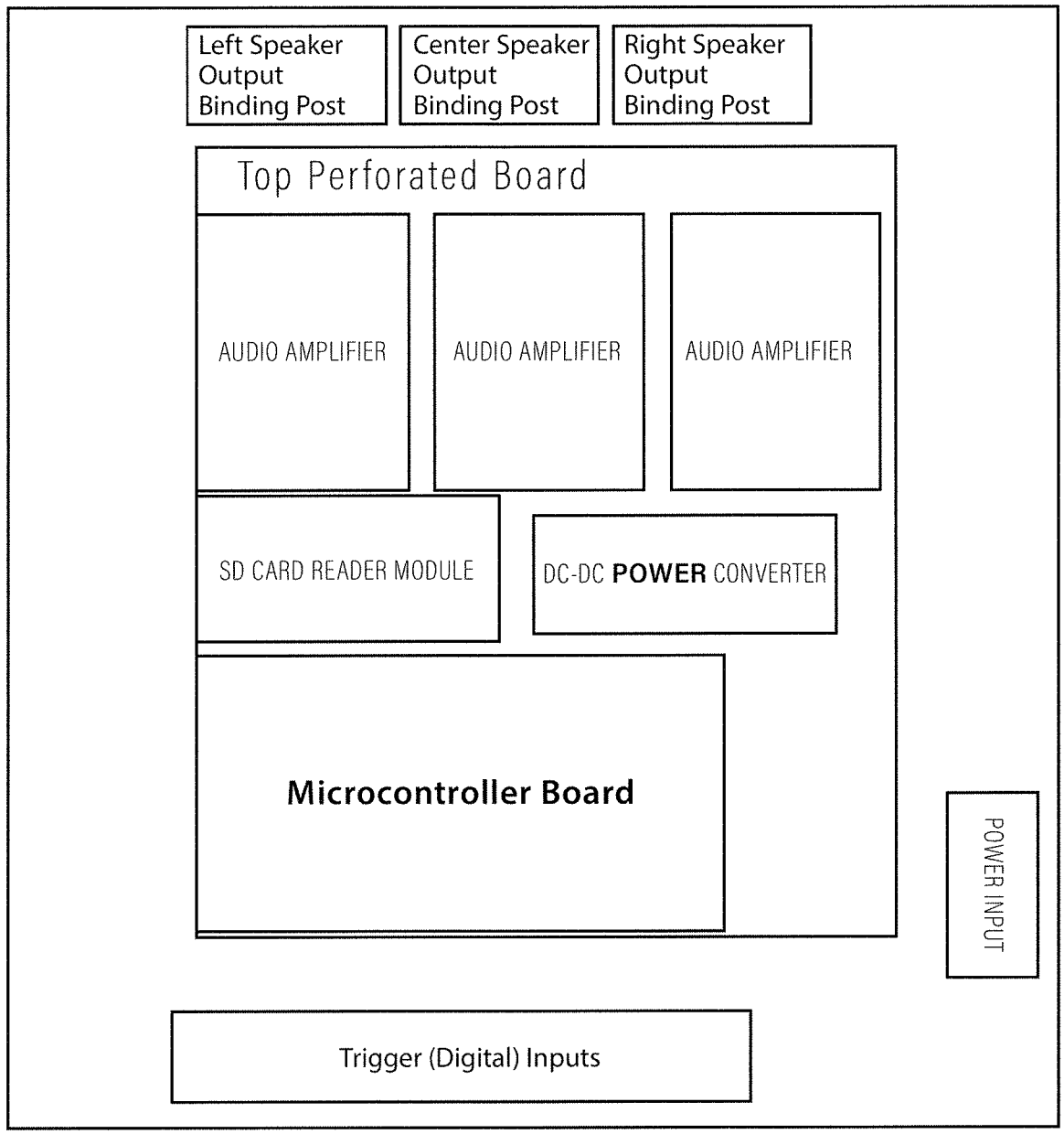
FIG. 69 is an exemplary circuit configuration for an audible alert system according to some embodiments.
Figure 70:
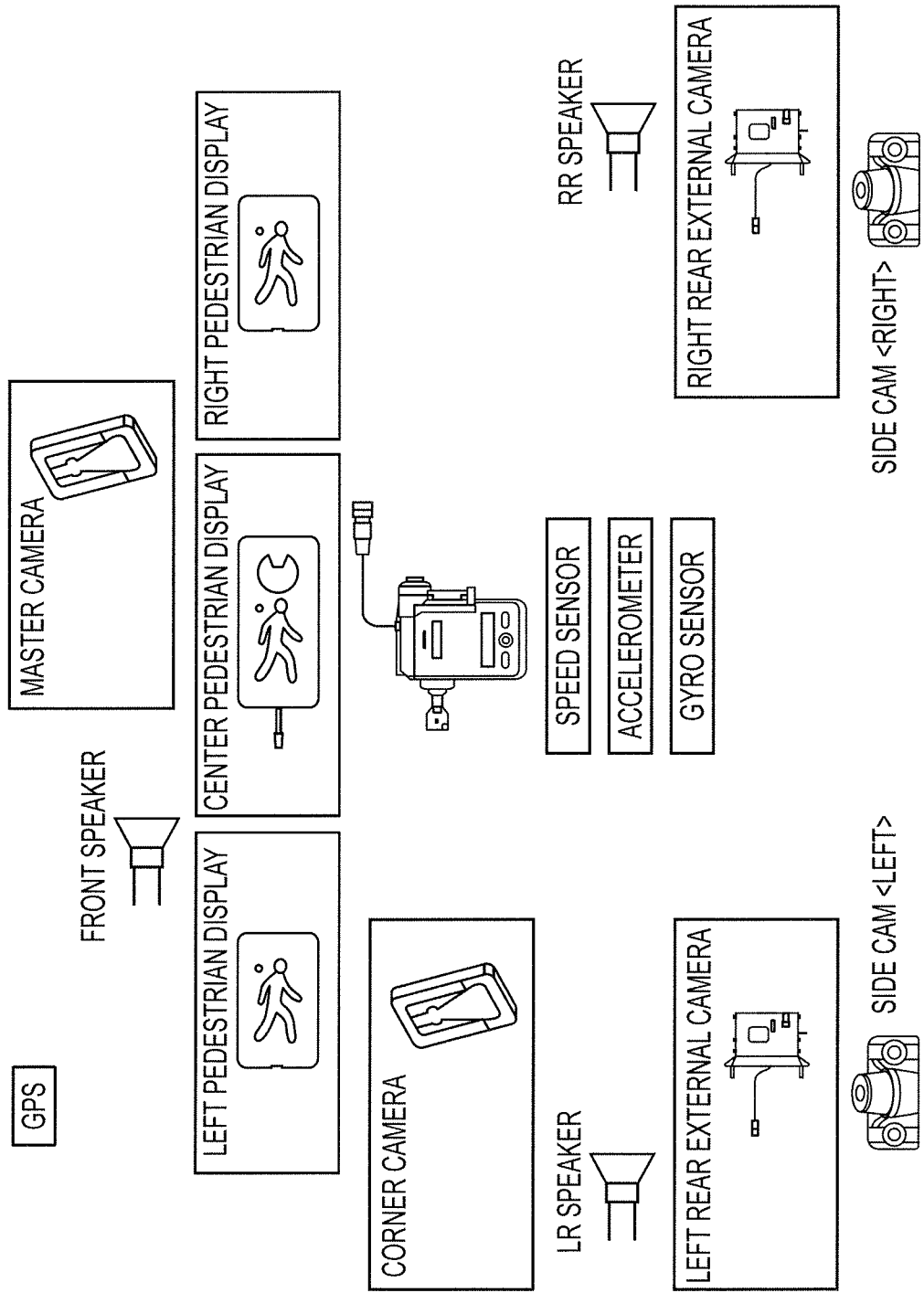
FIG. 70 is a schematic diagram of a pedestrian detection system according to some embodiments.
Figure 71:
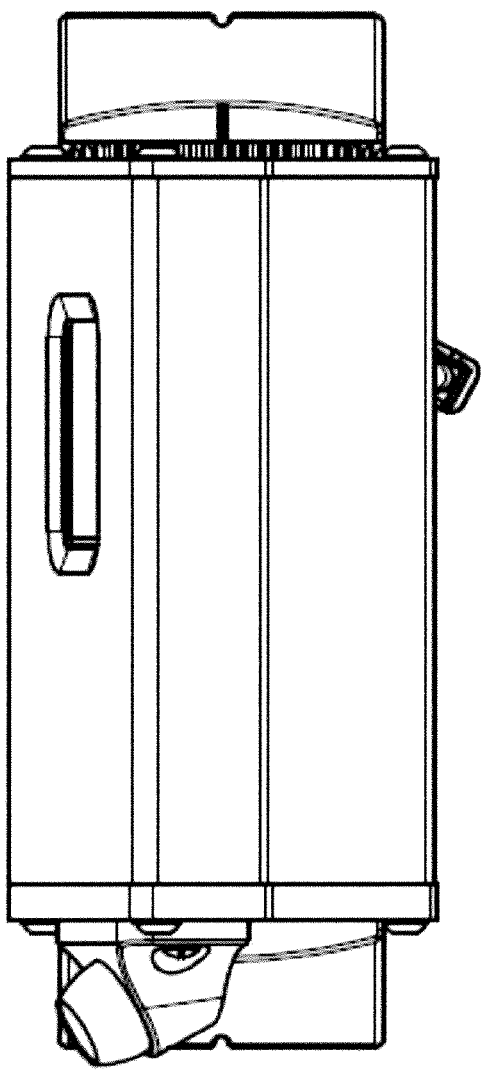
FIG. 71 is a side view of a camera/sensing device housing and mounting hardware according to some embodiments.
Figure 72:
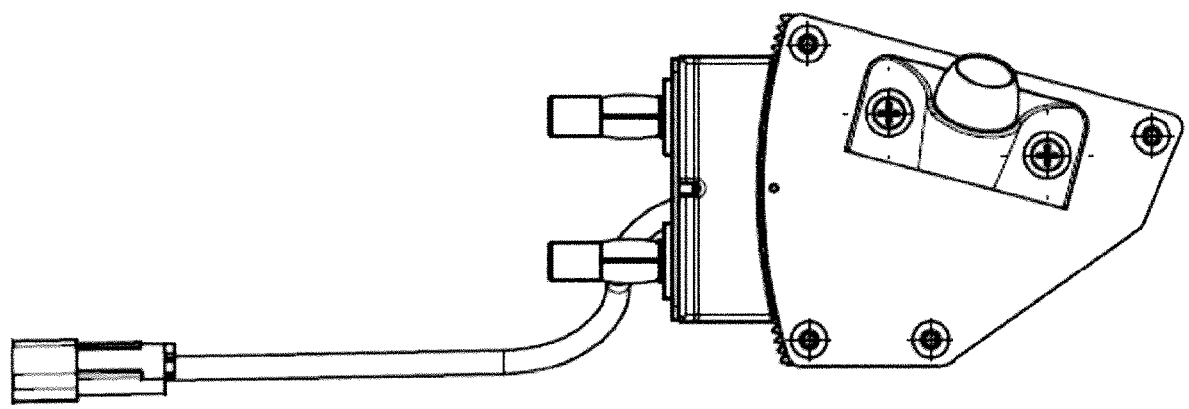
FIG. 72 is a bottom view of a camera/sensing device housing and mounting hardware according to some embodiments.
Figure 73:
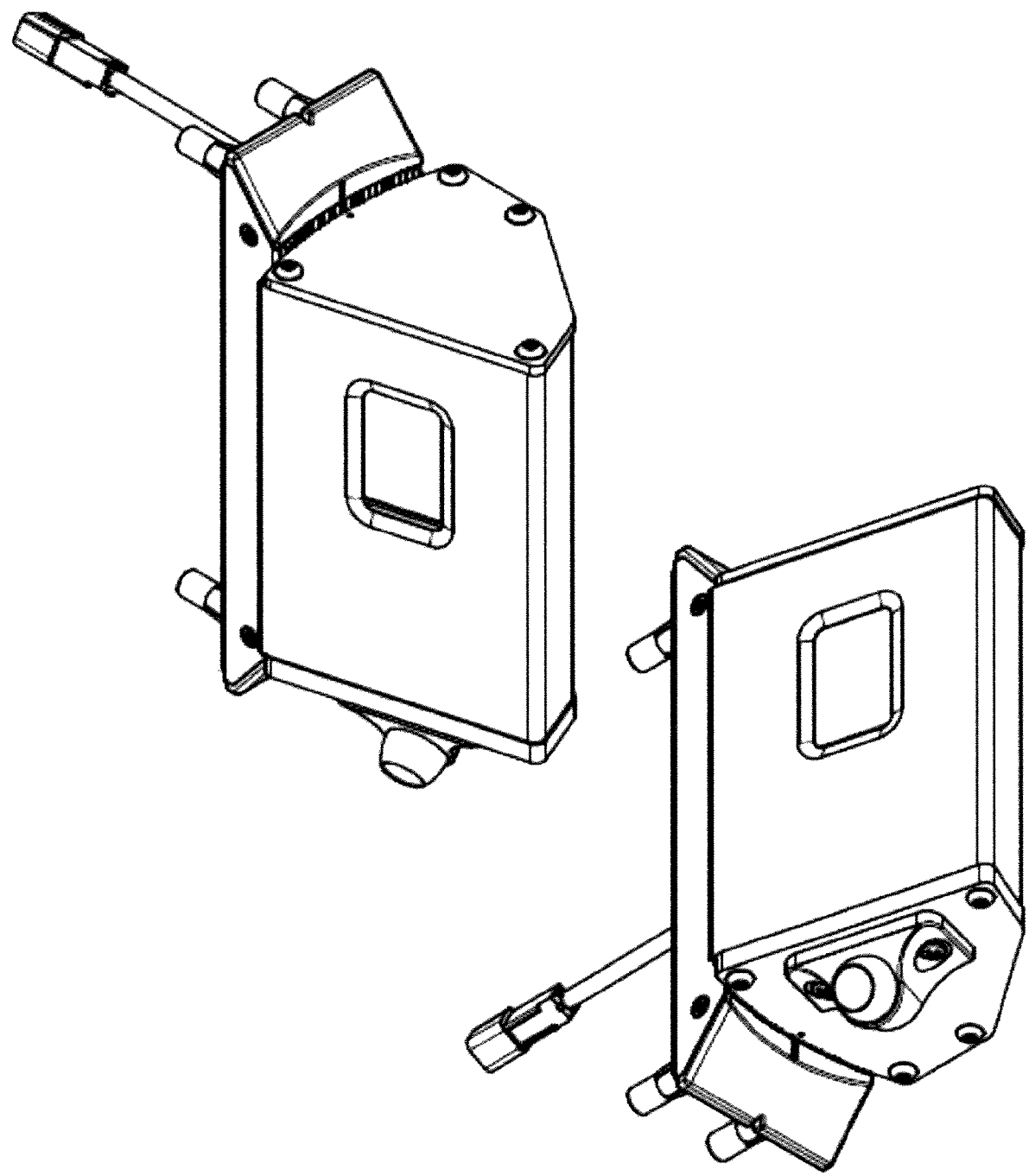
FIG. 73 shows two perspective views of a camera/sensing device housing and mounting hardware according to some embodiments.
Figure 74:
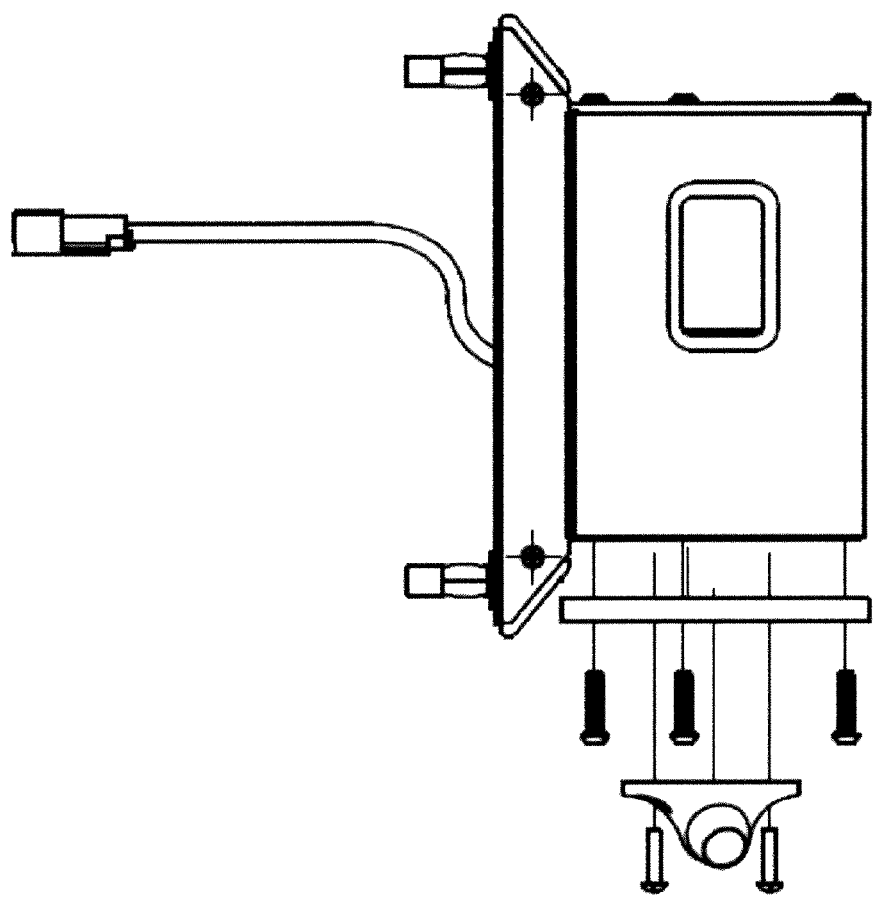
FIG. 74 is a front view of a camera/sensing device housing and mounting hardware according to some embodiments.
Figure 75:
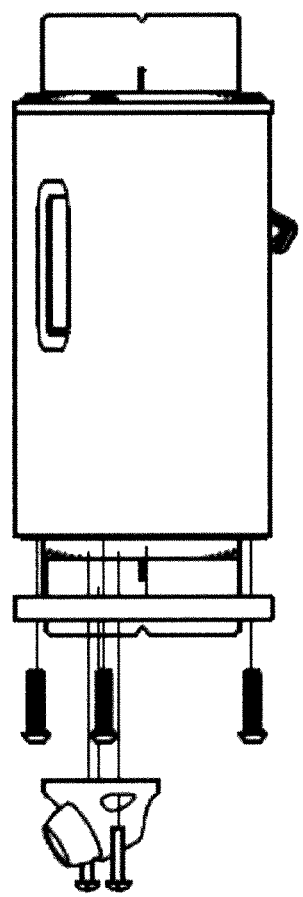
FIG. 75 is a side view of a camera/sensing device housing and mounting hardware according to some embodiments.
Figure 76:
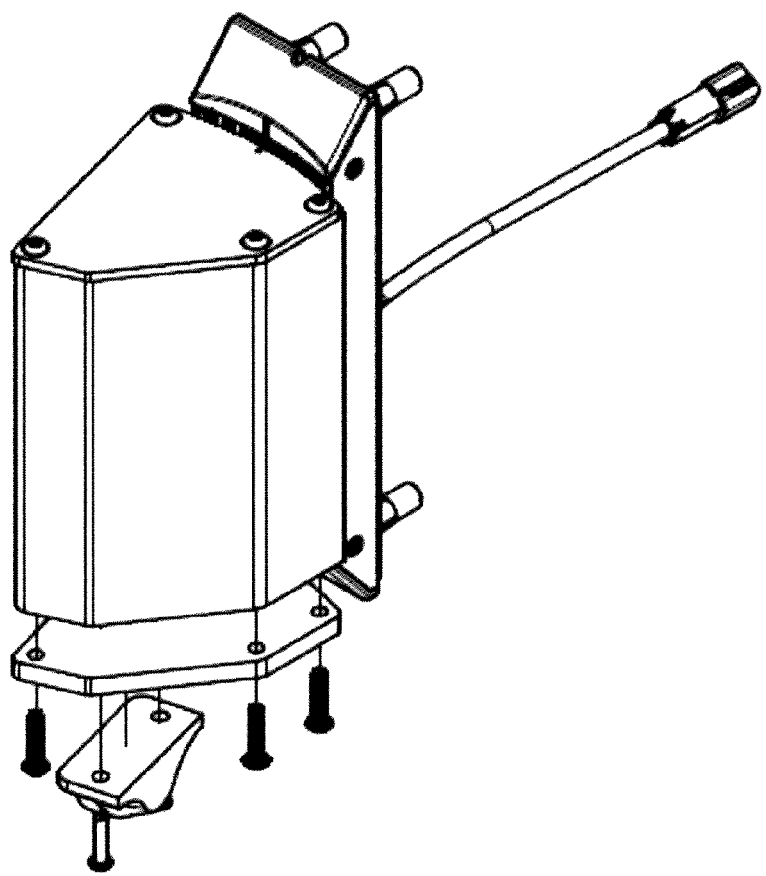
FIG. 76 is a perspective view of a camera/sensing device housing and mounting hardware according to some embodiments.
Figure 77:
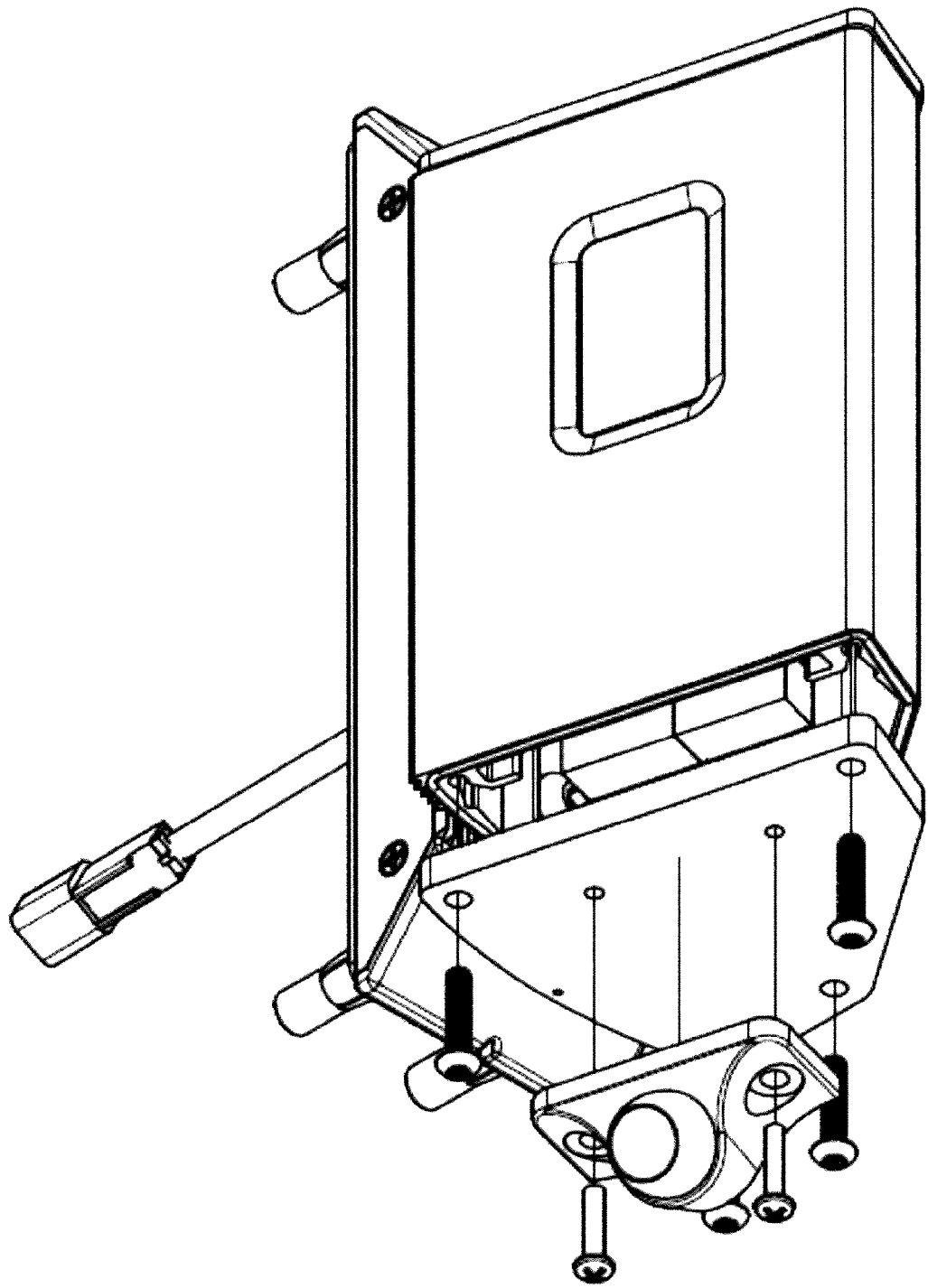
FIG. 77 is a perspective view of a camera/sensing device housing and mounting hardware according to some embodiments.

In some embodiments, the speaker system may have power connections comprising a 2-position, double-row terminal screw connector. The two positions will correspond to the input voltage and the common. Thus, either 12 VDC or 24 VDC may be supplied to the system, depending on what bus the system is used on. For the digital inputs, the system may include an 8-position, double-row terminal screw connector. The eight positions will correspond to each digital input trigger. Thus, various digital inputs may be connected to the system. In addition, the system may use a perforated board. For example, the system may be mounted on top of the perforated board, which can provide a robust base for mounting the system within an enclosure. An exemplary system configuration, with a bottom perforated board and a top perforated board, is shown in FIG. 65. Left Rear, Front, and Right Rear speakers connect to the Left Rear, Front, and Right Rear binding posts. The enclosure may comprise, for example, a polycarbonate/ABS (acrylonitrile butadiene styrene) alloy enclosure with quick-locking stainless steel cover screws and polyurethane gasket.

Figure 31:
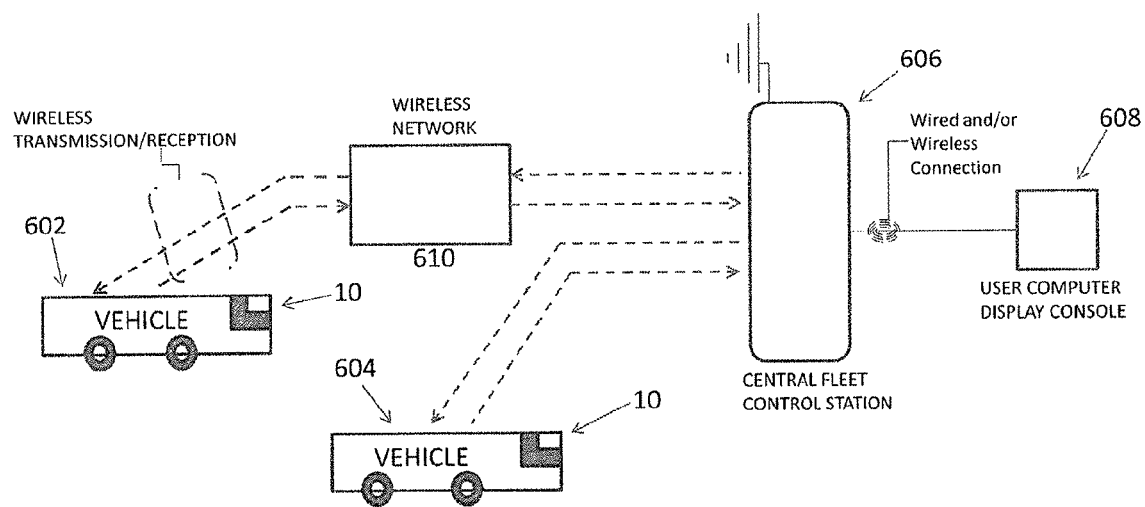
FIG. 31 is a schematic layout of a fleet control system according to some embodiments.

FIG. 31 illustrates a general schematic layout of a fleet tracking system in accordance with some embodiments. A vehicle, such as, for example, vehicles 602 or 604, moves along a transport route. The route may be one that is well known and traveled often, such as a bus route, or may be one that is being newly traveled by the vehicle, such as a taxi route. In some embodiments, each vehicle is equipped with a pedestrian detection system comprising at least one camera/sensor. As described above, in some embodiments as the vehicle travels along a transport route, or at specific locations, certain predefined events may trigger activation of an alarm and/or corrective action associated with the camera/sensor. Additionally or alternatively, the camera/sensor may be activated in accordance with a predefined schedule and/or may be activated manually by an operator in the vehicle and/or remotely by a remote user such as a fleet manager.

In some embodiments, a pedestrian detection system according to the present invention communicates wirelessly with the fleet management control system during transit and/or at defined times and/or locations. The fleet manager may access the fleet management control system at a central station, such as central fleet control station 606, or from any other suitable remote location, using any suitable device, such as user computer display console 608. User computer display console 608 may be a standard computer system or electronic computing device connected via a wired and/or wireless connection. Alternatively, user computer display console 608 may be any suitable mobile device, such as, for example, a mobile phone, smartphone, PDA, tablet, GPS system, laptop, or any other standard or specially configured computing device with wireless capabilities.

Activation of the camera/sensor may include capturing any combination of low and/or high resolution still images and/or low and/or high resolution video capture, in addition to vehicle related metadata. In some embodiments, as shown in FIG. 31, image and/or data transmission/reception may be conducted via any standard communications network, such as wireless network 610. For example, FIG. 31 shows image/data transmission/reception from vehicle 602 to central fleet control station 606 via wireless network 610. Additionally or alternatively, image/data transmission/reception may be conducted directly between a vehicle and a monitoring station, as shown between vehicle 604 and central fleet control station 606. Furthermore, image/data transmission/reception may also be conducted wirelessly directly between a vehicle and user console, such as between vehicles 602, 604, and user computer display console 608.

In some embodiments, image/data transmission/reception may be conducted directly between a vehicle and a storage device located at a vehicle parking garage via Wi-Fi, either manually or automatically, at the end of the route or the end of day. In some embodiments, the vehicle may interface directly with an on-board cellular device, such as a personal phone or other mobile-to-mobile, SIM-card enabled device, for immediate transmission to a server via Wi-Fi, Bluetooth, RF, or any other form of wireless communication.

Figure 32:
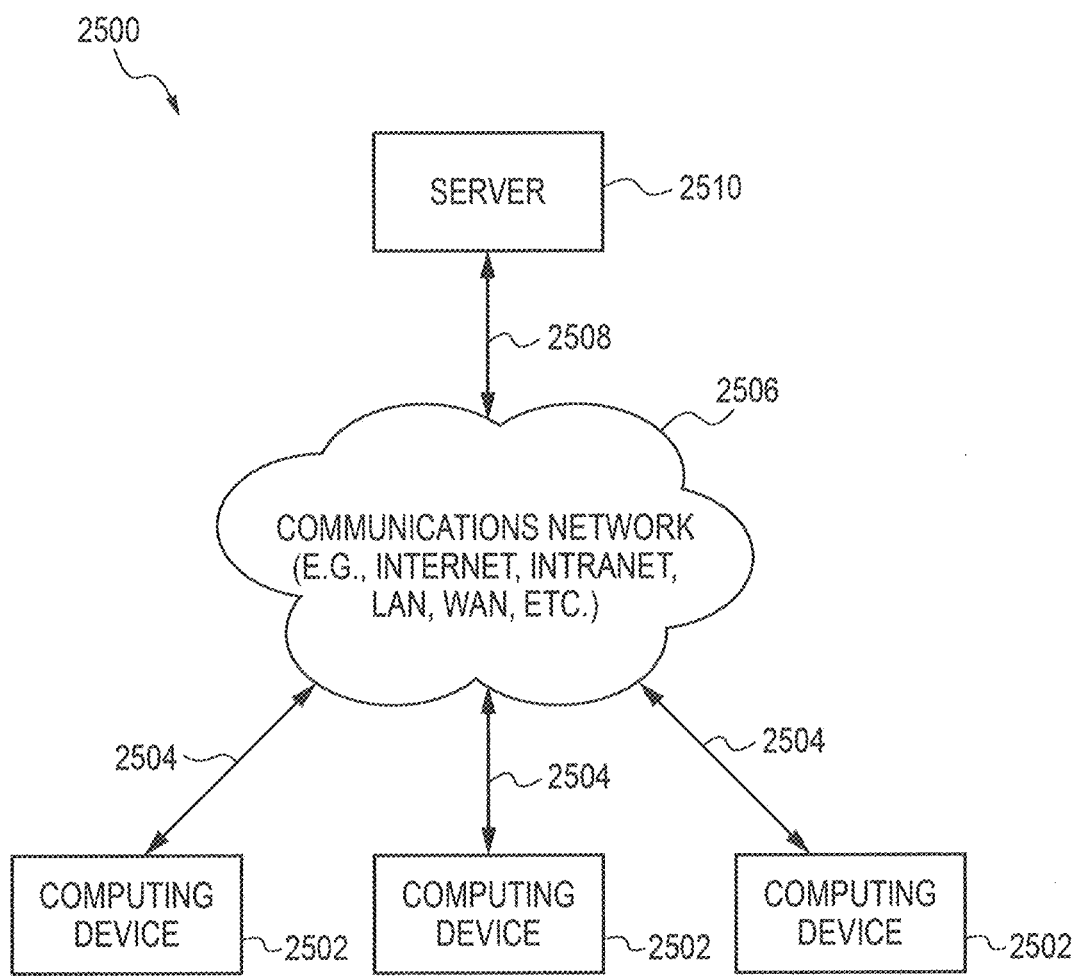
FIG. 32 is a schematic diagram of a communications network for a fleet control system according to some embodiments.

FIG. 32 is a generalized schematic diagram of a system 2500 on which an interactive user display application may be implemented in accordance with some embodiments. As illustrated, system 2500 may include one or more user computing devices 2502. User computing devices 2502 may be local to each other or remote from each other, and wired, wireless, or a combination of both. User computing devices 2502 are connected by one or more communications links 2504 to a communications network 2506 that is linked via a communications link 2508 to a server 2510.

System 2500 may include one or more servers 2510. Server 2510 may be any suitable server for providing access to the application, such as a processor, a computer, a data processing device, or a combination of such devices. Communications network 2506 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 2504 and 2508 may be any communications links suitable for communicating data between user computing devices 2502 and server 2510, such as network links, dial-up links, wireless links, hard-wired links, any other suitable communications links, or a combination of such links. User computing devices 2502 enable a user to access features of the application. User computing devices 2502 may be personal computers, laptop computers, mainframe computers, dumb terminals, data displays, Internet browsers, personal digital assistants ("PDAs"), smartphones, tablets, multimedia devices, two-way pagers, wireless terminals, cellular phones, portable telephones, handheld devices, any other suitable access device, or any combination of such devices. User computing devices 2502 and server 2510 may be located at any suitable location. In one embodiment, user computing devices 2502 and server 2510 may be located within an organization/entity. Alternatively, user computing devices 2502 and server 2510 may be distributed between multiple organizations/entities.

In some embodiments, the application may include an application program interface, or alternatively, the application may be resident in the memory of the computing device or the server. In another embodiment, the only distribution to the computing device may be a graphical user interface ("GUI") which allows a user to interact with the application resident at, for example, the server.

In some embodiments, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), Java-Server Pages ("JSP"), Active Server Pages ("ASP"), Cold Fusion, or any other suitable approach).

Although the application is described herein as being implemented on a computing device and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, an automobile PC, a laptop computer, tablet, multimedia device, a cellular phone, a personal digital assistant ("PDA"), smartphone, etc., to provide such features.

It will also be understood that the detailed description herein may be presented in terms of program procedures executed on a computing device or network of computing devices. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

For the purposes of illustrating certain aspects of the present invention, the preferred embodiments are described above and illustrated in the drawings. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific apparatus described above may be altered so that certain parts are independent or combinable with other parts, to the extent that the parts are not dependent upon each other. Thus, the specific parts described herein are not to be considered implying specific parts to implement the above described apparatus. Other alterations or modifications of the above apparatus are also contemplated. For example, further insubstantial changes and/or interchangeable parts of the above are also considered within the scope of the apparatus described herein.

In addition, features illustrated or described as part of one embodiment can be used on other embodiments to yield a still further embodiment. Additionally, certain features may be interchanged with similar devices or features not mentioned yet which perform the same or similar functions. Further, while a specific sequence of process steps has been described, the sequence and/or order of steps can be modified in any suitable manner to achieve the results of the present invention. It is therefore intended that such modifications and variations are included within the totality of the present invention.

The invention claimed is:

1. A collision avoidance and/or pedestrian detection system for a large passenger vehicle, comprising:
   a first sensor comprising at least one of: a speed sensor, a global positioning system (GPS) sensor, an accelerometer, or a gyro sensor and sensing first data regarding at least one of: a location or driving characteristic of the vehicle; and
   a first detection system comprising:
      a first housing configured to be mounted to the vehicle;
      a first sensing device enclosed in the first housing and configured to sense, when present a first hazard in a first field of view responsive to first predetermined criteria and when present a second hazard in a second field of view capable of overlapping with at least a portion of the first field of view responsive to second predetermined criteria; and
      a first driver warning system connected to the first sensing device generating at least one of: a driver visual warning or a driver audible alarm configured to alert the driver when at least one of: the first hazard or the second hazard is detected by the first detection system,
      wherein sensitivity of the first sensing device is modified responsive to at least one of the location or the driving characteristic of the vehicle.

2. A collision avoidance and/or pedestrian detection system for a large passenger vehicle according to claim 1, wherein the first field of view is configured to be a first view when the vehicle is traveling in a forward direction and a second field of view when the vehicle is turning.

3. A collision avoidance and/or pedestrian detection system for a large passenger vehicle according to claim 1, wherein sensitivity or detection of said first sensing device is adjusted or determined responsive to at least one of the speed, direction or acceleration of the vehicle.

4. A collision avoidance and/or pedestrian detection system for a large passenger vehicle according to claim 1, wherein the first field of view is configured to be a first view when the vehicle is traveling in a forward direction and a second view when the vehicle is turning, and wherein sensitivity or detection of said first sensing device is adjusted or determined responsive to at least one of the speed, direction or acceleration of the vehicle.

5. A collision avoidance and/or pedestrian detection system of claim 1, wherein the first detection system further comprises a first pedestrian warning system connected to the first sensing device and generating at least one of a pedestrian visual warning and a pedestrian audible alarm configured to alert the pedestrian when the first hazard is detected by the first sensing device responsive to the first data sensed by said first sensor.

6. A collision avoidance and/or pedestrian detection system of claim 1, further comprising:
   a second sensor; and
   a second detection system comprising:
      a second housing configured to be mounted to the vehicle;
      a second sensing device enclosed in the second housing and configured to sense a second hazard in a second field of view responsive to second predetermined criteria.

7. A collision avoidance and/or pedestrian detection system of claim 6, wherein said first and second detection systems operate independently of each other.

8. A collision avoidance and/or pedestrian detection system of claim 6, wherein said first and second detection systems sense the first and second fields of view that overlap with each other.

9. A collision avoidance and/or pedestrian detection system of claim 1, wherein the first hazard comprises at least one of a pedestrian, a possible collision with the pedestrian, an anticipated collision with the pedestrian, an object, object detection, vehicle detection, cyclist detection, pedestrian detection, potential collision avoidance, and potential collision detection.

10. A collision avoidance and/or pedestrian detection system of claim 5, wherein a severity of the driver visual warning, the driver audible alarm, the pedestrian visual warning, and the pedestrian audible alarm issued by said first detection system configured to be responsive to a severity of the hazard detected by the associated sensing device.

11. A collision avoidance and/or pedestrian detection system of claim 6, wherein the first sensing device comprises a left rear sensing device and the second sensing device comprises a right rear sensing device.

12. A collision avoidance and/or pedestrian detection system for a large passenger vehicle, comprising:
   at least two first and second sensing devices each enclosed in at least one assembly configured to be mounted to the vehicle, configured to sense a first hazard in a first field of view responsive to first predetermined criteria when the vehicle is travelling in a first direction and a second hazard in a second field of view responsive to second predetermined criteria when the vehicle is travelling in a second direction;
   at least one additional sensor, comprising at least one of a speed sensor, a global positioning system (GPS) sensor, an accelerometer or a gyro sensor; and
   a driver display interface comprising at least two warning displays mounted inside the vehicle within the driver's field of vision, each warning display comprising at least one of a visual warning and an audible alarm configured to alert the driver when at least one of the first or second hazard is sensed by at least one of the first and second sensing devices, wherein sensitivity of at least one of the at least two first and second sensing devices is modified responsive to the modification of at least one driving characteristic of the vehicle including the speed of the vehicle, the acceleration of the vehicle, the location of the vehicle or the direction of travel of the vehicle.

13. The collision avoidance and/or pedestrian detection system of claim 12, further comprising an alarm system comprising at least two speakers mounted to the vehicle, each speaker configured to alert nearby pedestrians when a hazard is detected by at least one of the first, second or third sensing devices.

14. The collision avoidance and/or pedestrian detection system of claim 12, wherein the at least two first or second sensing devices comprises a left rear sensing device enclosed in a left rear assembly and a right rear sensing device enclosed in a right rear exterior assembly.

15. A method of making a collision avoidance and/or pedestrian detection system for a large passenger vehicle, comprising:
providing a first sensor comprising at least one of a speed sensor, a global positioning system (GPS) sensor, an accelerometer, and a gyro sensor and sensing first data regarding at least one of a location and a driving characteristic of the vehicle; and
providing a first detection system comprising:
a first housing configured to be mounted to the vehicle;
a first sensing device enclosed in the first housing and configured to sense, when present a first hazard in a first field of view responsive to first predetermined criteria and, when present a second hazard in a second field of view capable of overlapping with at least a portion of the first field of view responsive to second predetermined criteria; and
a first driver warning system connected to the first sensing device generating at least one of a driver visual warning and a driver audible alarm configured to alert the driver when at least one of the first hazard or the second hazard is detected by the first detection system,
wherein sensitivity of the first sensing device is or the driving characteristic of the vehicle.

16. A method according to claim 15, wherein the first field of view is configured to be a first view when the vehicle is traveling in a forward direction and a second field of view when the vehicle is turning.

17. A method according to claim 15, wherein sensitivity or detection of said first sensing device is adjusted or determined responsive to at least one of the speed, direction or acceleration of the vehicle.

18. A method according to claim 15, wherein the first field of view is configured to be a first view when the vehicle is traveling in a forward direction and a second view when the vehicle is turning, and wherein sensitivity or detection of said first sensing device is adjusted or determined responsive to at least one of the speed, direction or acceleration of the vehicle.

19. A method according to claim 15, wherein the first detection system further comprises a first pedestrian warning system connected to the first sensing device and generating at least one of a pedestrian visual warning and a pedestrian audible alarm configured to alert the pedestrian when the first hazard is detected by the first sensing device responsive to the first data sensed by said first sensor.

20. A method according to claim 15, wherein the first hazard comprises at least one of a pedestrian, a possible collision with the pedestrian, an anticipated collision with the pedestrian, an object, object detection, vehicle detection, cyclist detection, pedestrian detection, potential collision avoidance, and potential collision detection.

* * * * *